(12) United States Patent
Monroe

(10) Patent No.: US 7,643,168 B2
(45) Date of Patent: Jan. 5, 2010

(54) APPARATUS FOR CAPTURING, CONVERTING AND TRANSMITTING A VISUAL IMAGE SIGNAL VIA A DIGITAL TRANSMISSION SYSTEM

(76) Inventor: David A. Monroe, 740 Lincoln Center, 7800 IH-10 West, San Antonio, TX (US) 78230

(*) Notice: Subject to any disclaimer, the term of this patent is extended or adjusted under 35 U.S.C. 154(b) by 134 days.

(21) Appl. No.: 11/617,509

(22) Filed: Dec. 28, 2006

(65) Prior Publication Data

US 2007/0109594 A1 May 17, 2007

Related U.S. Application Data

(63) Continuation of application No. 10/336,470, filed on Jan. 3, 2003, now Pat. No. 7,365,871.

(51) Int. Cl.
*H04N 1/00* (2006.01)
*G06F 3/12* (2006.01)

(52) U.S. Cl. ............... 358/1.15; 358/402; 358/403; 358/407

(58) Field of Classification Search ............. 358/1.15, 358/402, 403, 407, 442, 468, 474
See application file for complete search history.

(56) References Cited

U.S. PATENT DOCUMENTS

| | | | |
|---|---|---|---|
| 4,163,283 A | 7/1979 | Darby | |
| 4,179,695 A | 12/1979 | Levine et al. | |
| 4,197,536 A | 4/1980 | Levine | |
| 4,516,125 A | 5/1985 | Schwab et al. | |
| 4,688,244 A * | 8/1987 | Hannon et al. | 377/58 |
| 4,831,438 A | 5/1989 | Bellman, Jr. et al. | |
| 4,845,629 A | 7/1989 | Murge | |
| 4,857,912 A | 8/1989 | Everett, Jr. et al. | |
| 4,891,650 A | 1/1990 | Sheffer | |
| 4,910,692 A | 3/1990 | Outram | |
| 5,027,104 A | 6/1991 | Reid | |
| 5,027,114 A | 6/1991 | Kawashime et al. | |
| 5,042,061 A | 8/1991 | Kaneko et al. | |
| 5,091,780 A | 2/1992 | Pomerleau | |
| 5,111,291 A | 5/1992 | Erickson | |
| 5,136,628 A | 8/1992 | Araki et al. | |
| 5,164,979 A | 11/1992 | Choi et al. | |
| 5,166,746 A | 11/1992 | Sato et al. | |

(Continued)

FOREIGN PATENT DOCUMENTS

EP      220752      5/1987

(Continued)

OTHER PUBLICATIONS

Apr. 1966, Apollo Unified S-Band System, NASA-Goddard Space Flight Center, Greenbelt, Maryland.

(Continued)

*Primary Examiner*—Houshang Safaipour

(57) ABSTRACT

An image capture, conversion, compression, storage and transmission system provides a data signal representing the image in a format and protocol capable of being transmitted over any of a plurality of readily available transmission systems and received by readily available, standard equipment receiving stations. In its most comprehensive form, the system is capable of sending and receiving audio, documentary and visual image data to and from standard remote stations readily available throughout the world.

31 Claims, 73 Drawing Sheets

U.S. PATENT DOCUMENTS

| | | |
|---|---|---|
| 5,218,367 A | 6/1993 | Sheffer et al. |
| 5,243,340 A | 9/1993 | Norman et al. |
| 5,243,530 A | 9/1993 | Stanifer et al. |
| 5,268,698 A | 12/1993 | Smith, Sr. et al. |
| 5,283,643 A | 2/1994 | Fujimoto |
| 5,321,615 A | 6/1994 | Frisbie et al. |
| 5,334,982 A | 8/1994 | Owen |
| 5,351,194 A | 9/1994 | Ross et al. |
| 5,400,031 A | 3/1995 | Fitts |
| 5,400,068 A | 3/1995 | Ishida et al. |
| 5,408,330 A | 4/1995 | Squicciarini et al. |
| 5,432,838 A | 7/1995 | Purchase |
| 5,440,337 A | 8/1995 | Henderson et al. |
| 5,440,343 A | 8/1995 | Parulski |
| 5,448,243 A | 9/1995 | Bethke et al. |
| 5,463,595 A | 10/1995 | Rochall et al. |
| 5,469,371 A | 11/1995 | Bess |
| 5,485,504 A | 1/1996 | Ohnsorge |
| 5,497,149 A | 3/1996 | Fast |
| 5,508,736 A | 4/1996 | Cooper |
| 5,517,683 A * | 5/1996 | Collett et al. ............ 455/575.1 |
| 5,530,440 A | 6/1996 | Danzer et al. |
| 5,546,194 A * | 8/1996 | Ross .......................... 358/445 |
| 5,550,646 A * | 8/1996 | Hassan et al. ............... 358/442 |
| 5,553,609 A | 9/1996 | Chen et al. |
| 5,557,254 A | 9/1996 | Johnson et al. |
| 5,557,278 A | 9/1996 | Piccirillo et al. |
| 5,598,167 A | 1/1997 | Zjderhand |
| 5,612,668 A | 3/1997 | Scott |
| 5,627,753 A | 5/1997 | Brankin et al. |
| 5,629,691 A | 5/1997 | Jain |
| 5,636,122 A | 6/1997 | Shah et al. |
| 5,642,285 A | 6/1997 | Woo |
| 5,666,157 A | 9/1997 | Avid |
| 5,666,159 A * | 9/1997 | Parulski et al. ........... 348/211.2 |
| 5,670,961 A | 9/1997 | Tomita et al. |
| 5,677,979 A | 10/1997 | Squicciarini |
| 5,689,300 A * | 11/1997 | Shibata et al. ........... 348/14.07 |
| 5,689,442 A | 11/1997 | Swanson |
| 5,712,679 A | 1/1998 | Coles |
| 5,712,899 A | 1/1998 | Pace, II |
| 5,714,948 A | 2/1998 | Farmakis et al. |
| 5,742,336 A | 4/1998 | Lee |
| 5,751,346 A | 5/1998 | Dozler |
| 5,777,551 A | 7/1998 | Hess |
| 5,777,580 A | 7/1998 | Janky et al. |
| 5,793,416 A | 8/1998 | Rostoker et al. |
| 5,835,059 A | 11/1998 | Nadel et al. |
| 5,850,180 A | 12/1998 | Hess |
| 5,867,804 A | 2/1999 | Pilley et al. |
| 5,917,405 A | 6/1999 | Joso |
| 5,926,210 A | 7/1999 | Hackett et al. |
| 5,933,098 A | 8/1999 | Haxton |
| 5,938,706 A | 8/1999 | Feldman |
| 5,974,158 A | 10/1999 | Auty et al. |
| 5,983,161 A | 11/1999 | Lemelson et al. |
| 5,995,041 A * | 11/1999 | Bradley et al. ........... 342/357.1 |
| 5,999,116 A | 12/1999 | Evers |
| 6,002,427 A | 12/1999 | Kipust |
| 6,009,356 A | 12/1999 | Monroe |
| 6,035,212 A * | 3/2000 | Rostoker et al. ......... 455/552.1 |
| 6,036,086 A * | 3/2000 | Sizer et al. .................. 235/375 |
| 6,067,571 A | 5/2000 | Igarashi et al. |
| 6,069,655 A | 5/2000 | Seeley |
| 6,072,600 A * | 6/2000 | Wertsberger ............... 358/479 |
| 6,078,850 A | 6/2000 | Kane et al. |
| 6,084,510 A | 7/2000 | Lemelson et al. |
| 6,092,008 A | 7/2000 | Bateman |
| 6,100,964 A | 8/2000 | De Cremiers |
| 6,133,941 A | 10/2000 | Ono |
| 6,154,658 A | 11/2000 | Caci |
| 6,157,317 A | 12/2000 | Walker |
| 6,181,373 B1 | 1/2001 | Coles |
| 6,195,609 B1 | 2/2001 | Pilley et al. |
| 6,226,031 B1 | 5/2001 | Barraciough et al. |
| 6,243,056 B1 * | 6/2001 | Jachimowicz et al. ......... 345/82 |
| 6,246,320 B1 | 6/2001 | Monroe |
| 6,259,475 B1 | 7/2001 | Ramachandran et al. |
| 6,275,231 B1 | 8/2001 | Obradovich |
| 6,278,965 B1 | 8/2001 | Glass et al. |
| 6,282,488 B1 | 8/2001 | Castor et al. |
| 6,292,098 B1 | 9/2001 | Ebata |
| 6,356,625 B1 | 3/2002 | Casteiani |
| 6,385,772 B1 | 5/2002 | Courtney |
| 6,424,370 B1 | 7/2002 | Courtney |
| 6,462,697 B1 | 10/2002 | Klamer et al. |
| 6,476,858 B1 | 11/2002 | Ramirez Diaz et al. |
| 6,504,479 B1 | 1/2003 | Lemons |
| 6,522,532 B2 | 2/2003 | Liao et al. |
| 6,525,761 B2 | 2/2003 | Sato et al. |
| 6,549,130 B1 | 4/2003 | Joso |
| 6,556,241 B1 | 4/2003 | Yoshimura et al. |
| 6,570,610 B1 | 5/2003 | Kipust |
| 6,628,835 B1 | 9/2003 | Brill |
| 6,646,676 B1 | 11/2003 | DeGrace |
| 6,662,649 B1 | 12/2003 | Knight et al. |
| 6,675,386 B1 | 1/2004 | Hendricks et al. |
| 6,698,021 B1 | 2/2004 | Amini |
| 6,720,990 B1 | 4/2004 | Walker et al. |
| 7,113,971 B1 | 9/2006 | Ohi et al. |
| 7,310,072 B2 | 12/2007 | Ronzani |
| 7,372,447 B1 | 5/2008 | Jacobsen et al. |
| 2003/0071899 A1 | 4/2003 | Joso |
| 2005/0055727 A1 | 3/2005 | Creamer et al. |
| 2005/0130803 A1 | 6/2005 | Rastegar |

FOREIGN PATENT DOCUMENTS

| | | |
|---|---|---|
| EP | 232031 | 8/1987 |
| EP | 532110 | 3/1993 |
| EP | 209397 | 7/1993 |
| EP | 613109 | 8/1994 |
| EP | 613110 | 8/1994 |
| EP | 744630 | 11/1996 |
| EP | 785536 | 7/1997 |
| EP | 613111 | 8/1998 |
| JP | 03089691 | 4/1991 |
| JP | 6-301898 | 10/1994 |
| JP | 9-282600 | 10/1997 |
| JP | HEI-10-66058 | 3/1998 |
| JP | A-10-155040 | 6/1998 |
| JP | 9-251599 | 4/1999 |
| JP | 11-160424 | 6/1999 |
| WO | WO90/04242 | 4/1990 |
| WO | WO95/27910 | 10/1995 |
| WO | WO96/12265 | 4/1996 |
| WO | WO97/37336 | 10/1997 |
| WO | WO98/52174 | 11/1998 |

OTHER PUBLICATIONS

Nov. 24, 1976, TELEXIS ViaNet General Information Booklet Version 1.3.
2000, ViaNet 3000 Administrator's Manual Version 1.1- NetXpress Video by TELEXIS, Kanata, Ontario, Canada.
1999 Vianet 3000 Operator Manual Version 1.0—NetXpress Video by TELEXIS, Kanata, Ontario, Canada.
1999 ViaNet 3000 Administrator Manual Version 1.0—NetXpress Video by TELEXIS, Kanata, Ontario, Canada.
1999 ViaNet 3000 Instruction Manual Operator's Revision 1—NetXpress Video by TELEXIS, Kanata, Ontario, Canada.
Office Action issued on Oct. 4, 2007 in U.S. Appl. No. 11/617,509 (present application).
Office Action issued on Dec. 12, 2008 in U.S. Appl. No. 11/617,509 (present application).

Office Action issued on Sep. 27, 2004 in U.S. Appl. No. 10/336,470 (the parent of the present application).
Office Action issued on Aug. 9, 2005 in U.S. Appl. No. 10/336,470 (the parent of the present application).
Office Action issued on Dec. 16, 2005 in U.S. Appl. No. 10/336,470 (the parent of the present application).
Office Action issued on Jul. 27, 2006 in U.S. Appl. No. 10/336,470 (the parent of the present application).
Office Action issued on Mar. 8, 2007 in U.S. Appl. No. 10/366,470 (the parent of the present application).

* cited by examiner

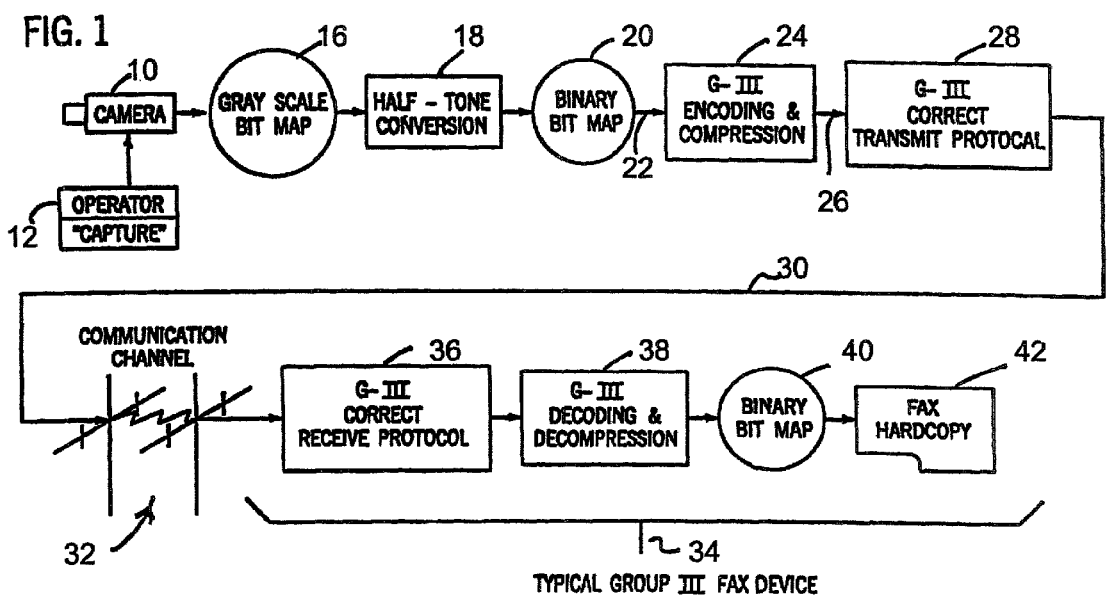

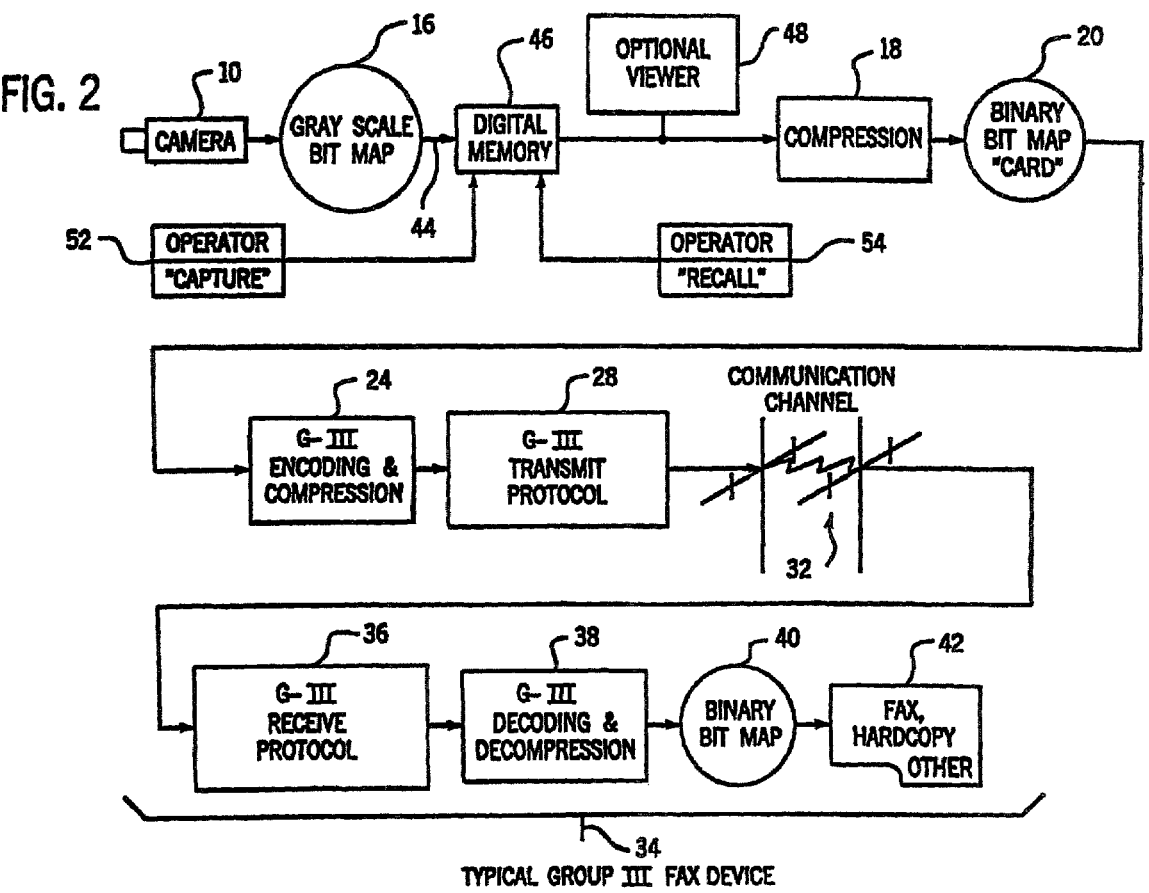

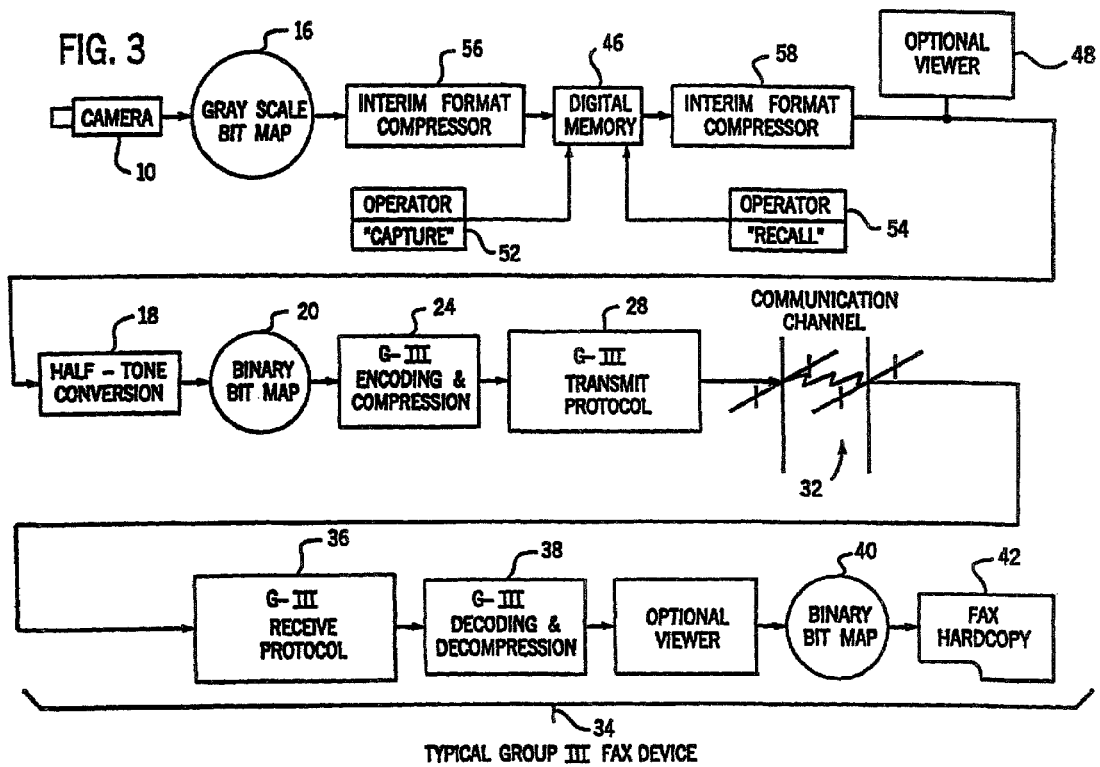

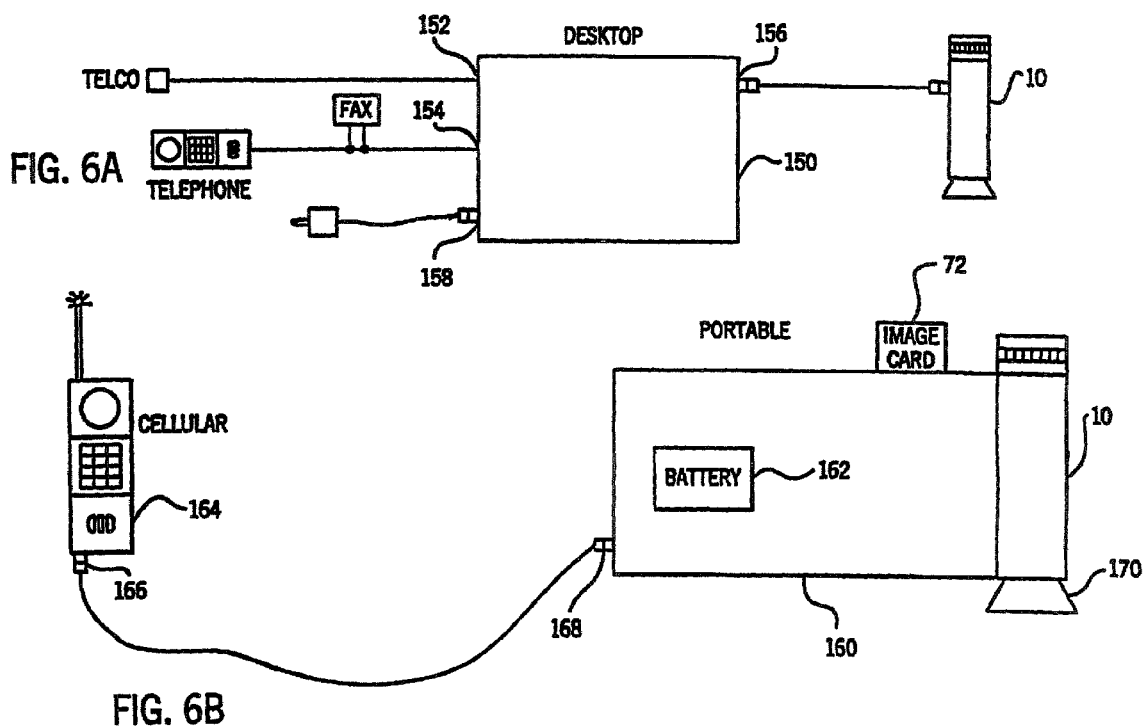

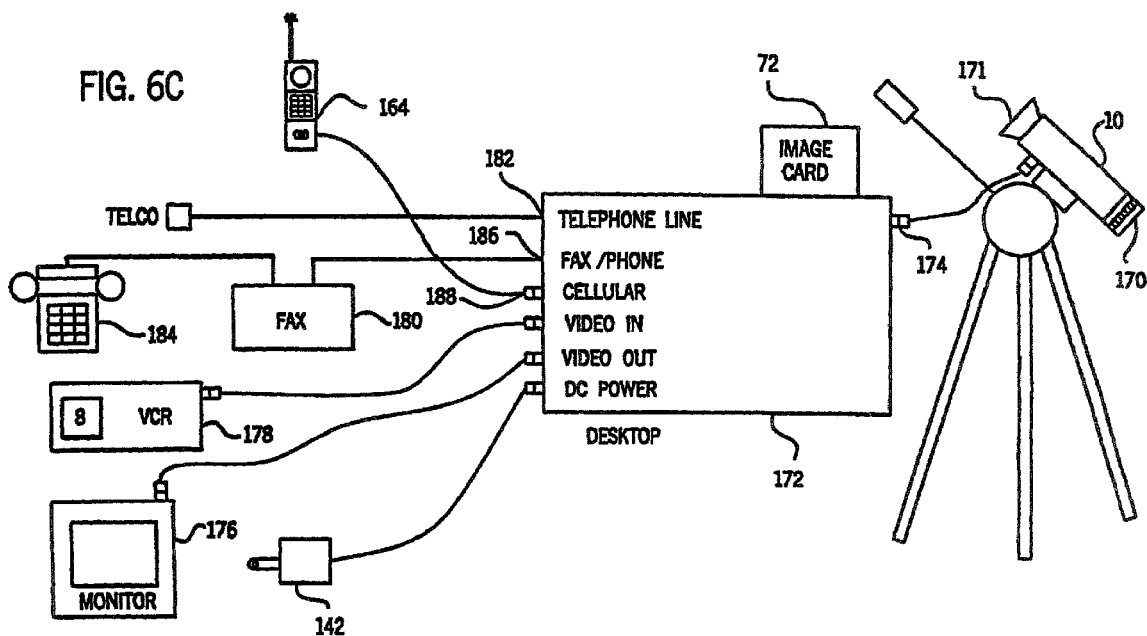

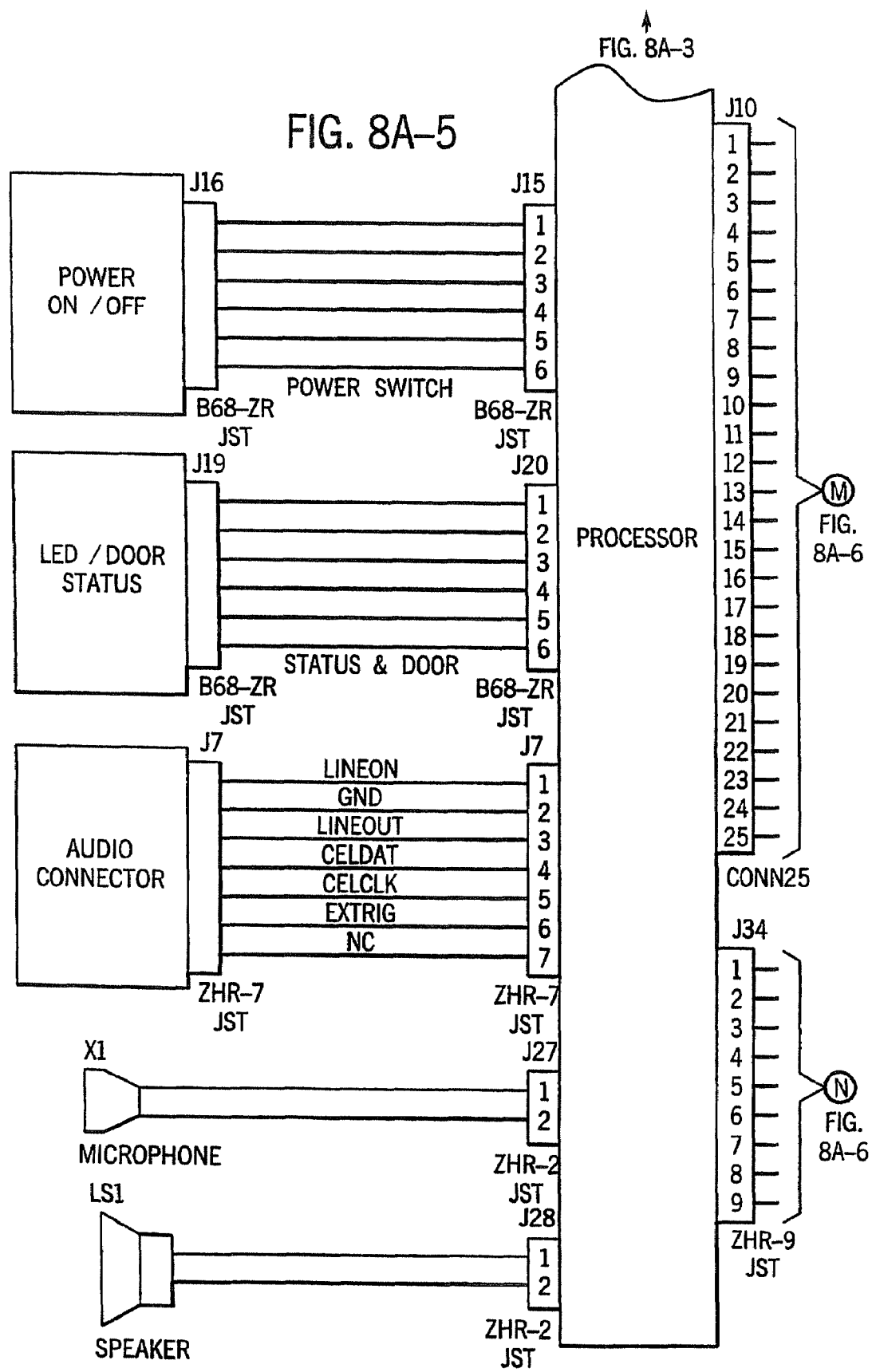

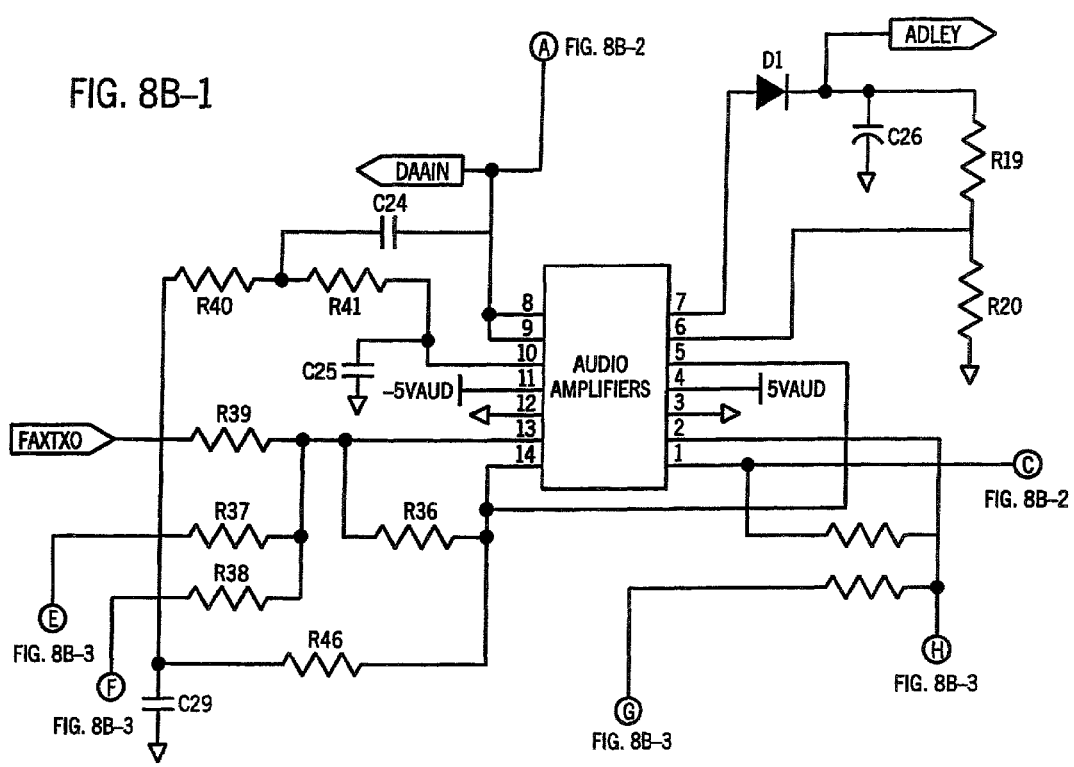

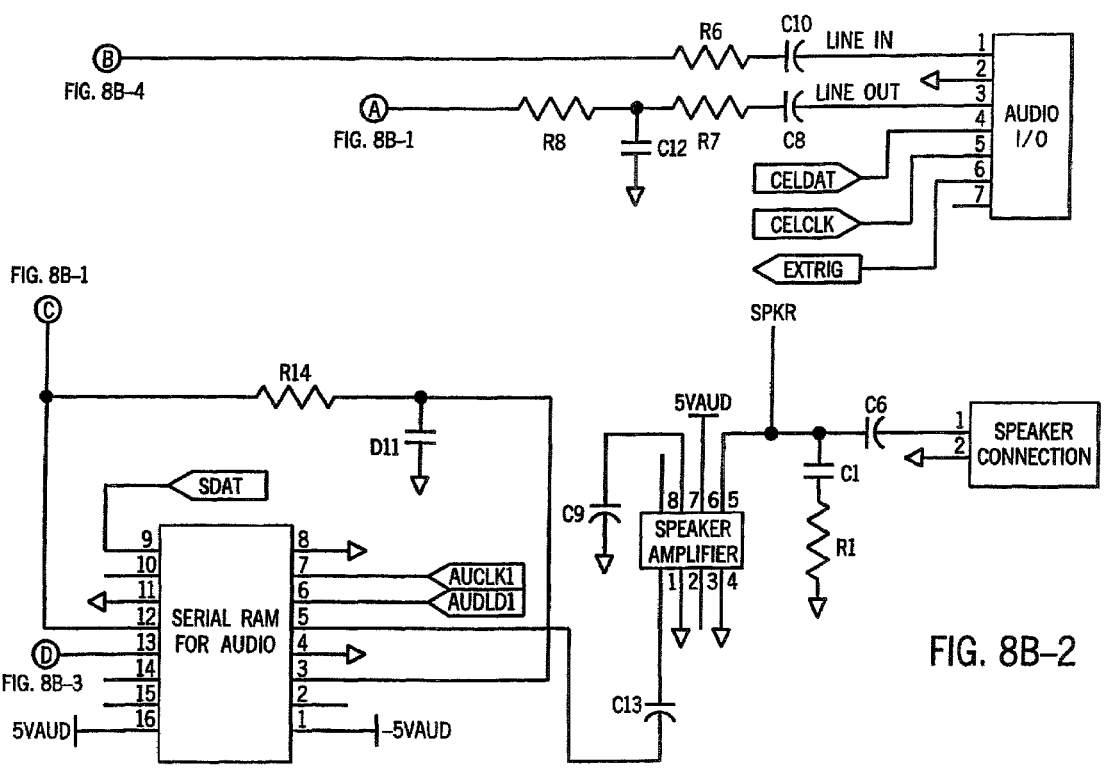

FIG. 8D-3
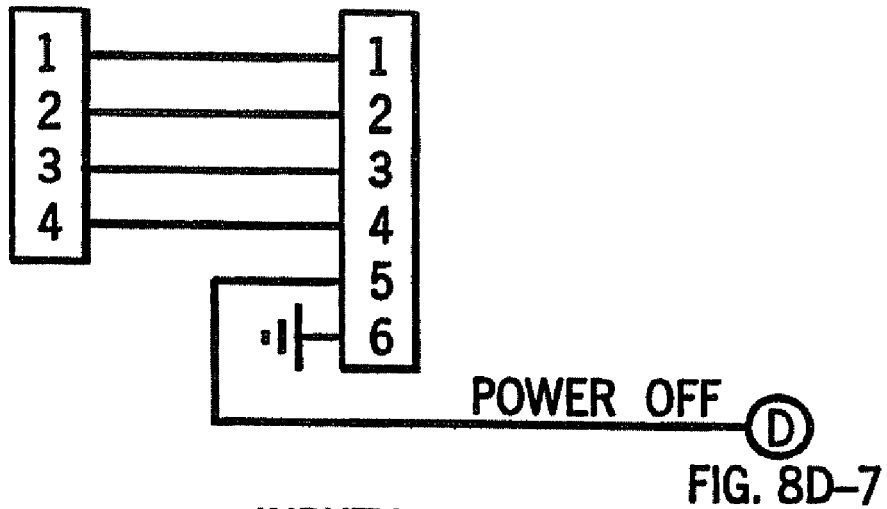
POWER OFF → (D) FIG. 8D-7
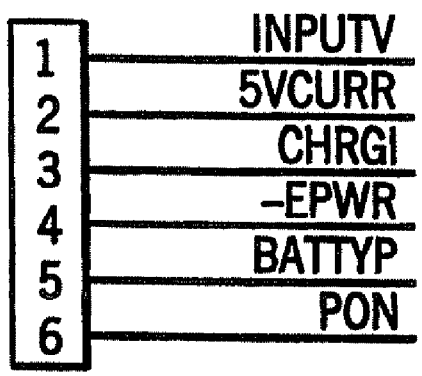
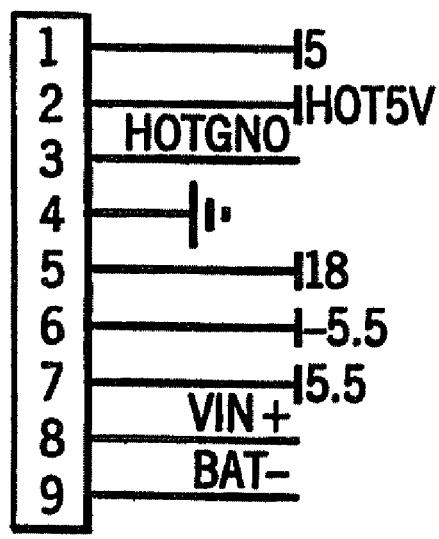

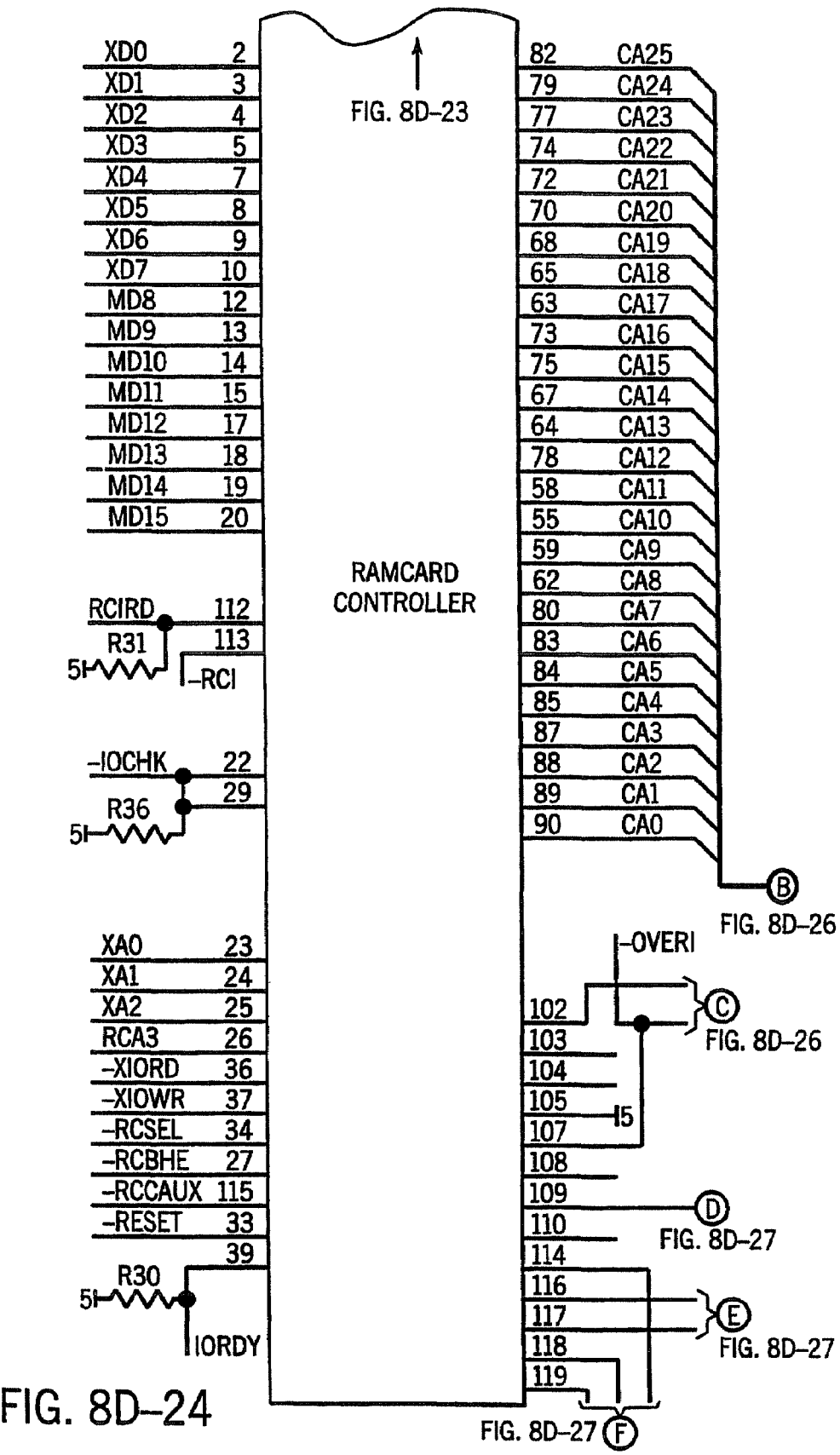

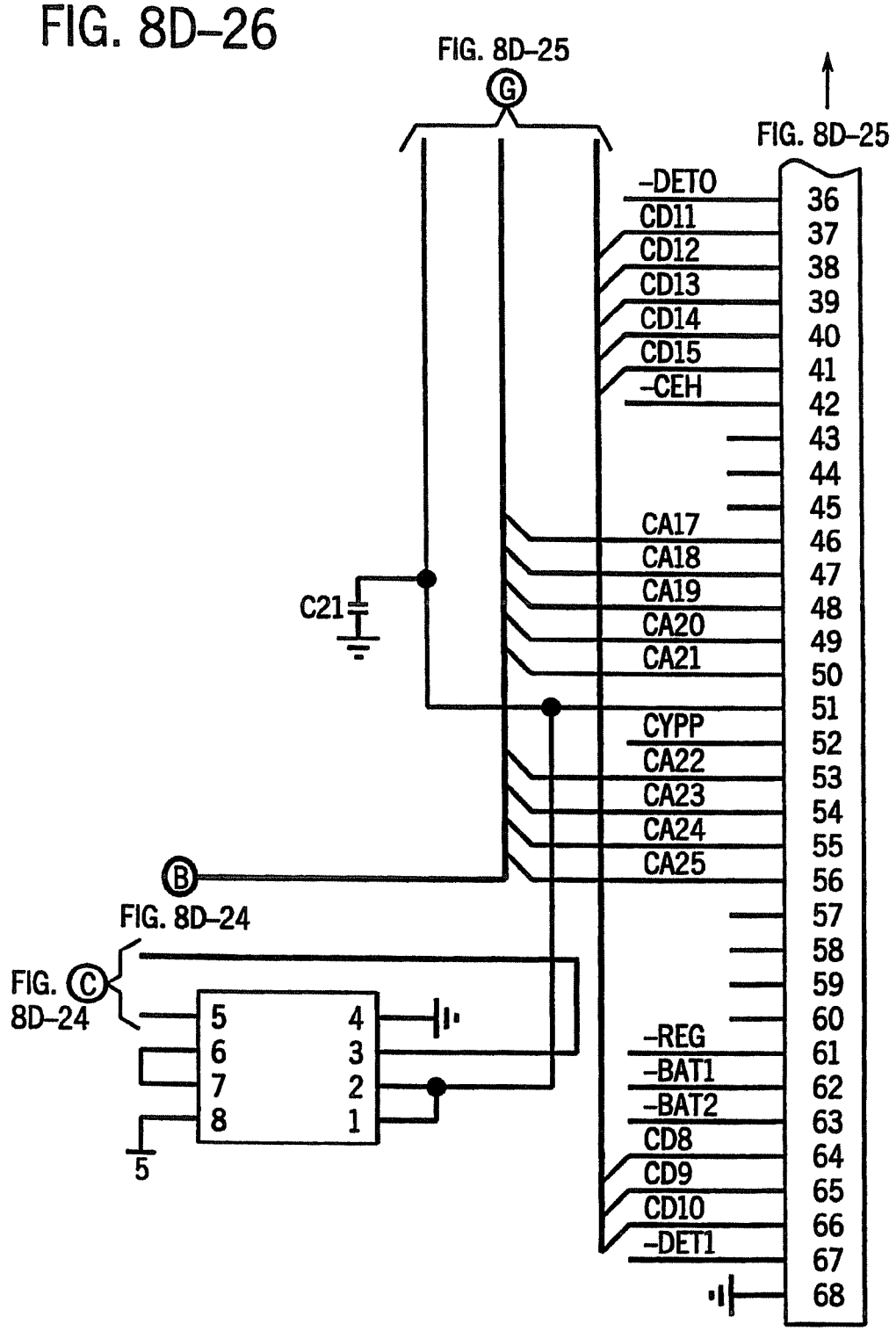

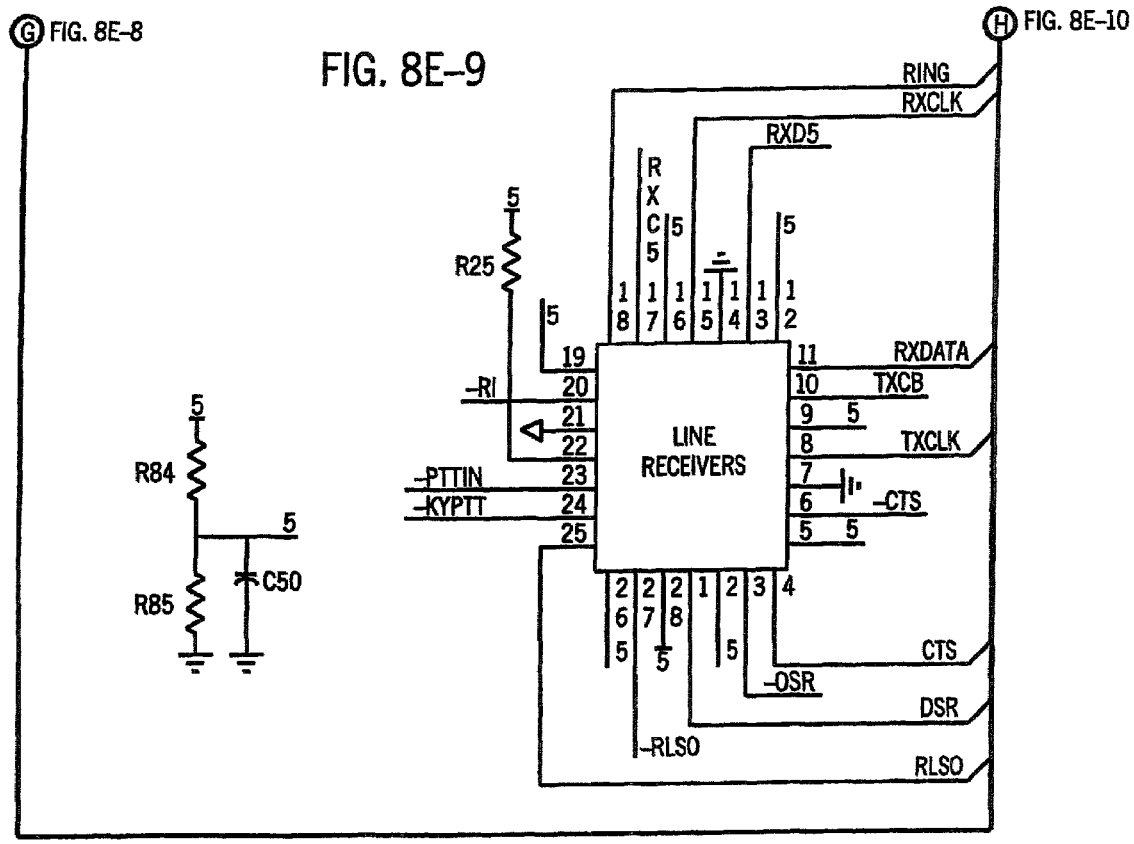

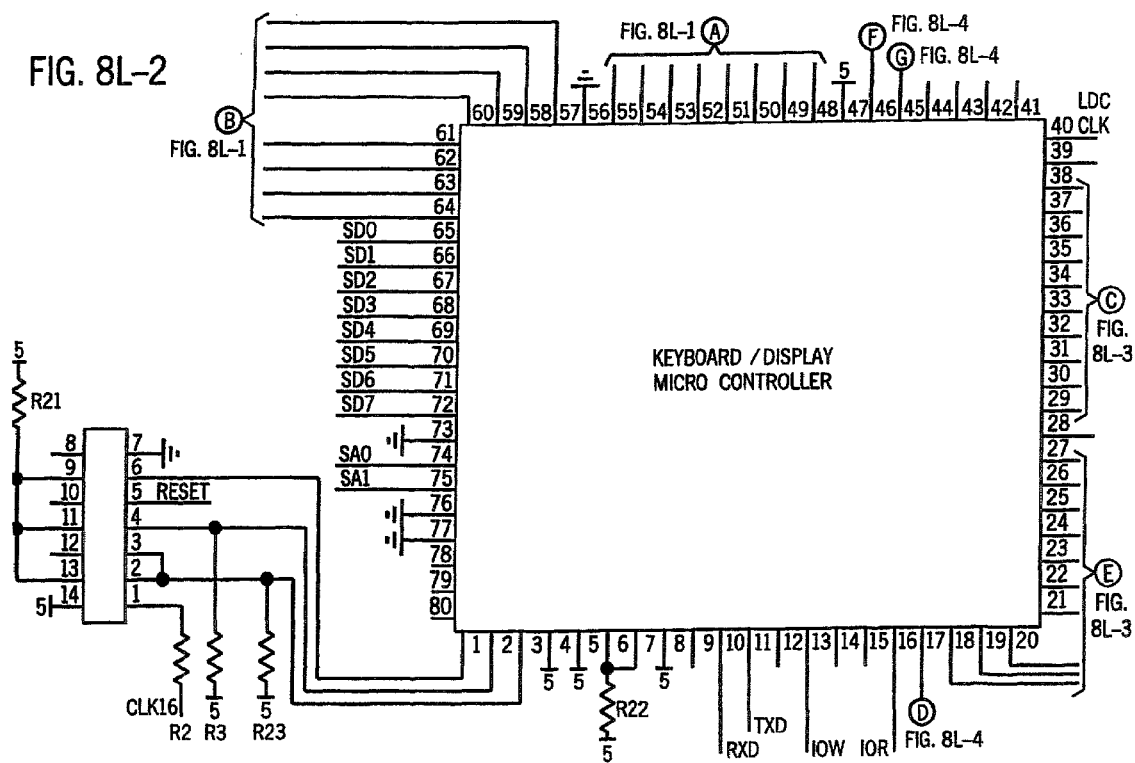

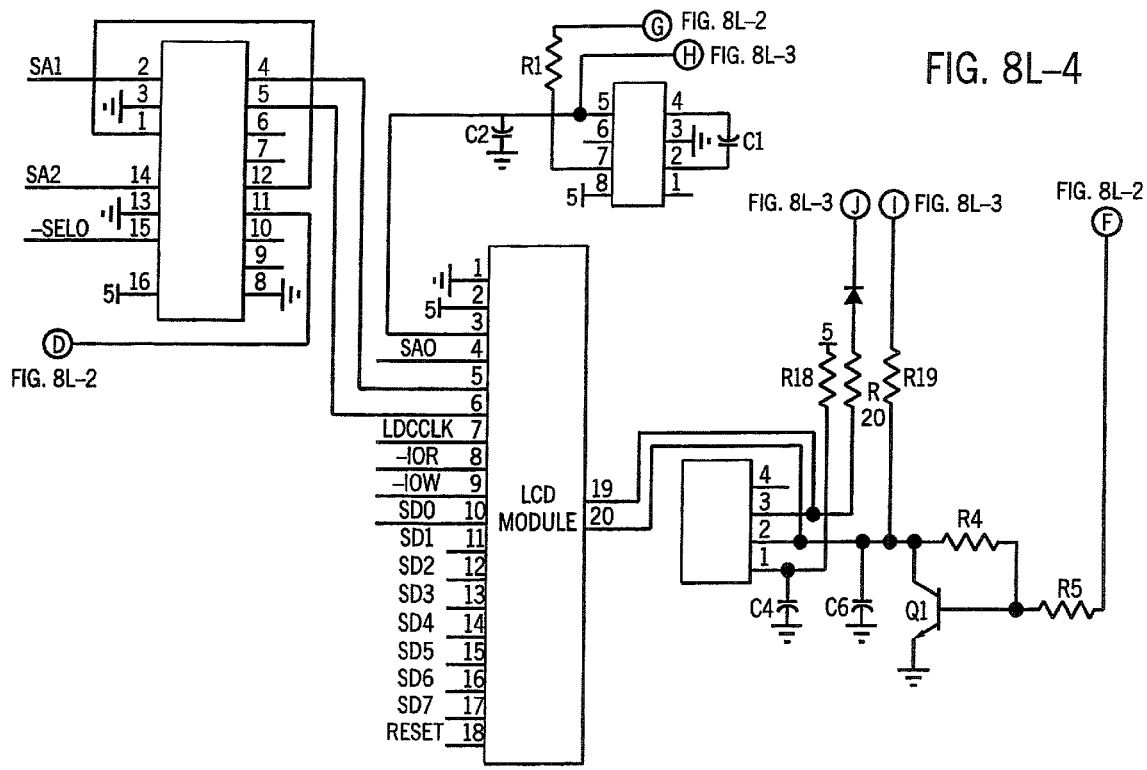

KEYBOARD / DISPLAY
INTERFACE CONNECTORS

APPARATUS FOR CAPTURING, CONVERTING AND TRANSMITTING A VISUAL IMAGE SIGNAL VIA A DIGITAL TRANSMISSION SYSTEM

This application is a divisional application of and claims priority from a non-provisional United States Application entitled Apparatus For Capturing, Converting And Transmitting A Visual Image Signal Via A Digital Transmission System, Ser. No. 09/006,073, having a filing date of Jan. 12, 1998; the specification and drawings of which are hereby incorporated by reference.

BACKGROUND OF THE INVENTION

1. Field of the Invention

The invention is generally related to image capture and transmission systems and is specifically directed to an image capture, compression and transmission system for use in connection with land line and wireless telephone systems.

2. Discussion of the Prior Art

Industry has developed and continues to develop and enhance techniques for scanning, compressing, transmitting, receiving, decompressing, viewing and printing documents. This technology, encompassing the full body of facsimile transmission and reception, is currently in widespread use. The current standards, CCITT Group III and Group IV, define methods to scan and transmit high quality, bi-level images with a high degree of success and has become commercially acceptable throughout the world. However, gray scale documents are not easily transmitted because the scanners and algorithms are not tailored to the function. Three dimensional objects will not fit into the flat document scanners and cannot be transmitted.

Examples of systems that have addressed some of these issues are shown in U.S. Pat. No. 5,193,012 which shows a video to facsimile signal converter, and U.S. Pat. No. 3,251,937 which discloses a system for transmitting still television pictures over a telephone line.

Wire photography, and its extension, radio photography, have long been used by the news media. The most common form involves an input device that converts photographs into encoded signals for communication over telecommunications facilities or radio. At the receiving end, reproducing equipment reconverts the encoded image signals by exposing photographic film or other sensitized paper. The term facsimile is often used with these products.

Still video equipment has recently become available from vendors such as Kodak, Canon and Sony, and is again primarily used by television and print media, although applications are expanding rapidly in such areas as insurance investigations and real estate transactions. A still video camera captures a full color still video image that can be reproduced using a special video printer that converts the still video image data into hard copy form. For applications requiring communication of the still video image, transmit/receive units are available wherein the image begins and ends as a video image.

The Photophone from Image Data Corporation is an example of a specialty product that combines a video camera, display and storage facility in a terminal package. One terminal can send a real time or stored still video image to another for display or storage, or printing on special video printers. Again, the signal begins and ends as a video image.

Another example of a specialty product is peripheral equipment available for personal computers that enables the input/output, storage and processing of still video images in digitized formats. For instance, the Canon PV-540 is a floppy disk drive that uses conventional still video disks, digitizing and a still video image using a conventional format, and communicates with the computer through a standard communications I/O port.

U.S. Pat. No. 5,193,012 discloses a still-video to facsimile conversion system for converting the still-video image frame into a half-tone facsimile reproduction without having to store an entire intermediated gray scale image frame by repeatedly transmitting the still-video image frame from a still-video source to an input circuit with a virtual facsimile page synchronization module. This system permits image to facsimile conversion by utilizing a half tone conversion technique.

While the various prior art systems and techniques provide limited solutions to the problem of transmitting visual images via a facsimile transmission system, all fall short of providing a reliable and convenient method and apparatus for readily capturing, storing, transmitting and printing visual images in a practical manner.

SUMMARY OF THE INVENTION

The subject invention is an image capture, compression and transmission system that is specifically designed to permit reliable visual image transmission over land line or wireless communications using commercially available facsimile transmission techniques. The invention incorporates a camera and signal converter into an integrated unit wherein the converted signal may be transmitted on a real time basis or may be stored in memory for later recall and transmission. The design of the invention permits maximum flexibility, with the camera/converter/telephone or other transmission device being designed in a modular configuration wherein any or all of the devices may exist as integrated or independent units.

The preferred embodiment permits capture of a video image using a digital camera, an analog camera, or a video camera such as a camcorder. The captured video image is then converted into still frame digitized format for transmission over any of a variety of transmission systems ranging from Group-III facsimile to computer, or to a like device at a remote location, in any protocol desired. The invention recognizes that once the signal is digitized, the transmission protocols are virtually endless.

For example, the present invention, permits a still frame visual image to be captured at a remote location and sent immediately, over wireless communication systems, to a remote location such as, by way of example, a computer system wherein the image could be merged directly into newsprint. The image may also be sent to and printed as a hard copy using any Group-III facsimile machine, anywhere in the world. Where desired, the images may be stored in memory for later recall, and may be archived on a portable medium such as a memory card or the like.

The system of the subject invention is particularly useful for applications where immediate transmission of visual images of scenes, people and objects is desirable and sophisticated equipment is not always available for receiving the information. The system also provides a unique and reliable means for transmitting visual data to and from remote locations, such as, by way of example, law enforcement and emergency vehicles and the like.

In the preferred embodiment of the invention, the system includes a video camera and an integral cellular telephone, wherein the telephone using the standard audio mode or future digital modes, can be used to transmit and receive visual image signals. A desk model is also disclosed and permits connection to a standard land line telephonic system. A mobile console model is disclosed for use in law enforcement vehicles, and the like. Other communication systems are also supported by the subject invention, including hardwired networks, radio and satellite transmission and the like.

A local facsimile machine may be incorporated with the unit and can serve as a printer for providing hard copy of the captured image at the point of capture, as well as being adapted for receiving facsimile transmissions in the standard fashion.

The circuitry is disclosed for supporting any of the preferred configurations from a basic real time transmission system via Group-III fax to a comprehensive system supporting both land line and wireless transmission of image, audio and documentary data at both a local and remote station.

The subject invention also permits digitized collection of audio signals through the use of an internal microphone, and external input device, a cellular telephone, land line telephone, wireless radio or other communication system, and digitized audio playback, as well. The playback can be via an internal speaker, out an external outjack to a remote device or via a cellular telephone, land line telephone, wireless radio or other communication system.

The digitized image and audio capture features permit association of audio with an image, as well as data with the image. Useful data associated with the image includes GPS from either internal or external GPS devices, range information from ranging devices, date and time, and text which may be input from an integrated keyboard or from a remote device.

It is an important feature of the invention that the system supports storage of images in an interim storage format including raw video, compressed video, interim gray scale format and/or half tone format. The image can also be stored in the selected output mode, such as by way of example, a Group III facsimile mode. The versatile capability of the system permits transmission of captured data to a standard bi-level facsimile machine such as Group III, to gray scale facsimile systems or full color facsimile systems, as well as to other remote receiving devices such as, by way of example, personal computers and network servers. The data may be transferred in any of a variety of formats and protocols including JPEG, FAX, wavelets, emerging imagery formats, FAX and computer data protocols. The invention is adapted to operate in multiple modes, with a unitary capture and send mode or separate capture and store, and send modes.

In the preferred embodiment, the system is adapted for tagging a collected image, video, audio, and other data such as a GPS information, with geospatial information and real time clock and added text. This permits the complete historical data to be transmitted simultaneously with the image signal.

It is contemplated that the system of the invention would be self-contained with an integral power unit such as a disposable battery, rechargeable battery source or the like. Therefore, the system is adapted to power up when in use and power down or "sleep" when not activated, preserving power during idle time. The power systems for the video camera, the video input circuits and converters, the modem or other transmission devices and other high drain components may be isolated and only powered when needed. This also permits use of ancillary functions, such as use as a cellular telephone, to proceed without draining the power source by powering idle components. The processor clock rate may also be slowed down during idle mode to further conserve power.

Where desired, the system also includes camera operation control capability through the use of digital/analog circuits for converting digital commands to analog signals for controlling the gain, pedestal, setup, white clip, lens focus, white balance, lens iris, lens zoom and other functions of the camera from a local input device, a remote device or as automatic or programmed functions. The central processor may also be used to control camera shutter rate. Other camera features and parameters which may be controlled in this manner are compressor resolution (such as high, medium, low user settings) corresponding to compression rate parameters, field/frame mode, color or monochrome, image spatial resolution (640× 420 pixels, 320×240 pixels, for example), lens and camera adjustments, input selection where multiple cameras or video sources are used and the like.

When an integrated communications device is used, such as by way of example, a cellular telephone, the telephone can be isolated from the rest of the system to permit independent use, and independent power up and power off and other cellular phone functions.

In operation, the system permits not only the manual capture, dial (select) and send of images, but may also be fully automated to capture, dial and send, for example, on a timed sequence or in response to a sensor such as a motion sensor, video motion detection, or from a remote trigger device. The remote trigger also may be activated by an incoming telephone signal, for example.

The remote device may also be used for remote loading and downloading of firmware, and for setting of the programmable parameters such as to provide remote configuration of sampling modes during capture, compression rates, triggering methods and the like.

The triggering function permits a multitude of sampling schemes for a simple triggered activation for capturing an image upon initiation to a trigger signal to more complicated schemes for capturing and transmitting images prior to and after receipt of the trigger signal. The trigger function can be set to operate, for example, on a time per sample and number of sample basis, or time per sample and total sample time basis, or number of samples and total time basis. Depending on application, the trigger can sample in a prior to and after signal mode, using in combination the time per sample and number of samples prior and after signal basis, a total time basis, a percent prior versus percent after trigger basis, time per sample basis, time prior to and time after trigger basis, and other combination. For example, if the image capture device is positioned to monitor traffic accidents at a specific location, and an audio signal sensor identifying a crash were used as the trigger, it would be desirable to collect image sample both prior to and after the trigger signal. The number of samples, total sample time, and percentage of samples prior to and after trigger would be controlled by the specific application.

Circular sampling techniques are supported by the data capture system of the present invention. This is particularly useful when triggering events are used to initiate transmission of collected image data over the communications system. For example, if a triggering event is motion detected at a motion sensor, it may be useful to look at the images captured for a period of time both prior to and after the actual event. The circuitry of the subject invention permits any circular sampling technique to be utilized depending upon application, such as prior to an after trigger, only after trigger or only before trigger or prior to and after the trigger point. Again, as an example, it may be desirable to look primarily at images captured before a triggering event if the event is a catastrophic event such as an explosion or the like. Other circular sampling techniques may be employed, as well, incorporating multiple cameras, for example, wherein different fields are sampled depending upon the time frame in a sequence of events.

It is, therefore, an object and feature of the invention to provide an apparatus for capturing, converting and transmitting a visual image via standard facsimile transmissions systems.

It is another object and feature of the invention to provide an apparatus for compressing the visual image data in order to minimize the capacity requirements of the data capture and storage system.

It is an additional object and feature of the invention to provide an apparatus for capturing and storing a visual image for later recall and review and/or transmission.

It is yet another object and feature of the invention to provide an apparatus for storing a captured video image in digital format on a portable storage medium.

It is an additional object and feature of the invention to provide an apparatus capable of sending and receiving telephonic audio messages, facsimile documents and captured visual images to and from standard, readily available remote stations.

It is a further object and feature of the invention to provide the means and method for capturing images prior to, prior to and after, or after a triggering event.

It is also an object and feature of the invention to provide for multiple triggering events and/or optional viewing or review of the captured images prior to printing or transmission.

It is another object and feature of the invention to provide an apparatus which may be activated from a remote location for initiating the capture of images by the device.

Other objects and features will be readily apparent from the drawings and detailed description.

BRIEF DESCRIPTION OF THE DRAWINGS

FIG. 2 is similar to FIG. 1, but incorporates a memory storage capability, permitting storage and optional review or viewing of the image prior to transmission.

FIG. 3 is similar to FIGS. 1 and 2, but incorporates a data compression scheme for increasing the capacity of the memory and for increasing efficiency of transmission.

FIGS. 6A, 6B, and 6C, are block diagrams of the physical components of desktop, portable and comprehensive console embodiments of the invention, respectively.

FIGS. 8A-8L (Formerly FIG. 12) comprises a schematic diagram for an exemplary embodiment of the circuit for supporting the subject invention.

DETAILED DESCRIPTION OF THE PREFERRED EMBODIMENTS

The image capture and transmission system of the subject invention is suited for capturing one or more single frame analog image or a digital image data signal and transmitting the captured signal via any of a plurality of transmission schemes to a remote receiving station where the image is downloaded in a suitable format for viewing and printing on hard paper copy, a CRT screen image, or other medium. The system is particularly well suited for sending and/or receiving images via a standard Group III facsimile transmission system and permits capture of the image at a remote location using an analog or digital camera. Two generic configurations are shown and described, the first, where each image is transmitted as it is captured, and the second, which permits capture, storage, and selective recall of captured images for transmission. The invention also contemplates a portable storage medium, wherein the captured stored medium may be removed from the capture device and archived for later use. While a system for black and white (gray tones) for Group-III facsimile transmission is described in detail herein, the invention could be readily adapted to transmission of color images utilizing the teachings of the present invention using industry standard color video standards and circuits. Both portable, or hand held, and stationary, or desktop, units are described. The circuitry utilized for both configurations is identical, but stationary configurations do not need a battery.

FIGS. 1-5 are circuit configuration diagrams for the various capture, storage and transmission schemes. The physical embodiments utilized to employ the teachings of the schemes taught in FIGS. 1-5 are not limited. FIGS. 6-10 are exemplary physical embodiments of the subject invention.

Figure 7A:
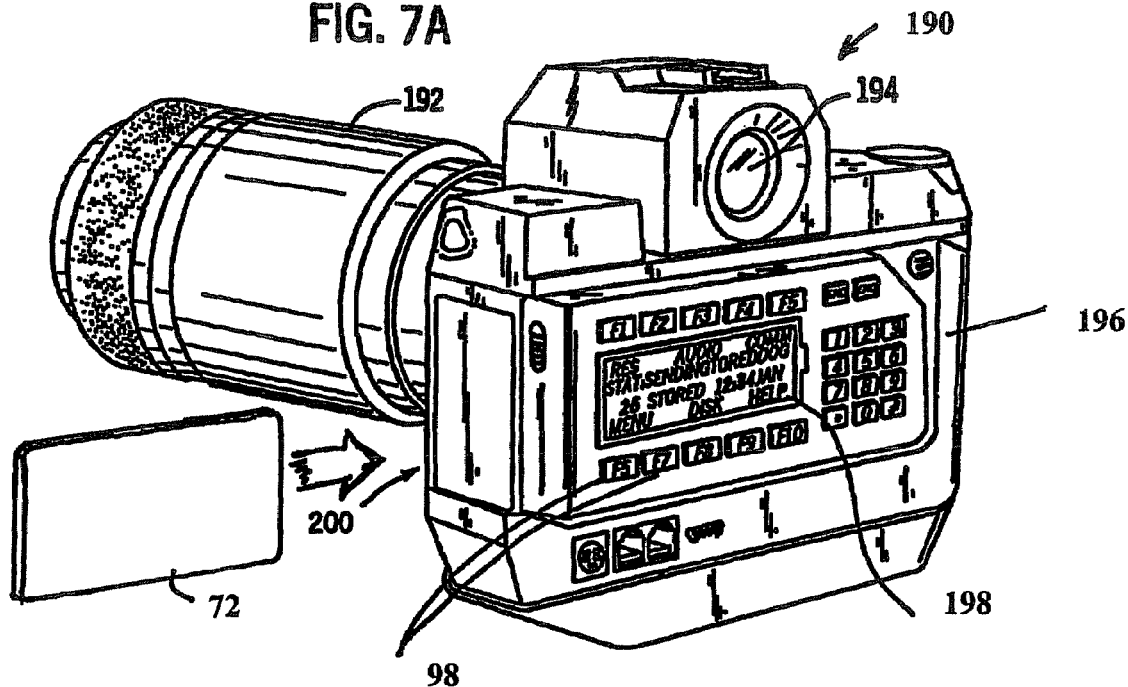
FIGS. 7A and 7B are perspective drawings of a hand held device for capturing, storing and transmitting an image in accordance with the invention (new drawings to replace Frassinito design.
Figures 1, 8A:
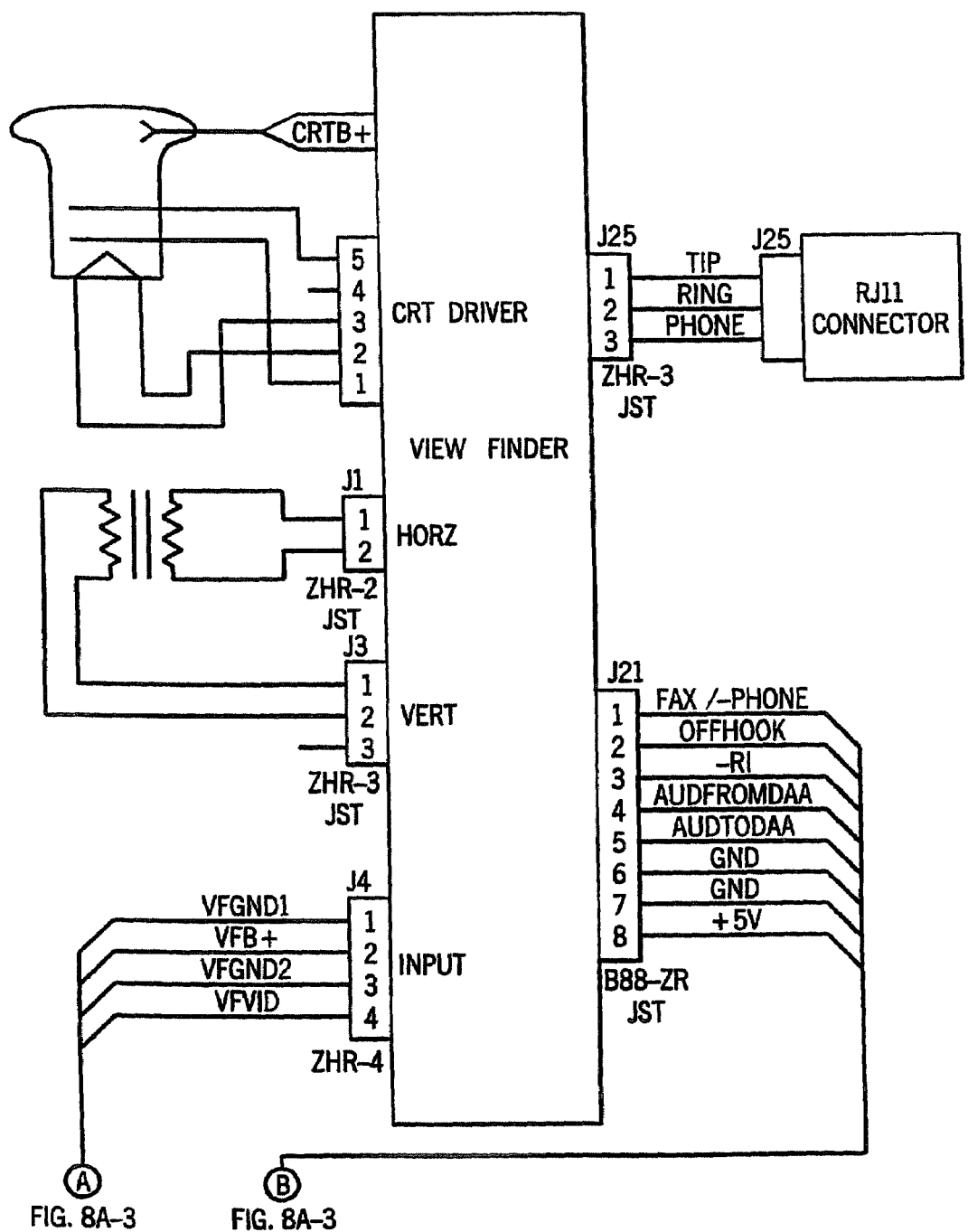

Turning now to FIG. 1, the simplest embodiment of the invention incorporates a standard analog or digital camera device 10 for capturing a visual image in the typical fashion. The camera 10 may be operator activated as indicated at 12, or may be programmed to be activated at selected intervals or in response to certain conditions. For example, a motion detector may be utilized to activate the camera 10 in a surveillance installation. Once activated, the camera 10 captures a visual image in typical fashion through a lens (see lens 192, for example, in FIG. 7A). In the illustrated embodiment, the captured image is then transmitted to a gray scale bit map memory device 16, from which it is output to a half-tone conversion scheme 18 to be input into a binary bit map 20 for formatting the captured image in a configuration suitable for transmission via a Group-III facsimile system. The signal generated at 22 by the binary bit map 20 is input into a Group-III encoding and compression network 24 for generating an input signal at 26 which is introduced into a Group III protocol transmission device 28. The output at 30 of the transmission device 28 is then transmitted into any standard transmission interface such as, by way of example, hard line telephonic transmission, cellular transmission, radio signal, satellite transmission or other transmission system 32 via a modern or similar device, as needed, to be received via a compatible interface by a remote Group-III receiving system 34. The Group III receiving system 34 is a typical Group-III facsimile system comprising a Group-III receiver 36, decoder and decompressor 38 and binary bit map 40, from which a facsimile hard copy such as plain paper copy 42 may be generated.

This configuration is particularly well suited where real near time transmission is desired, for example when the system is operator controlled and a "real time" image is desired at a remote location. An example of such a system may be a photo identification confirmation of an apprehended suspect in law enforcement use, or transmission of images of damaged assets for insurance purposes, or transmission of images of construction job site conditions. This configuration is also well suited for use in those applications where a sensor activates the system and real time transmission of the sensed condition is desired. An example of such a system would be a motion activated camera in a surveillance location, where the image is immediately transmitted to a remote monitoring station. Of course, it will be readily understood by those who are skilled in the art that tagging a transmitted image with information such as, by way of example, date, time and location, can be incorporated in the transmitted signal so that a receiving station could monitor a plurality of remote image data capture systems. This is also useful for reviewing a body of previously stored or printed images to determine the time and location of such image.

Figures 2, 8A:
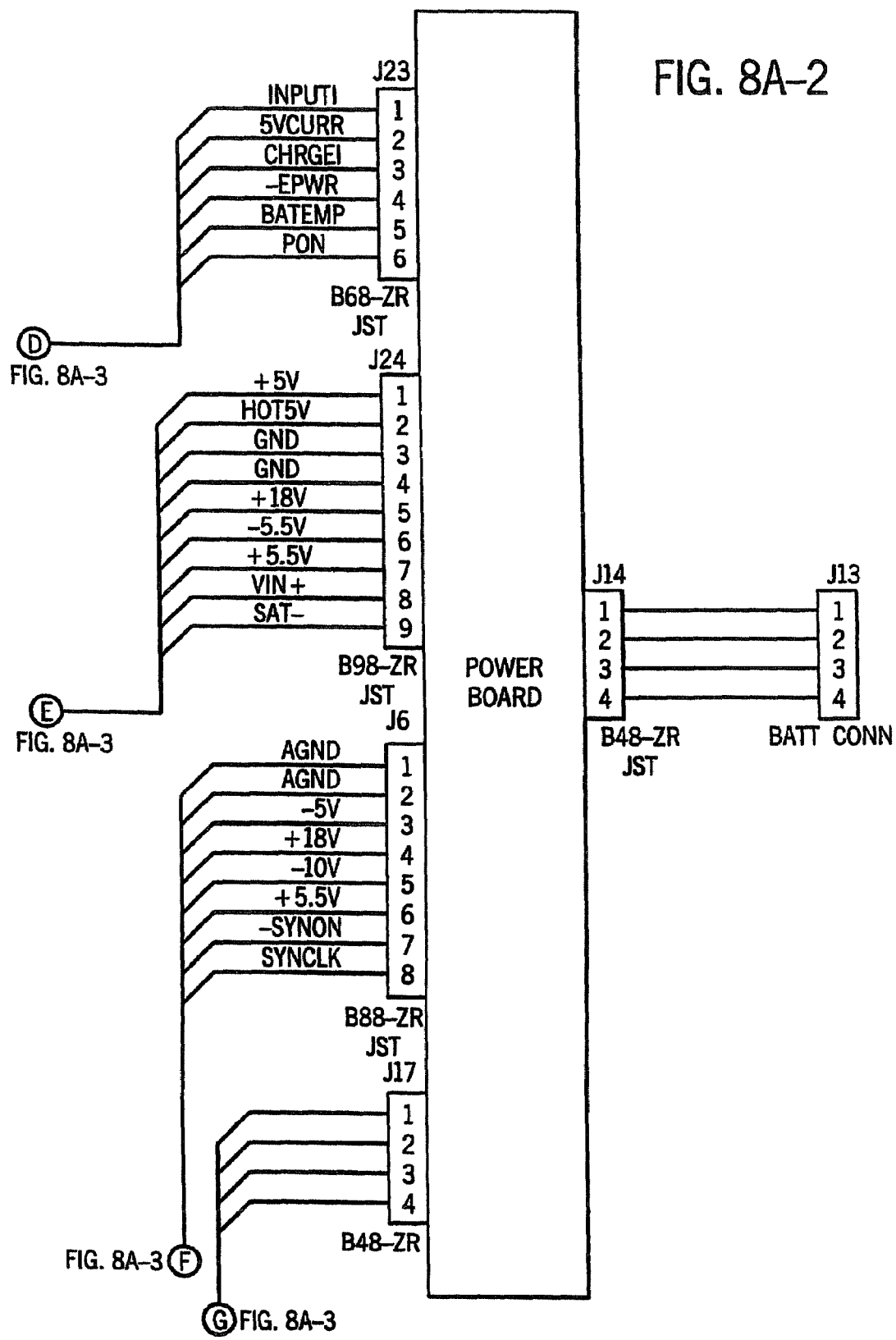

The embodiment of FIG. 2 is similar to FIG. 1, but incorporates a memory and optional operator viewer system. The image is captured by the camera 10 and conditioned by the gray scale bit map 16, as in FIG. 1. In this embodiment, the output 44 of the bit map 16 is input into a standard digital memory device 46 for later recall. This configuration is particularly well suited for applications where near real time transmission of the image either is not required or is not desirable. It will be noted that with the exception of the insertion of the memory device 46 and the optional viewer device 48, the capture and transmission system of FIG. 2 is identical to that shown and described in FIG. 1. Once the image is captured by the camera 10 and is presented at 44 to the memory device 46, it is stored for later recall and transmission. The specific type of memory device is optional and may include, for example, an SRAM device, a DRAM, Flash RAM, hard drive, floppy disk, PCMCIA format removable memory (see, for example, the PCMCIA card 72 in FIG. 7A), writeable optical media or other storage device. The memory may selectively capture images, as indicated by the operator interface/capture interface 52, or may be programmed to selectively capture periodic images or all images. In the embodiment in FIG. 2, an optional viewer device 48 is provided. This permits the operator to recall and view all or selective images before transmission, as indicated by the operator interface/recall interface 54. This permits the operator to review all images retained in the memory 46 and transmit selective images, as desired, to the Group-III transmission system. The remainder of the system of FIG. 2 operates in the same manner as the configuration shown and described in FIG. 1.

Figures 3, 8A:
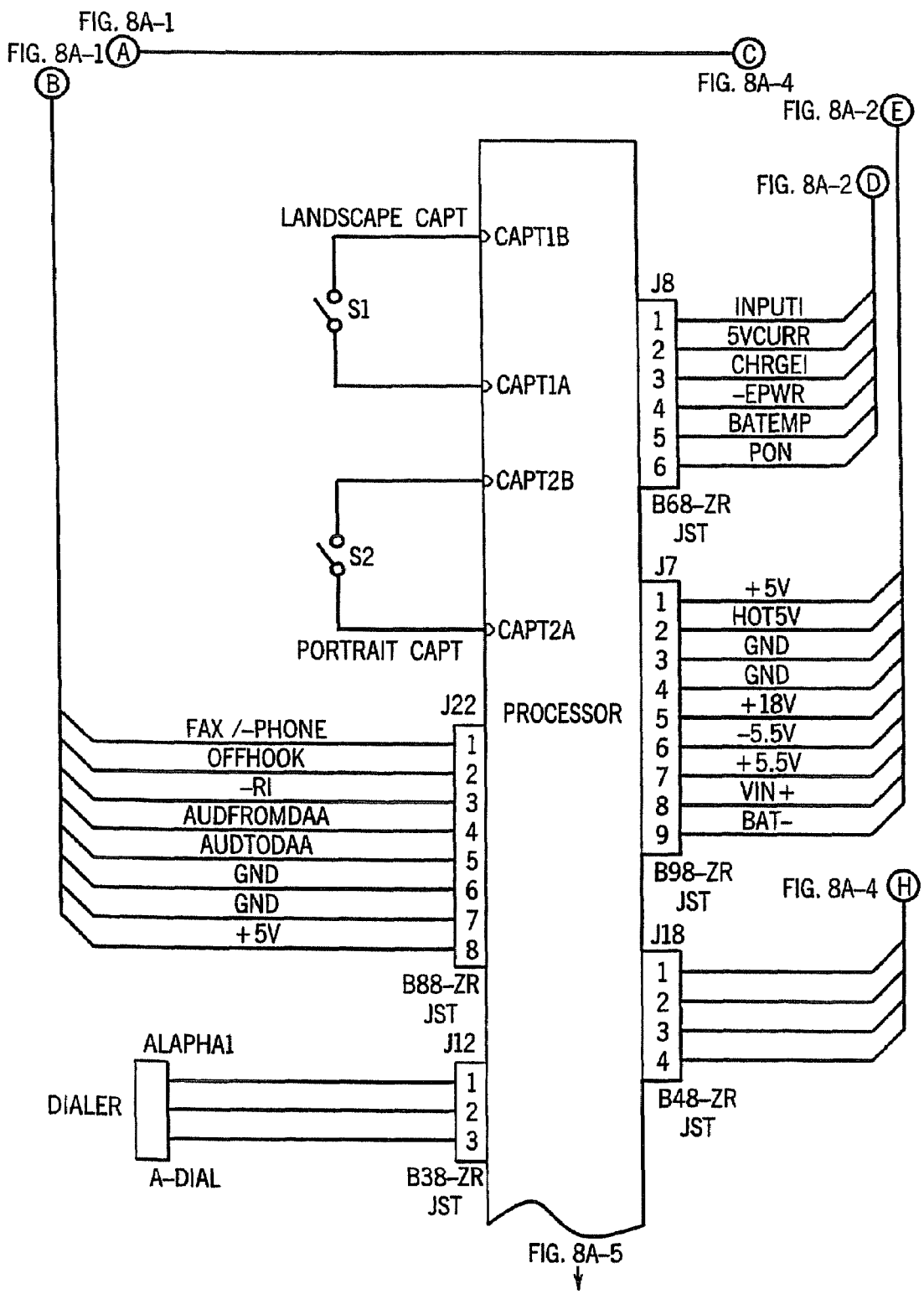
Figures 4, 8A:
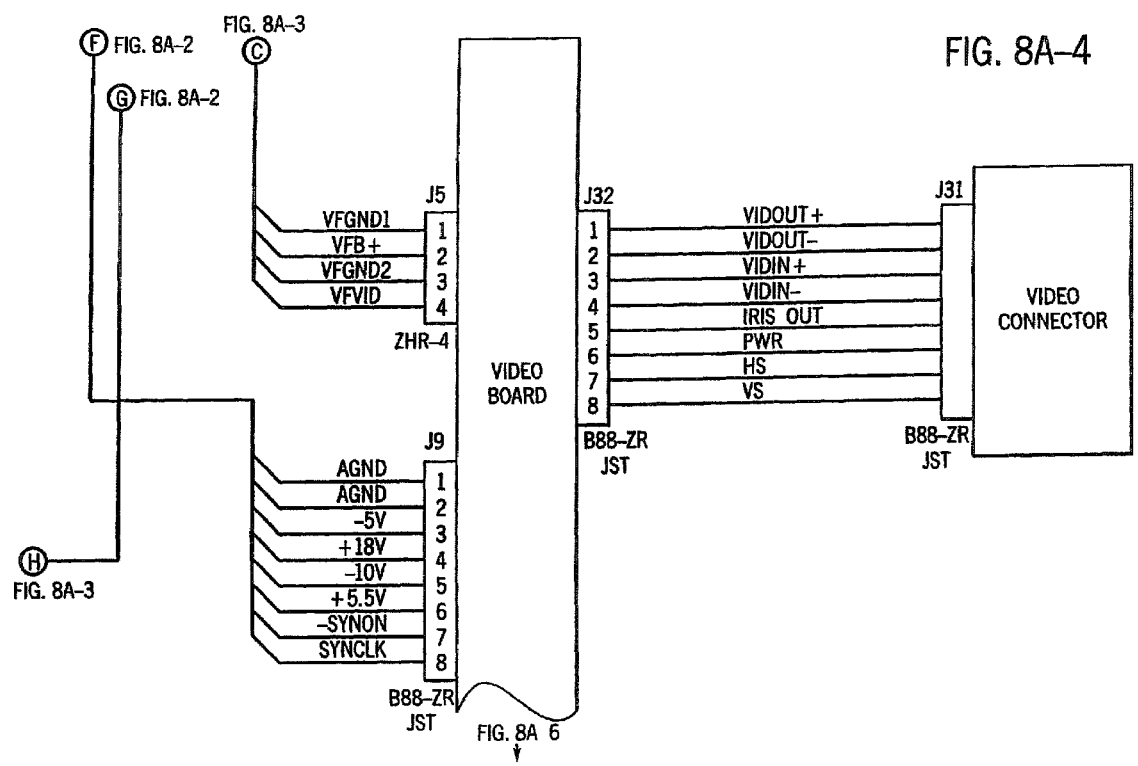
Figures 6, 8A:
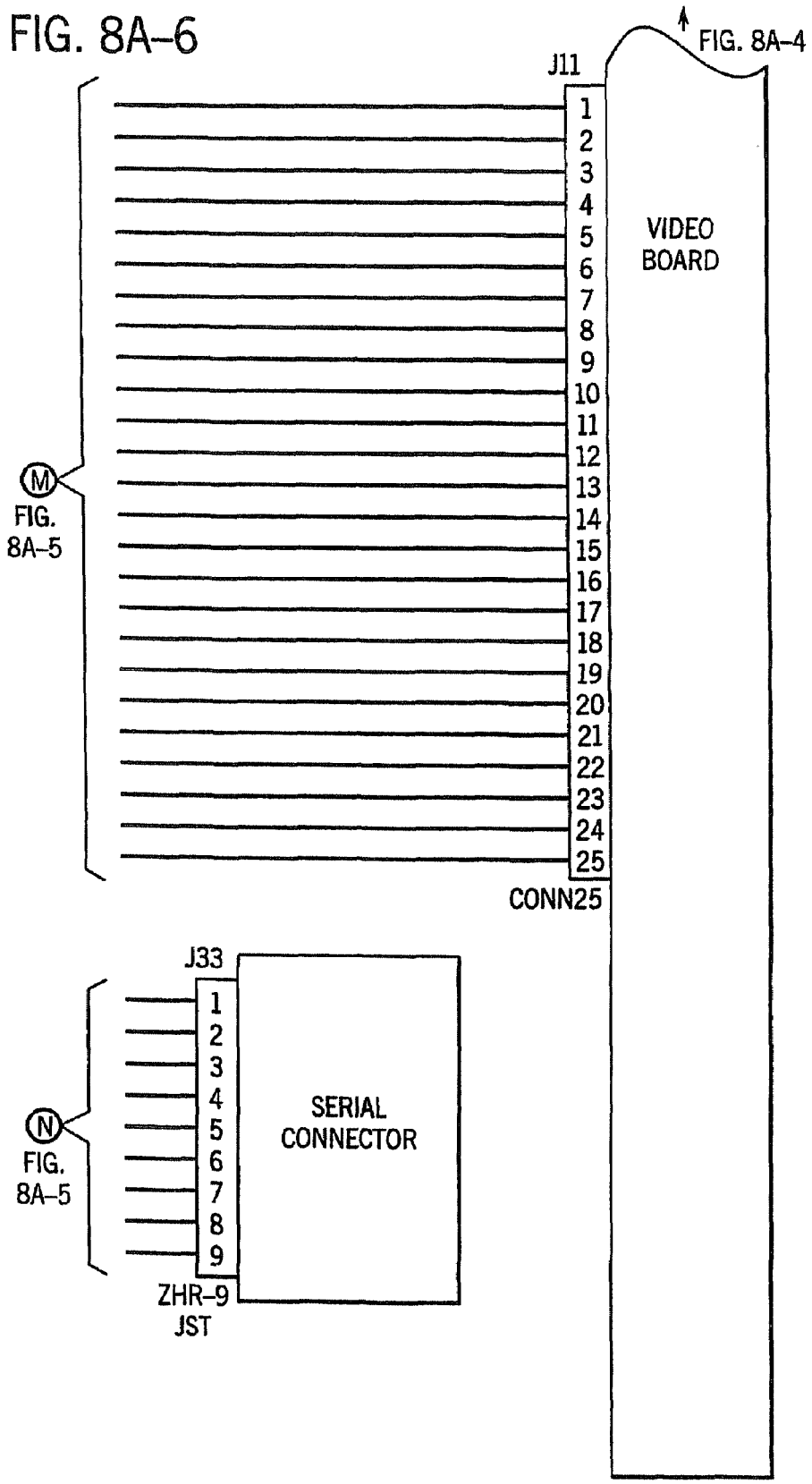
Figures 3, 8B:
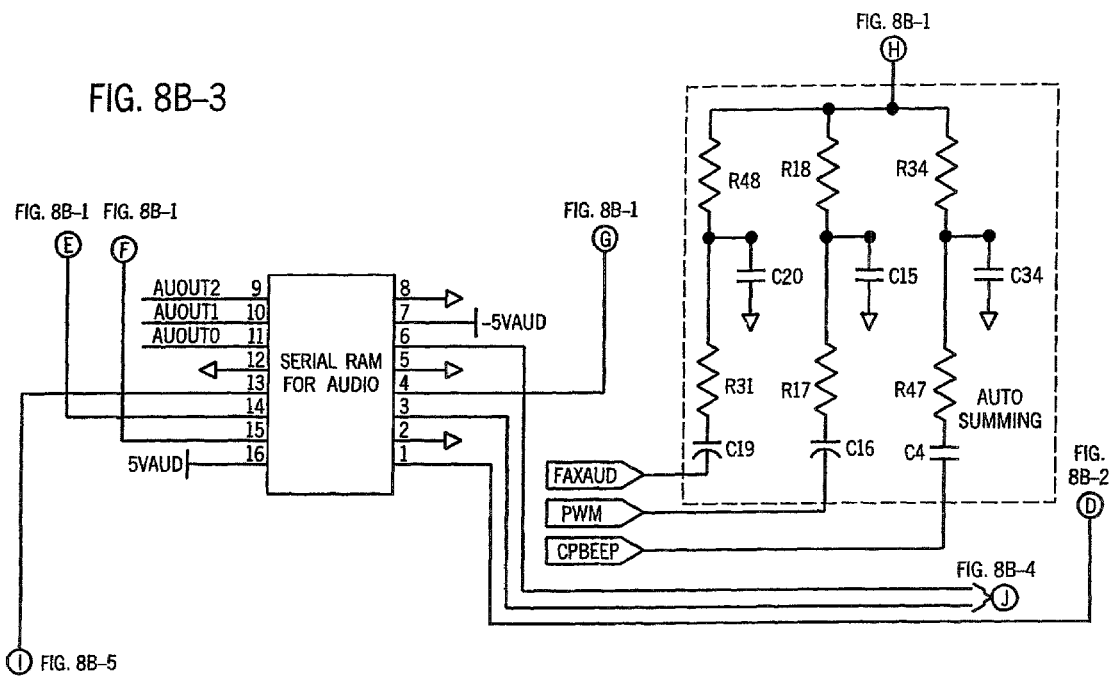
Figures 4, 8B:
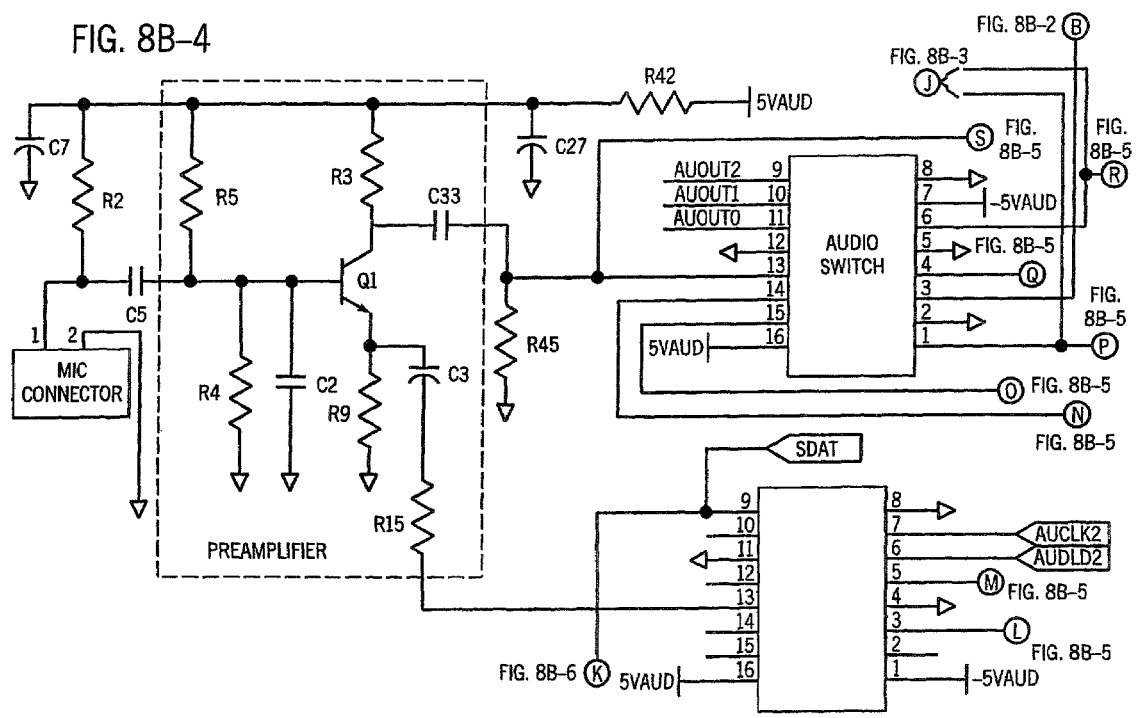
Figures 5, 8B:
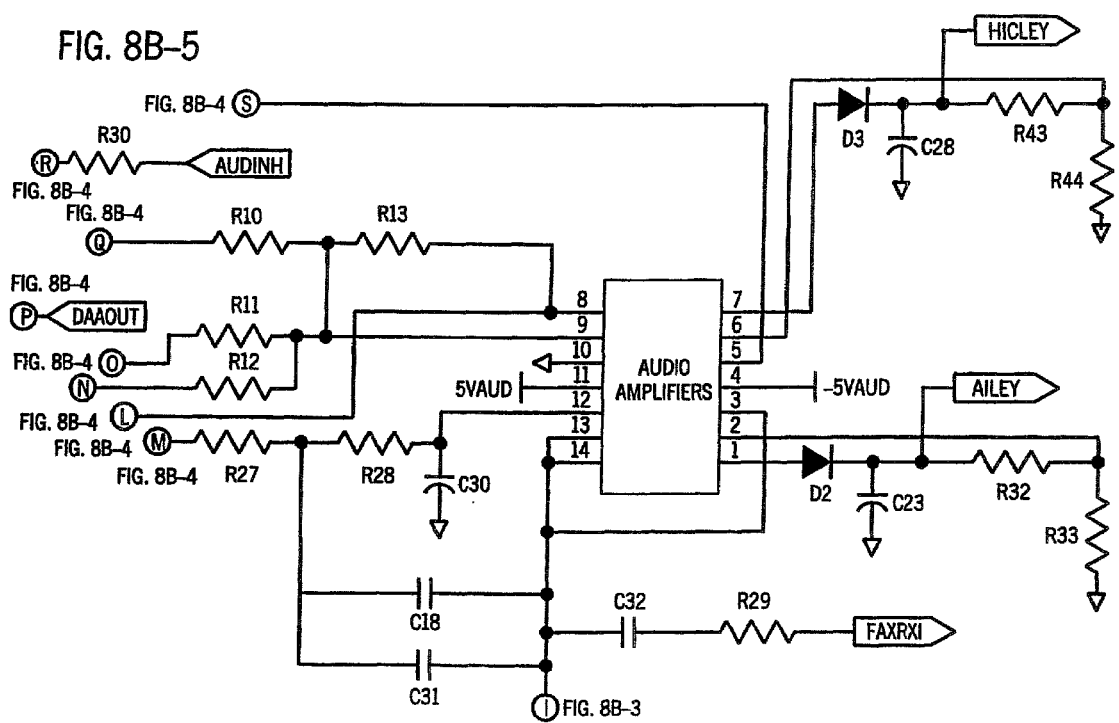
Figures 6, 8B:
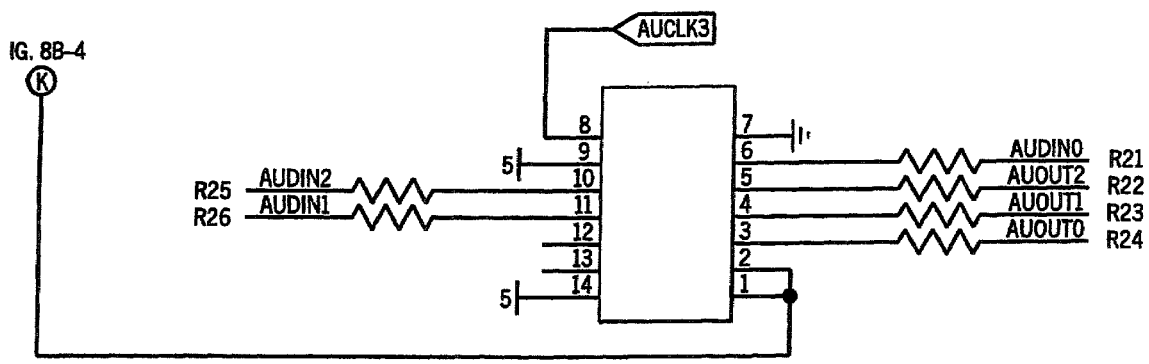
Figures 1, 8C:
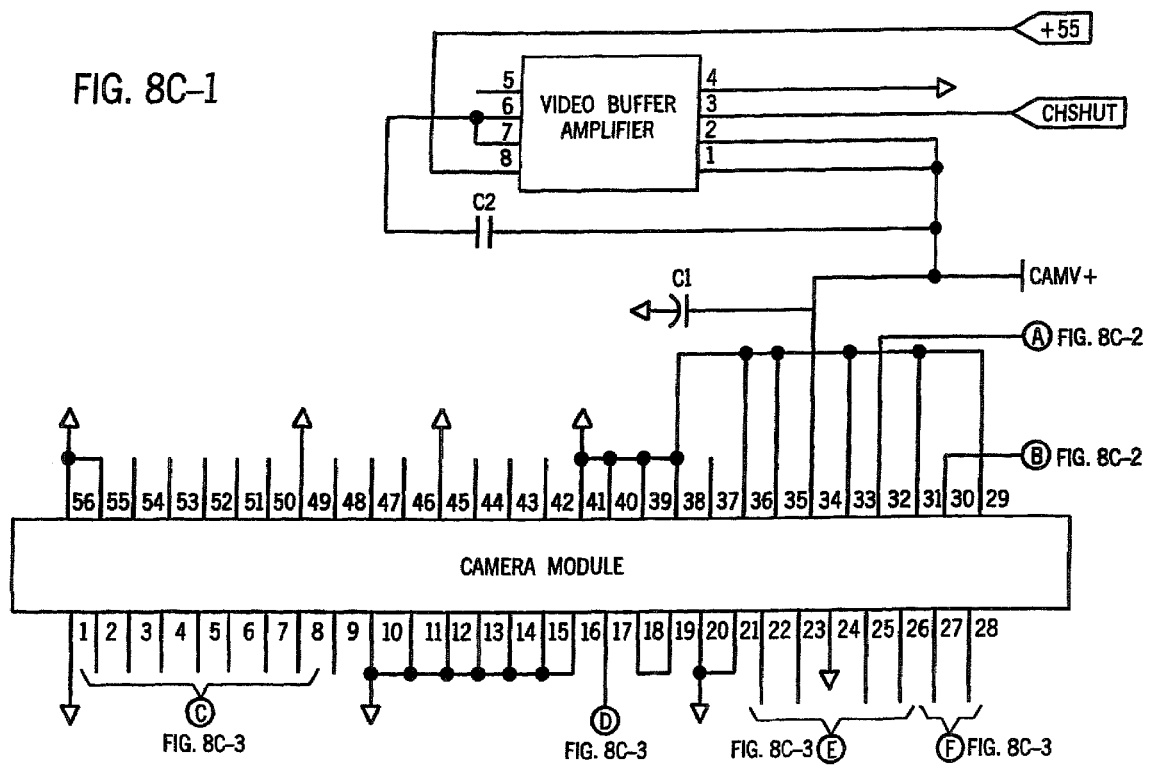
Figures 2, 8C:
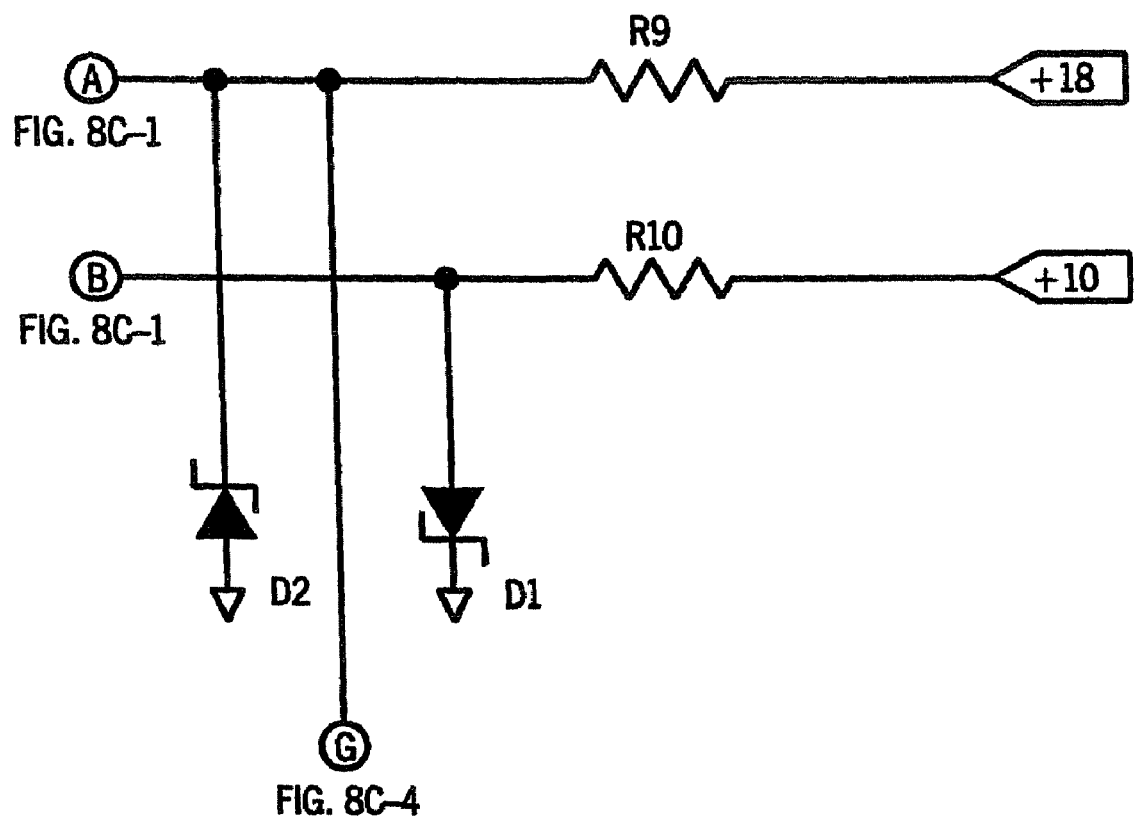
Figures 3, 8C:
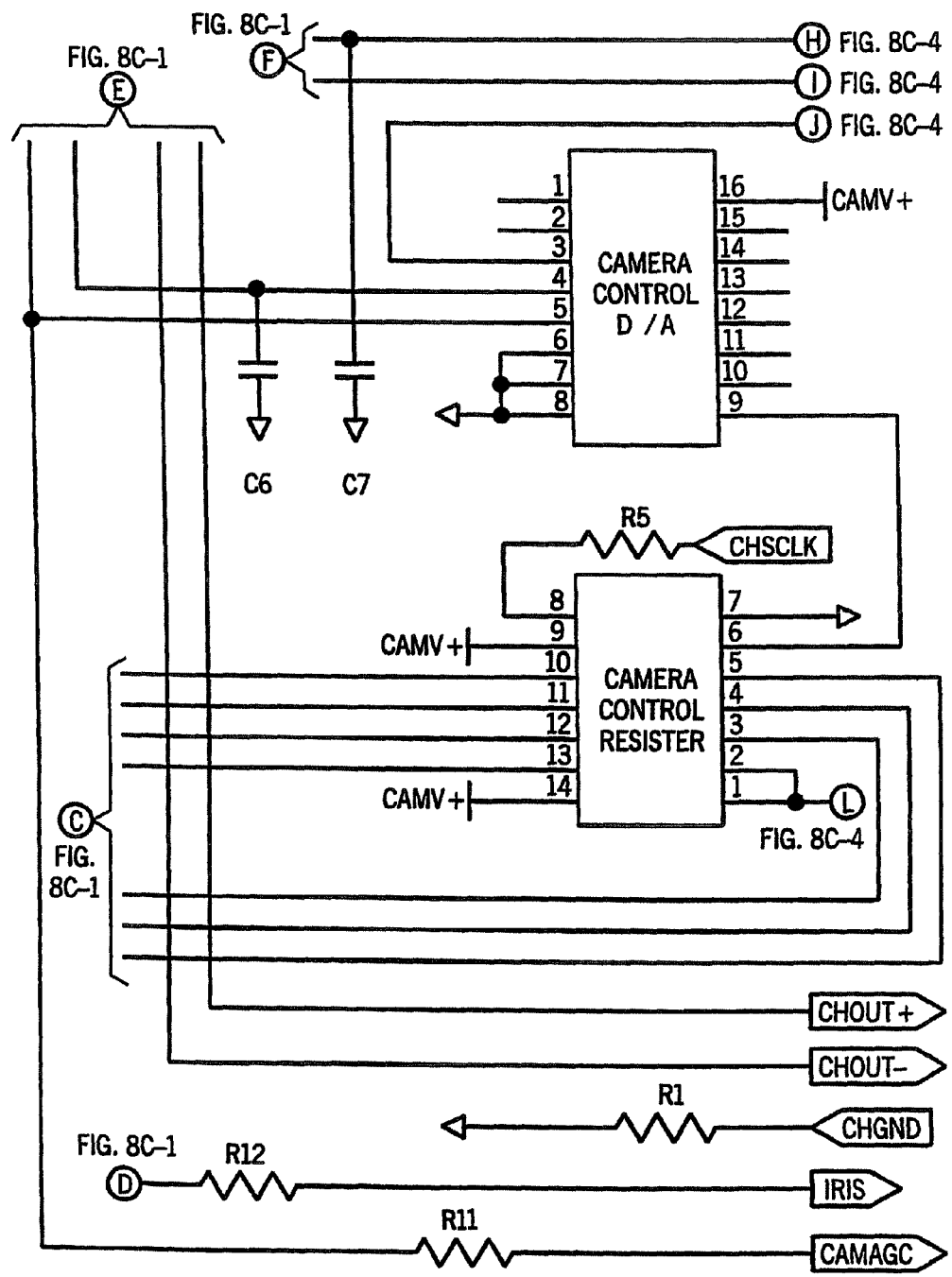
Figures 4, 8C:
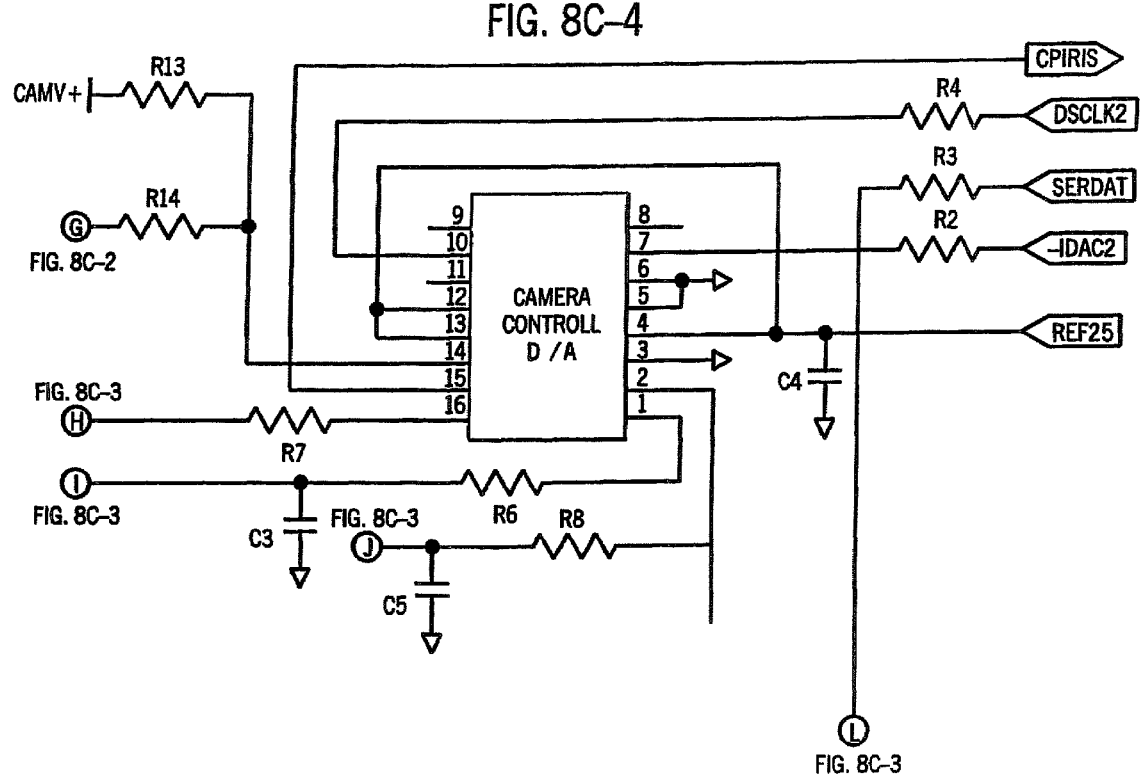
Figures 1, 8D:
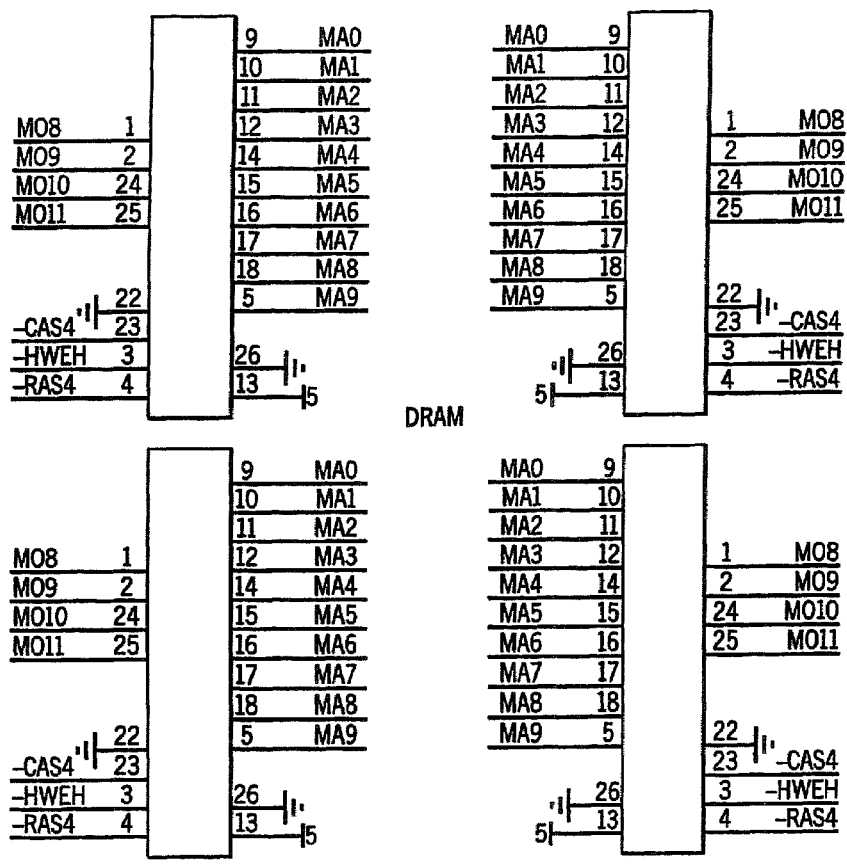
Figures 2, 8D:
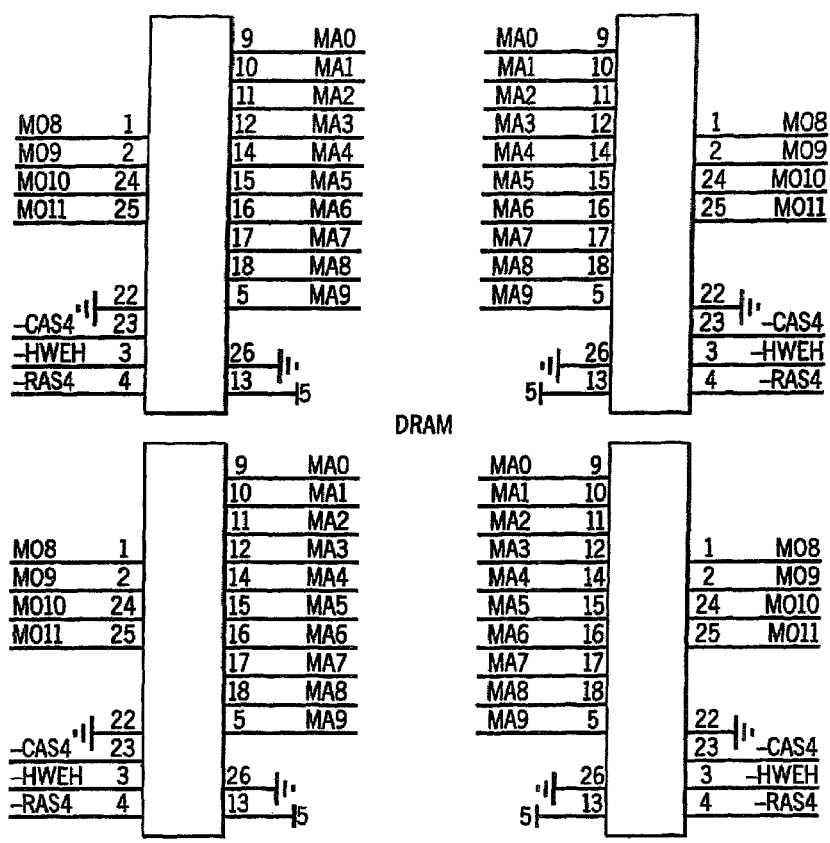
Figures 4, 8D:
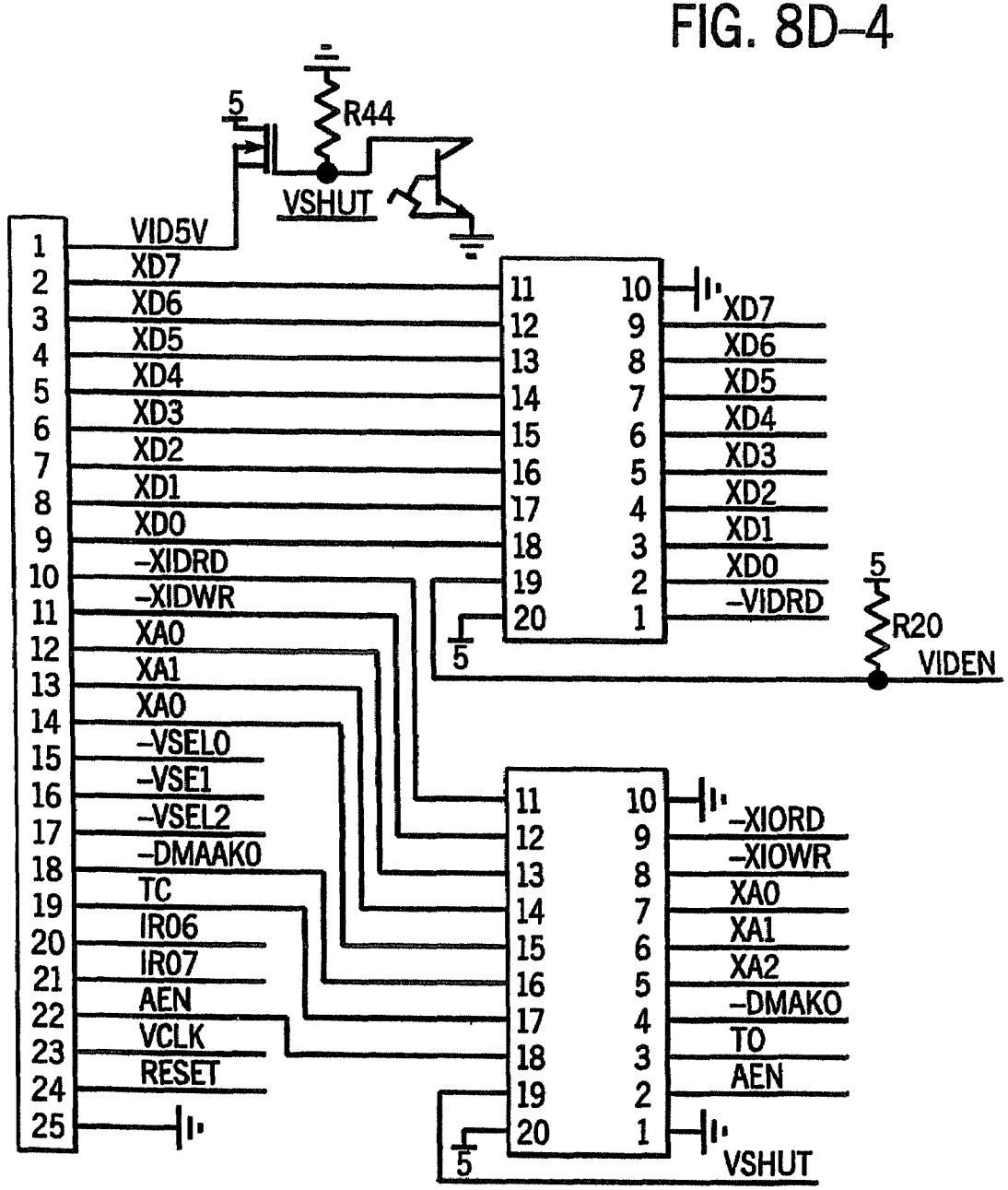
Figures 5, 8D:
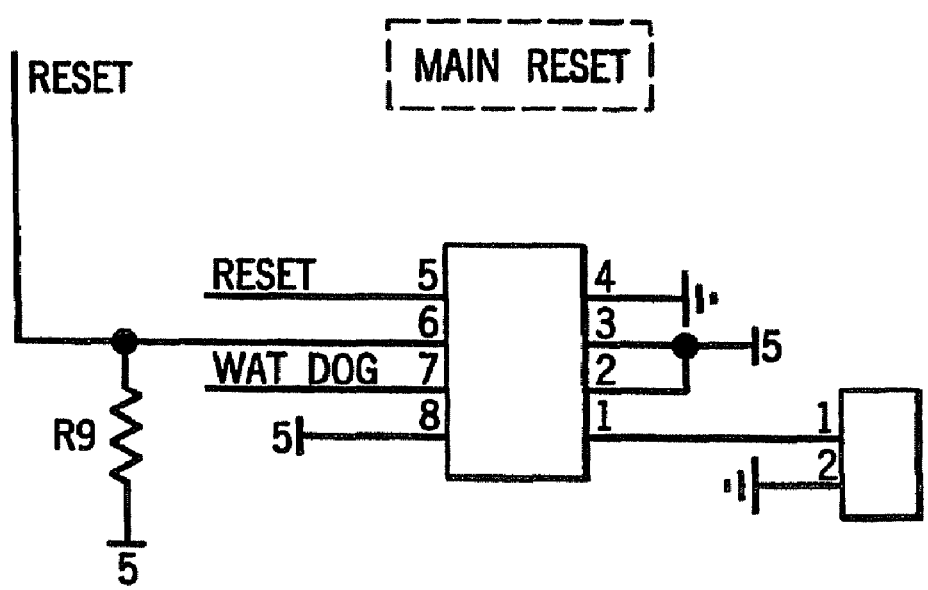
Figures 6, 8D:
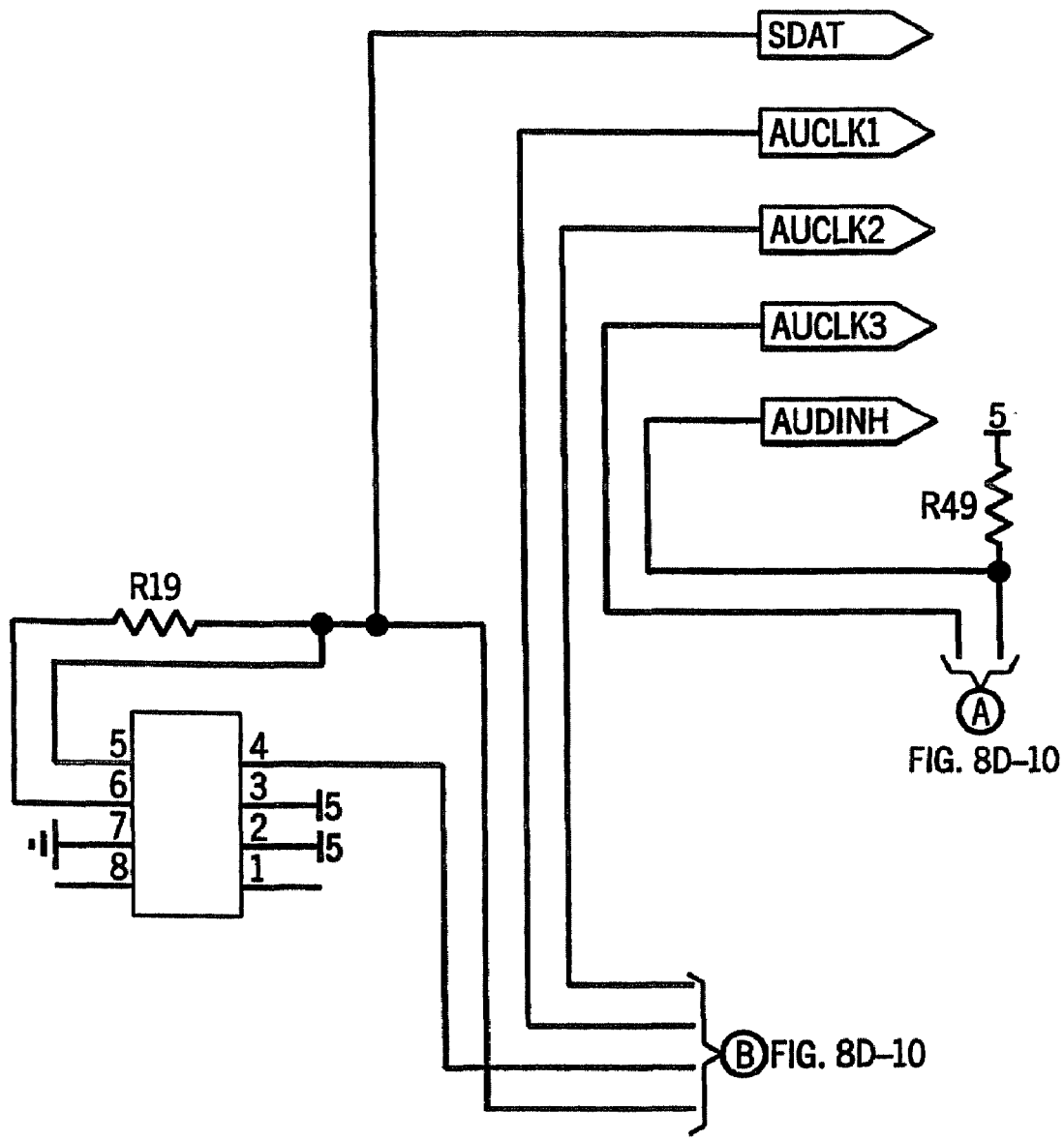
Figures 7, 8D:
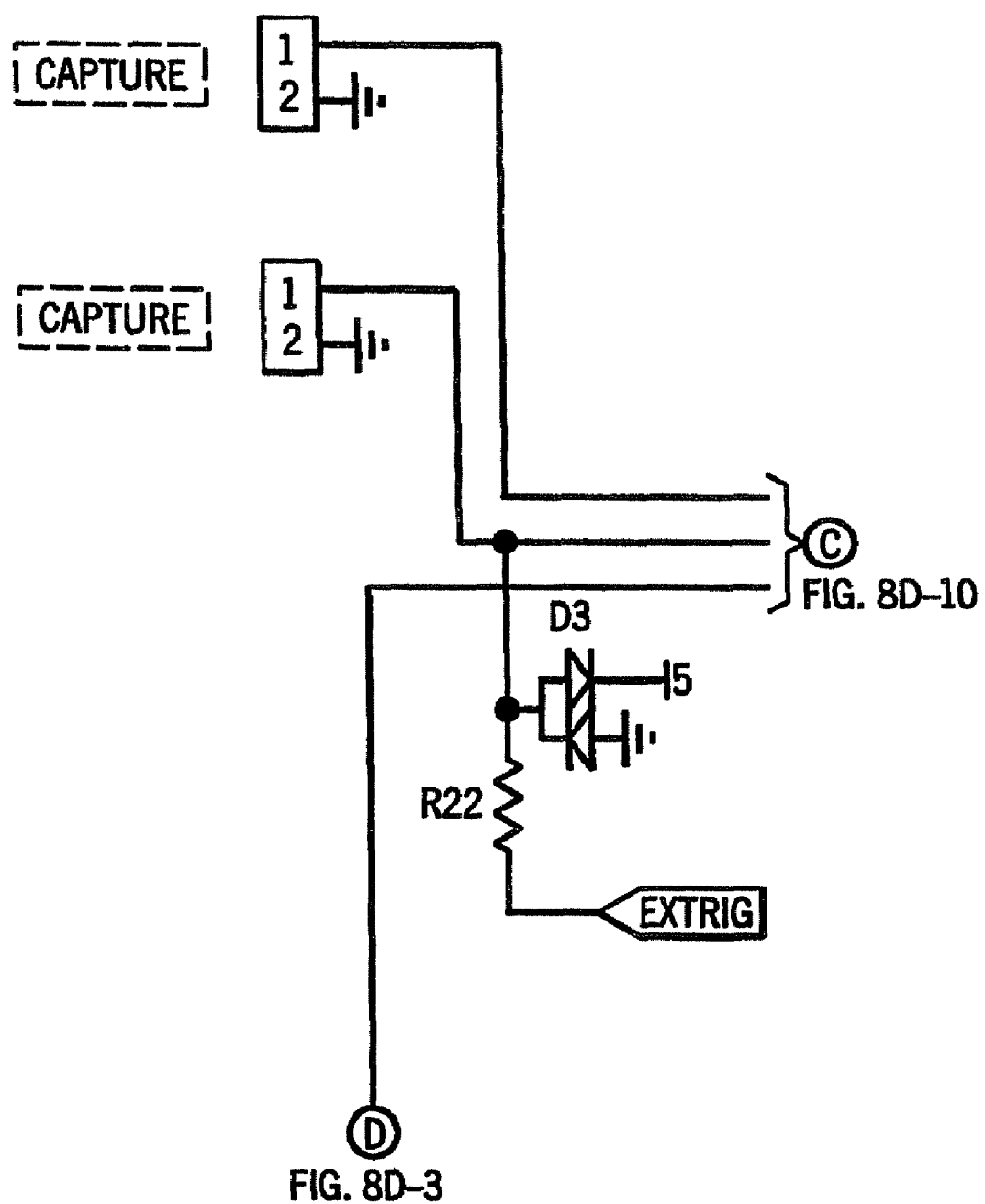

The configuration of FIG. 3 incorporates all of the features of FIGS. 1 and 2, and additionally, includes an interim data compression and decompression scheme to permit increased utilization of the memory or storage medium 46. As shown in FIG. 3, an interim format compressor 56 is inserted between the gray scale bit map 16 and the memory device 46. This permits compression and reduction of the data required to store the image, effectively increasing the capacity of the storage device. It is an objective of the storage device to preserve the gray scale quality of the image for viewing at the location of capture. An interim format decompression device 58 is inserted between the output of the memory device 46 and the rest of the system, whether the optional viewer 48 is utilized, or the output is entered directly into the half-tone convertor 18. The interim compression/decompression scheme is particularly useful when all of the image data is to be permanently archived, or when limited capacity portable media are used, such as, by way of example, floppy disks or a portable PCMCIA card. It will be noted that the remainder of the system shown in FIG. 3 is identical to the system shown and described in FIG. 2.

Figure 4:
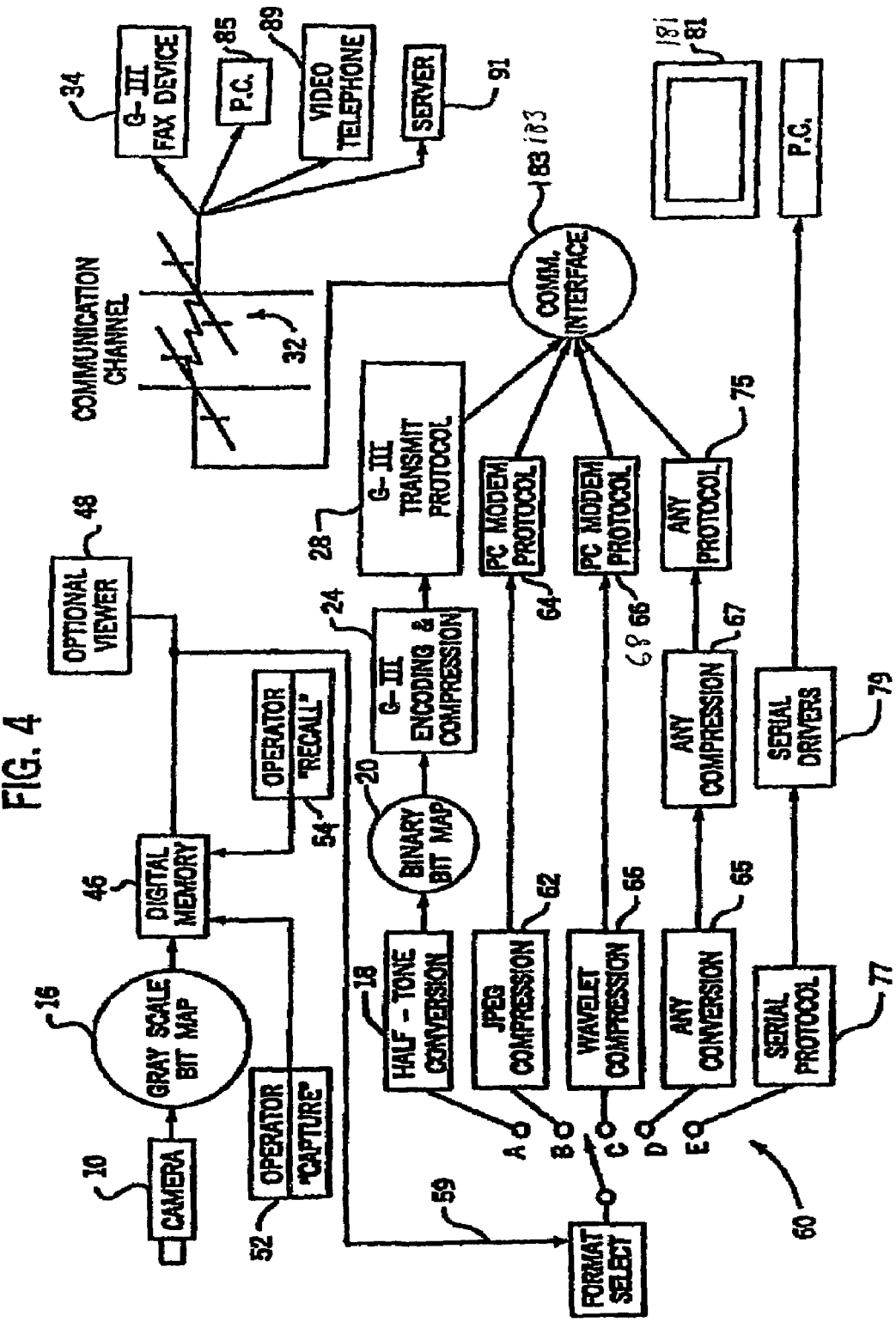
FIG. 4 includes the capture and transmission configuration of FIG. 2, with multiple transmission format capability including Group-III facsimile, personal computer, modem, parallel and serial transmission schemes.

FIG. 4 illustrates the use of the image capture and/or retention configured in any of the optional embodiments of FIGS. 1-3 and adapted for use in combination with any of a variety of transmitting and receiving schemes such as, by way of example, the Group-III system shown in FIGS. 1-3, a modem, direct connection to a personal computer, serial or parallel transmission, or any selected transmitting/receiving protocol. This illustration demonstrates the versatility of the system once the image has been captured, converted and conditioned by the image capture device of the subject invention. Specifically, once the image is captured by the camera 10 and conditioned by the gray scale bit map 16, it may be stored and transmitted, or transmitted "real time" via any transmitting and receiving scheme. As shown in FIG. 4 the image capture device includes the memory device 46 and the optional viewer 48 for incorporating maximum capability. However, any of the schemes of FIGS. 1-3 would be suitable for producing a transmittable signal. In the embodiment shown, a format select interface switch 60 is positioned to receive the fully conditioned signal on line 59. This would permit either automated or manual selection of the transmitting protocol, including the Group-III facsimile system previously described in connection with FIGS. 1-3, as indicated by selecting format select switch 60 position A; or PC modem protocol as illustrated by the JPEG compressor 62 and protocol generator 64, as indicated by selecting format select switch position B; or the wavelet compressor and PC modem protocol, as illustrated by the wavelet compressor 66 and PC modem protocol generator 68 by selecting switch position C; or any selected conversion network 65, (if needed) with a compatible compressor 67 (if needed) and compatible protocol generator 75 (if needed), as indicated by switch position D; or a serial protocol scheme 77, with serial drivers 79 directly to a hardwired personal computer 181 by selecting switch position E. Of course, it will be readily understood by those skilled in the art that one or a plurality of transmitting protocols may be simultaneously selected. Depending on the protocol selected, the signal output is generated at the selected output module and introduced to a communications interface module 183 via a modem or other device, as needed, for transmission via a transmission system to a compatible receiving station such as the Group-III facsimile device 34, the personal computer 85, the video telephone 89, and/or other server or receiving device 91 for distribution.

Figure 5:
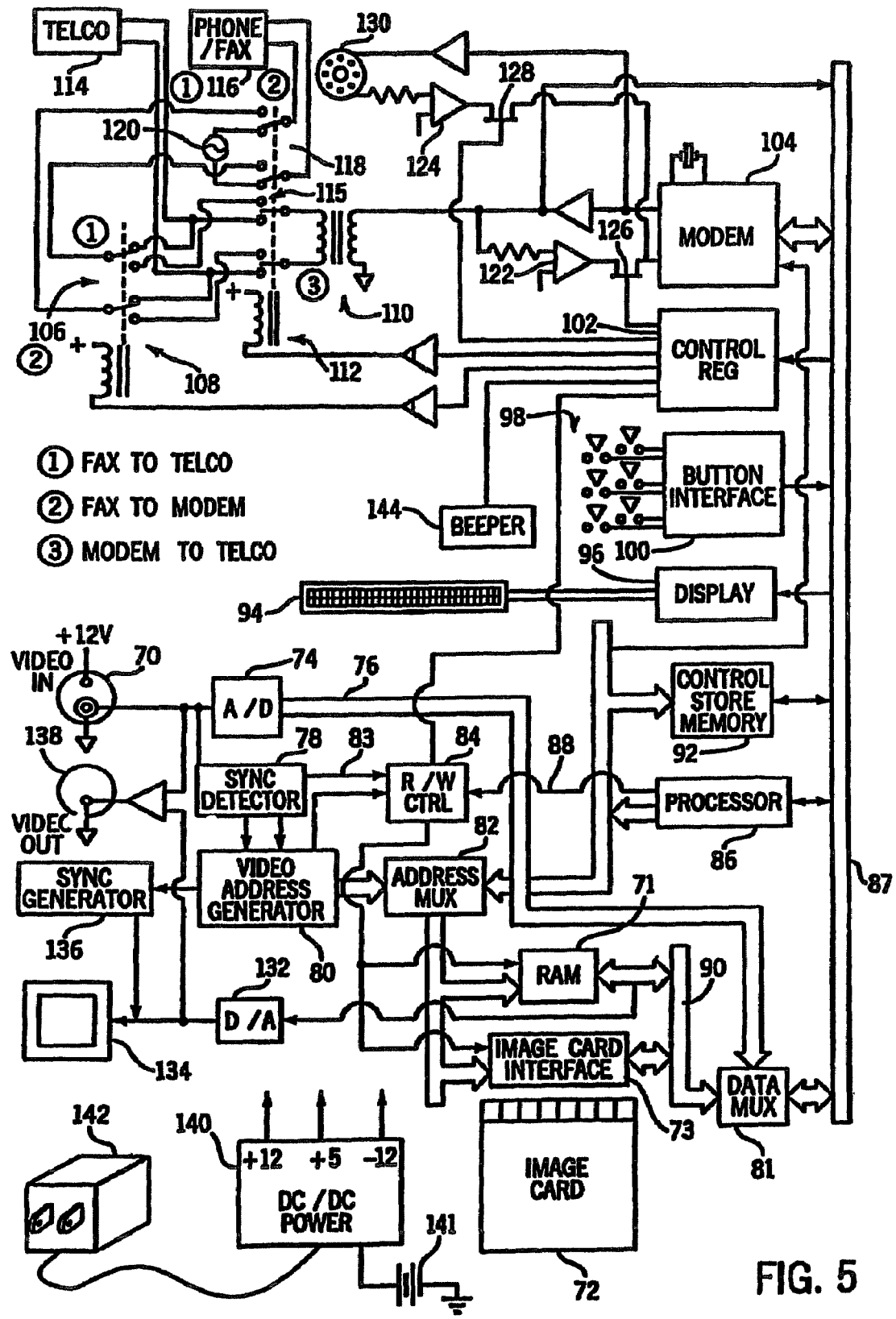
FIG. 5 is an exemplary schematic diagram supporting the configurations shown in each of FIGS. 1-4.

An exemplary circuit supporting the configurations of FIGS. 1-4 is shown in FIG. 5. With specific reference to FIG. 5, an analog camera is indicated by the "video in" signal at 70. Typically, the video signal is a composite video/sync signal. The diagram shows all of the signal processing necessary to sync up to an NTSC signal 70 coming out of the analog camera and processed for introduction into an integral RAM memory 71 and/or a portable RAM memory via interface 73. An analog to digital (A/D) converter 74 converts the video portion of the analog signal from the camera and produces the digital signal for output at line 76. The digital output data on path 76 is introduced into a data multiplexer circuit 81 and into the RAM memory unit(s) 71, 72. In the exemplary embodiment, the portable RAM memory 72 is an image card such as, by way of example, a PCMCIA SRAM card or a PCMCIA Flash RAM card. However, it will be readily understood that any suitable RAM memory configuration can be used within the teachings of the invention. It is desirable to store compressed rather than raw data in card 72 because of space and transmission speed factors.

As the signal at 70 is introduced into the circuit, the sync detector 78 strips the sync signal portion off of the video signal. The sync signal drives the video address generator 80 for providing a signal used to generate an address signal at the address multiplexer circuit 82 for synchronizing the scanned in video signal with the locations in RAM to define each frame to be captured. The read/write control 84 controls the coordination of the sync signal 93 with the video signal to define a full frame. Basically, when the camera is activated either by the operator or by automation, the system processor 86 detects the initiation of the camera and capture sequence and sends a signal via line 88 to the read/write control 84. The read/write control then monitors the incoming video signal 83 to find the horizontal and vertical sync pulse to identify the beginning of a frame. The read/write control then initiates writing to memory at the RAM devices to initiate capture of the frame. The read/write control continues to "write" to memory until the appropriate sync signal is received, indicating the end of the frame. At this point a single frame is captured in RAM 71 and/or on the portable medium RAM 72.

This frame may now be output from the system via any of the available transmitting schemes. In the exemplary embodiment, the processor 86 may be any processor or such as a microprocessor or DSP, with sufficient capability to perform the described functions. The processor bus is indicated at 87. The circuitry supporting the processor comprises the processor chip 86 and the control store memory (ROM, Flash RAM, PROM, EPROM or the like) 92 for storing the software program executed by the processor. It will be understood that other memory devices could be utilized without departing from the spirit of the invention. For example, a Flash RAM would permit flexibility and replacement of the program for upgrades and enhancements. The user interface commands are generated and interpreted by the software that is being executed by the processor 86.

The display unit 94 is connected through a typical interface 96, and provides visual user interface at the camera body to give the operator a visual read-out of the status of the collection and transmission of a selected frame. In the exemplary embodiment, the display unit is a two line, multi-character LCD display, but other sizes or technology displays could be readily incorporated, depending, for example, on the amount of graphics desired in the display module. The bank of operator buttons and/or switches 98 are connected to the system through the button interface 100.

The general purpose control register 102 serves as a latch and permits control bits to be introduced from the processor 86 to the transmitting systems or to transfer status bits from the transmitting systems back to the processor in the well known manner. The modem 104 may be any of a variety of widely available modems or modem chip sets currently in commercial use. The modem should support CCITT Group III fax format for transmission to Group III fax machines. Once the signal is introduced into the modem 104, it is handled in typical fashion to provide input/output transmissions: (1) from the subject device to a hardwired telephonic line as indicated at 114, (2) from the subject device to the external facsimile machine as indicated at 116, or (3) from the subject device to an external wireless device telephone as indicated at 130. The specific selection is controlled by the user at button module 98 in conjunction with the processor 86.

An isolation transformer 110 is provided to isolate the circuitry connected to external communications circuit from the circuitry of the subject device. The relays at 108 and 112 permit patching directly into the hardwired telephonic line and to the telephone company system as indicated at 114, to an external handset or fax machine at 116, or to the modem 104, whereby facsimile data can be sent and received via the modem. These relays could be mechanical or solid state. The relay 118 is connected to a tone source 120 for providing an audible tone signaling to the user that the system is being used for transmitting or receiving a captured image.

With specific reference to the circuitry associated with relay 112, it will be noted that when the handset is switched away from the phone line to the tone source, the modem transformer 110 is switched to the telephone line 114. This blocks normal audio telephone service and permits the transmission of an image signal from the RAM devices 71 or 72, through the modem 104, and to the telephone line 114.

In the exemplary embodiment, a stand alone facsimile machine can be connected through the external handset jack at 116. With relay 112 set to activate telephone service and the tone generator 120 disconnected, the relay 108 can be set in either of two positions. The first position, as drawn, connects the facsimile machine at jack 116 to the telephone line, permitting standard facsimile transmission. The second or alternative position permits the modem 104 to transmit the image data signal directly to the facsimile machine at jack 116, for providing an archive copy or the like. In this configuration, the facsimile machine will operate as a local printer for printing the captured images. Signal source 120 may be used as a ringing voltage generator for signaling such facsimile machine prior to connection.

The system of the present invention also contemplates wireless transmission over a cellular telephone, radio frequency, satellite transmission or the like. In the exemplary embodiment, the specific configuration for a cellular telephone interface is shown in detail. The amplifiers 122, 124 amplify the input of the modem 104 and are controlled by the FETs 126, 128, respectively. The FETs are controlled by the control register 102 and allow selection of the audio either coming in from the cellular interface 130 or from the telephone line 104 to the modem. This permits the cellular phone to be used for three distinct functions: (1) as an audio telephone, (2) as a transmitting system for transmitting the captured image and related signals via a cellular system, and (3) for receiving incoming transmissions to the processor. such as remote control, remote configuration, or images.

In the exemplary embodiment, the image card 72 is a DRAM card or non volatile storage card such as a Flash RAM or the like and provides a removable medium for storing the image data as either raw or compressed data. The card can also be used to store compressed data sent into the system via external facsimile transmission. As illustrated, the system is capable of both sending and receiving image data via Group-III fax or other protocol. By incorporating the digital to analog (D/A) converter into the system and pulling the signal from the RAM 71 (or portable RAM 72), the signal can be displayed right at the camera viewfinder 134 or other display device connected at port 138. A sync generator 136 is incorporated to provide synchronization of incoming data in the same manner. The sync detector 78 is utilized to define a frame-by-frame correlation of the data generated by the camera at the video input 70 for storage to memory 71 or 72.

Any standard power source may be utilized, including replaceable or rechargeable batteries 141, or an AC adapter 142. The AC adapter is particularly suitable for desktop applications.

The exemplary embodiment includes a speaker or other audio transducer 144 for emitting a detectable signal whenever the user interface merits its use, such as user induced errors, system errors, user attention getting and the like.

In order to send a facsimile transmission over a typical Group-III Facsimile system, the multiplexer 82 is switched to the processor 86 such that the RAM address is generated by the processor 86 instead of the video address generator signal. In the facsimile transmitting mode, the processor 86 addresses the RAM and manipulates the data representing each frame image. For example, the processor 86 will perform the gray scale to half tone conversion described in connection with FIGS. 1-4 to prepare the signal for facsimile transmission. The processor 86 can also perform image compression and output the image as a gray scale. In the facsimile transmission mode, once the half tone conversion is completed, the processor 86 executes a code for performing a bi-level compression of the data and the signal representing the frame data is output over line 90, through the multiplexer 81 and over the processor bus 87 to the processor 86, then to modem 104 for transmission. Other memory and processor configurations could be used without departing from the scope and spirit of the invention, as will be recognized by those skilled in the art.

Figure 7B:
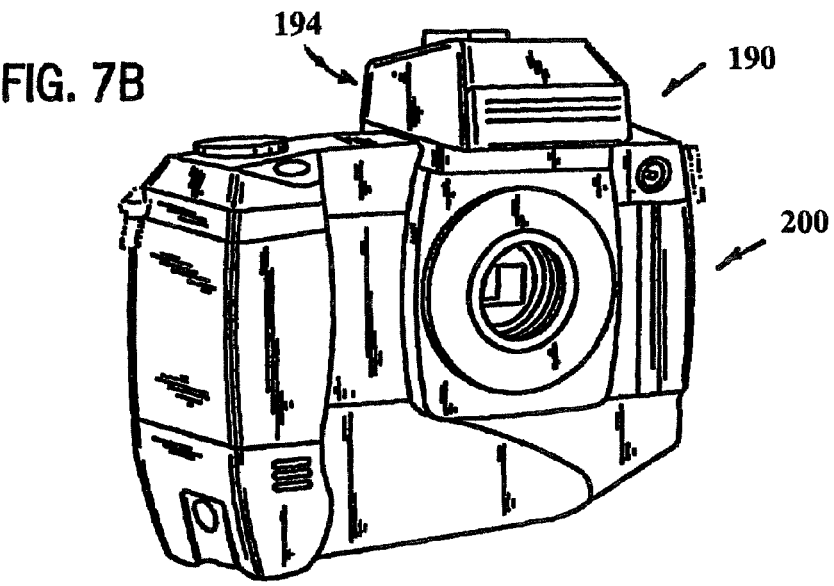

Various physical configurations of the invention are shown in FIGS. 7A & 7B. FIGS. 6A, 6B and 6C are block diagrams for desktop and portable units. FIGS. 7A and 7B illustrate the subject invention as incorporated in a standard 35 millimeter type camera housing.

A basic desktop system is shown in FIG. 6A, and includes a console unit having a telephone jack 152, an external telephone connection 154 and a video input/camera power jack 156 for connecting the analog camera 10. A facsimile machine may be also connected at jack 154 to provide local printer capability. The configuration shown in FIG. 6B is a basic portable system, with a battery powered portable module 160 having a self-contained power source 162. The system may include an integral RAM and/or the removable memory module as indicated by the image card 72. The camera 10 may be an integral feature of the portable module 160, or may be a detached unit, as desired. In this embodiment, a cellular telephone 164 is provided with a data jack 166 for connecting to the output jack 168 of the module, whereby the image data signal may be transmitted via the cellular telephone to a remote facsimile machine over standard cellular and telephone company facilities. When incorporating the circuitry of FIG. 5, the cellular phone may be used as both an input and an output device, and incoming data or stored images may be viewed through the viewfinder 170.

FIG. 6C shows a comprehensive desk or stationary configuration incorporating all of the features supported by the circuitry of FIG. 5. As there shown, the control module 172 is adapted for receiving the image card 72 and is powered by an AC power adapter as indicated at 142. The camera 10 is connected to the module via a hardwired connection at jack 174. A monitor 176 is provided for viewing data images. A video cassette recorder 178 is provided and may be used as an auxiliary input device for the images transmitted from the system. The facsimile machine 180 can be used as a local printer, or can be used to send facsimiles transmissions in the well-known manner. Direct connections to the telephone line system are provided at jack 182. The FAX/phone jack 186 can be connected to a facsimile machine 180 and/or a standard telephone 184, where the public telephone system can be accessed. A data jack 188 is used to connect to a cellular telephone or the cellular modem, or other wireless device for transmission or reception of image data.

Figures 8, 8D:
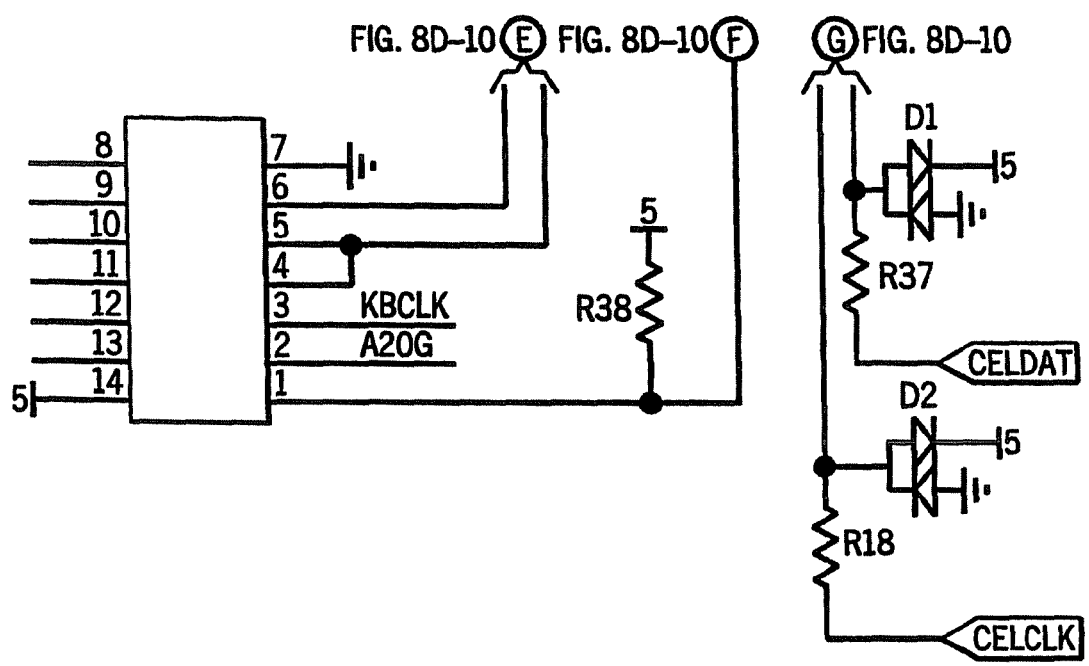

Turning now to FIGS. 7A and 7B, the camera body 190 is similar to a standard 35 millimeter camera housing and is adapted to receive a standard lens 192 with a viewfinder 194. The electronics are housed in the casing in the area normally occupied by the film and film advancing implements. The operator interface button keys 98 are housed within the housing and may be positioned on the back plate 196 of the body. FIG. 8. The LCD unit may be positioned to be visible through the viewfinder 194 or may be in a separate back window 198. The memory card 72 is positioned in a slot 200 provided in a sidewall of the camera body. This camera has the appearance of a standard SLR 35 millimeter camera. In addition, where desired, an integral cellular phone can be incorporated in the camera housing and transmission can be sent directly from the camera housing to a remote receiving station. The keypad for the telephone is indicated at 202.

FIG. 8 is an illustration of an exemplary schematic diagram for the circuit of a system according to the teaching of the invention as specifically taught in the diagram of FIG. 5. Pin numbers, wiring harnesses and components are as shown on the drawing. FIG. 8, part A, is the system interconnect and shows the central processor board 300, the video board 302, the power board 304 and the CRT electronic interconnect board 306. The telephone interface is provided at 307. Board 308 is the audio connector board. Board 310 is the serial connector board and board 312 is the video connector board. FIG. 8, part B contains the audio logic, with audio I/O at 314. The audio amplifiers are designated 316 and 318. A microphone connector is provided at 320, with preamplifier circuit 322. Audio switches are provided at 324 and 326. Summing circuit 328 provides audio summing. The serial RAM for audio is designated 330. FIG. 8, part C includes the camera module 332 and the camera control digital to analog convertor 334. Amplifier 336 is the video buffer. Module 338 is the camera shutter control resistor.

FIG. 8, part D contains the central processor unit 340. Voltage in is at 342, with the power switch at FET 344. Power shutdown is provided at the video shutdown bit 346. The video connector is designated at 348. Pin I is switched five volts out to video logic. Pins 2-9 are connected to the video data bus and pins 10-22 are video control signals. Buffers 350 and 352 are the video board I/O isolation buffers. As shown, pin 19 of buffer 352 is the output enable and is connected to the video shutdown bit 346. Line 354 is bus enable. Pin A0 of buffer 350 is the direction control signal and pins A1 A7 are connected to the processor data bus. Pins 10-17 of buffer 352 are also connected to the processor bus.

The system DRAM memory is designated 356. The processor I/O module is designated 358 and the I/O decoder is provided at 360. A non-volatile RAM 362 provides system parameters. The processor oscillator is shown at 364 and a real time clock at 366. Controller 368 is the RAM card controller. The PCMCIA socket for the RAM card is shown at 370a and 370b. The modem is designated 372. The serial controller is shown at 374 with serial controller oscillator 376. Module 378 is a memory module. A signal buffer is provided at 380, and an address decoder at 382. Connectors are designated at 384, 386 and 388.

FIG. 8, part E shows the modem board connector at 390, the glue logic PLD at 392 and the glue logic module at 394. Module 396 is the synchronous/asynchronous serial controller. Circuit 398 is the signal multiplex relay and circuit 400 is the transmit/PTT relay. Bypass relays are shown at 402. Relay 404 is the digital mode relay. Transformer 406 is the audio isolation transformer. Circuit 408 provides a low speed data filter. The line drivers are designated 410 and the line rectifiers are designated 412, respectively. Connector 414 provides radio/serial data connection.

FIG. 8, part F shows the status LED's 416 and the PCMCIA door open switch 418. FIG. 8, part G shows the power switches 420. FIG. 8, part H is the battery pack 422.

FIG. 8, part I is the power supply. The rechargeable battery connection is shown at 424, with DC power input at 426. An internal battery/external DC input transfer relay is provided at 430. The signal for the power switch on the removable disk drive access door is on pins 3,4 of connector 428. The voltage IN regulator is designated at 432, with the processor voltage regulator designated 434. The processor power control bit is at 436. The system power control bit is at 438, with the system voltage regulator at 440. The video power control bits are at 442 and 444, with the video voltage regulators at 446 and 448, respectively. Battery 450 is the real time clock battery. Connector 452 is the battery charger connector. Connector 454 connects processor power, system power, regulated battery power and real time clock power, as shown. Connector 456 connects video power. The power sequencer circuit is at 458.

FIG. 8, part J shows the direct access arrangement to a land line telephone at 460 and the video viewfinder circuitry (CRT electronics) at 462.

FIG. 8, part K is the video control circuitry. The video input amplifier is designated at 464. The composite video sync stripper is designated at 466. The video H/V timing pulse generator is at 468 and the video phase lock loop at 470. The register 472 is the video control register. Circuit 474 provide programmable video filters—edge enhancers, with the FET switch designated at 476. The video filter circuit is at 478 and the video filter is at 480. The video reference digital to analog circuit-is shown at 482, with the video analog to digital circuit at 484 and the video analog to digital data out buffer at 486. The voltage reference circuit is designated at 488.

FIG. 8, part L, shows the push button control switches as 490 and 492. The keyboard display is designated 494, and the microcontroller 496 is the keyboard and keyboard display microcontroller. The backlight circuitry is designated at 498, with the back light control at 500. Module 502 is the LCD module.

The circuitry supports any of the preferred configurations from a basic real time transmission system via Group-III fax to a comprehensive system supporting both land line and wireless transmission of image, audio and documentary data at both a local and remote station.

The subject invention also permits digitized collection of audio signals through the use of an internal microphone, and external input device, a cellular telephone, land line telephone, wireless radio or other communication system, and digitized audio playback, as well. The playback can be via an internal speaker, out an external out jack to a remote device or via a cellular telephone, land line telephone, wireless radio or other communication system.

The digitized image and audio capture features permit association of audio with an image, as well as data with the image. Useful data associated with the image includes GPS from either internal or external GPS devices, date and time, and text which may be input from an integrated keyboard or from a remote location.

It is an important feature of the invention that the system supports storage of images in an interim storage format including raw video, interim gray scale format and/or half tone format. The image can also be stored in the selected output mode, such as by way of example, a Group III facsimile mode. The versatile capability of the system permits transmission of captured data to a standard bi-level facsimile machine such as Group III, to gray scale facsimile systems or full color facsimile systems, as well as to other remote receiving devices such as, by way of example, personal computers and network servers. The data may be transferred in any of a variety of formats and protocols including JPEG, FAX, emerging imagery formats, wavelets and data protocols. The invention is adapted to operate in multiple modes, with a unitary capture and send mode or separate capture and store, and send modes. In the preferred embodiment, the system is adapted for tagging a collected image, video, audio, and other data such as a GPS signal, with a real time clock and added text. This permits the complete historical data to be transmitted simultaneously with the image signal.

It is contemplated that the system of the invention would be self-contained with an integral power unit such as a rechargeable battery source or the like. Therefore, the system is adapted to power up when in use and power down when not activated, preserving power during idle time. The power systems for the video camera, the video input circuits and converters, the modem or other transmission devices and other high drain components may be isolated and only powered when needed. This also permits use of ancillary functions, such as use as a cellular telephone, to proceed without draining the power source by powering idle components. The processor clock rate may also be slowed down during idle mode to further conserve power.

Where desired, the system also includes camera operation control capability through the use of a digital/analog network for converting digital commands to analog signals for controlling the gain, pedestal, setup, white clip, lens focus, and other functions of the camera from a local input device, a remote device or as programmed functions. The central processor may also be used to control camera shutter rate. Other camera features and parameters which may be controlled in this manner are compressor resolution (high, medium, low), field/frame mode, color or monochrome, image spatial resolution (640×430, 320×240, for example), lens and camera adjustments, input selection where multiple cameras are used and the like.

When an integrated communications device is used, such as by way of example, a cellular telephone, the telephone can be isolated from the rest of the system to permit independent use, and independent power up and power off and other cellular phone functions.

In operation, the system permits not only the manual capture, dial (select) and send of images, but may also be fully automated to capture, dial and send, for example, on a timed sequence or in response to a sensor such as a motion sensor or from a remote trigger device. The remote trigger may be activated by an incoming telephone signal, for example. The remote device may also be use for remote loading and downloading of firmware, and of the programmable devices, as well as to provide remote configuration of sampling modes during both the capture and the send functions.

Figures 8, 8D, 9:
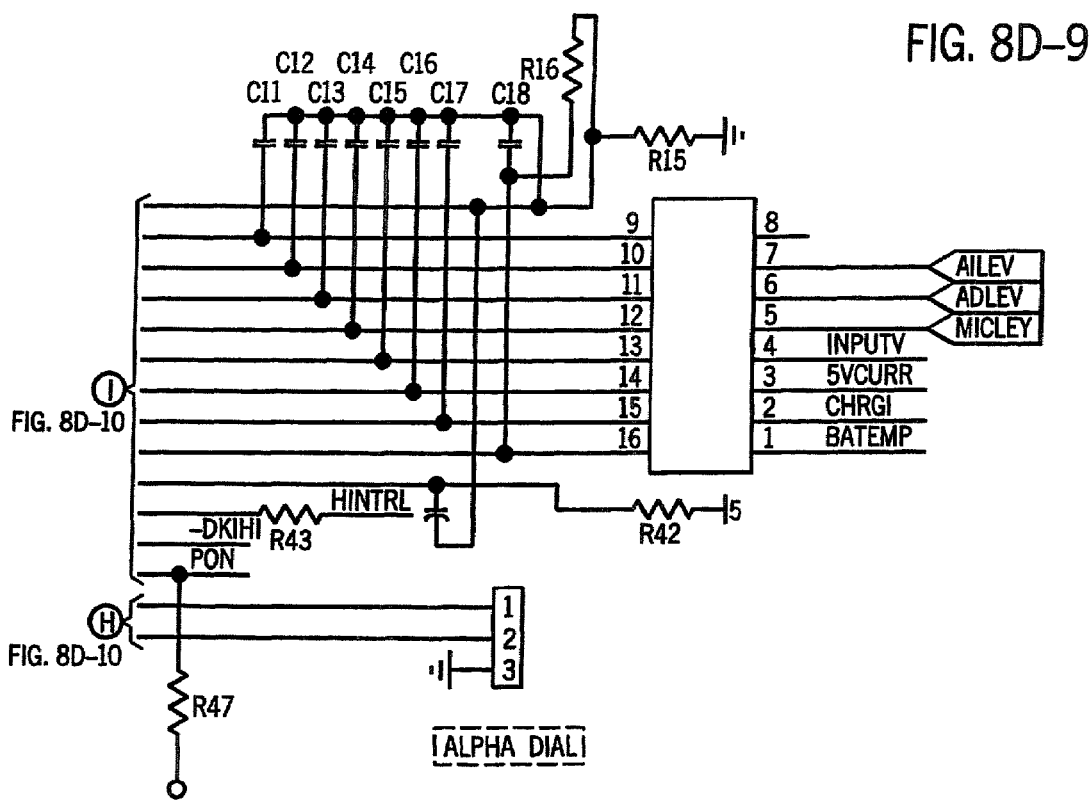
Figures 8, 8D, 9, 10:
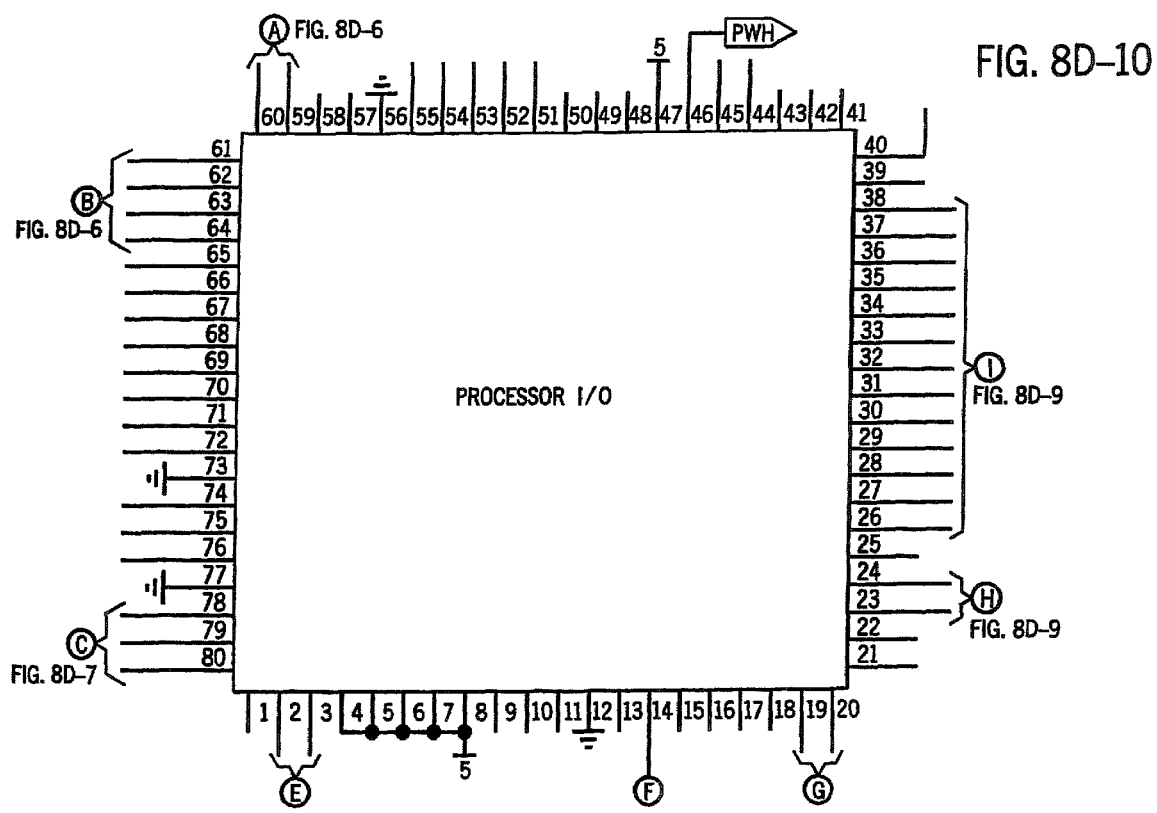
Figures 8, 8D, 9, 10, 11:
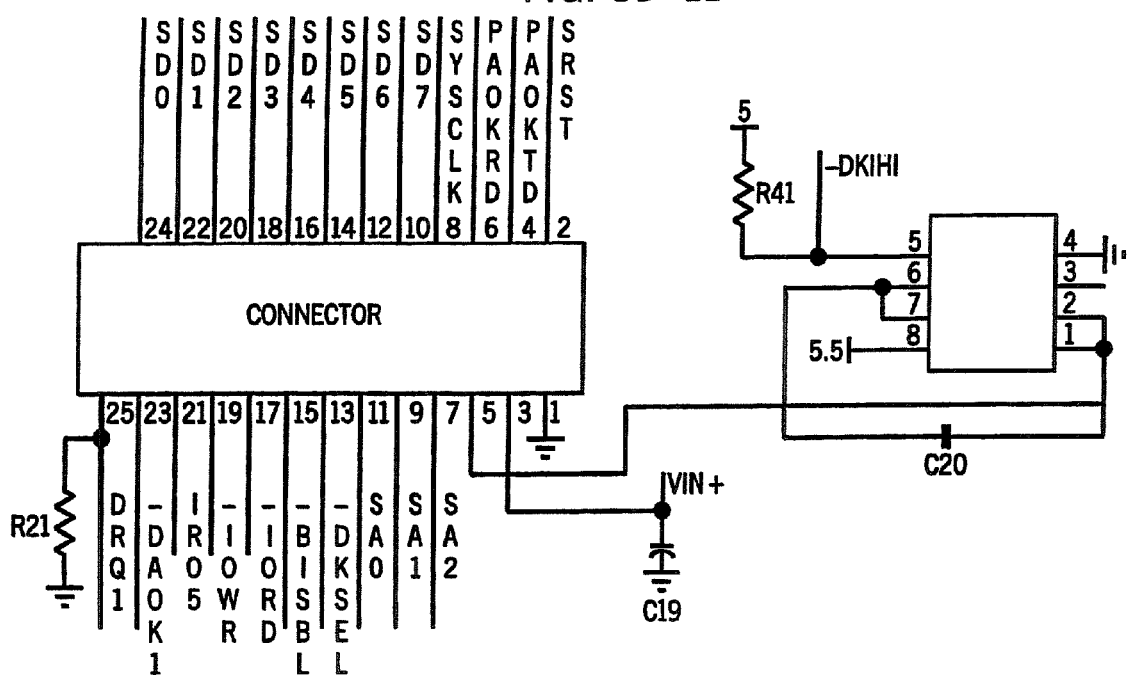
Figures 8, 8D, 9, 10, 11, 12:
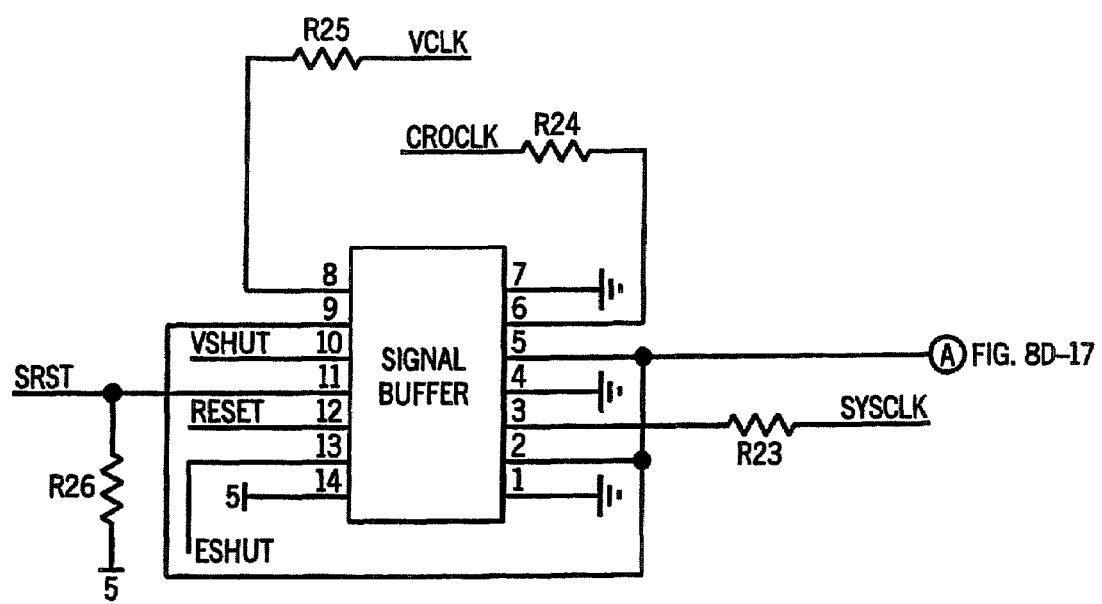
Figures 8, 8D, 9, 10, 11, 12, 13:
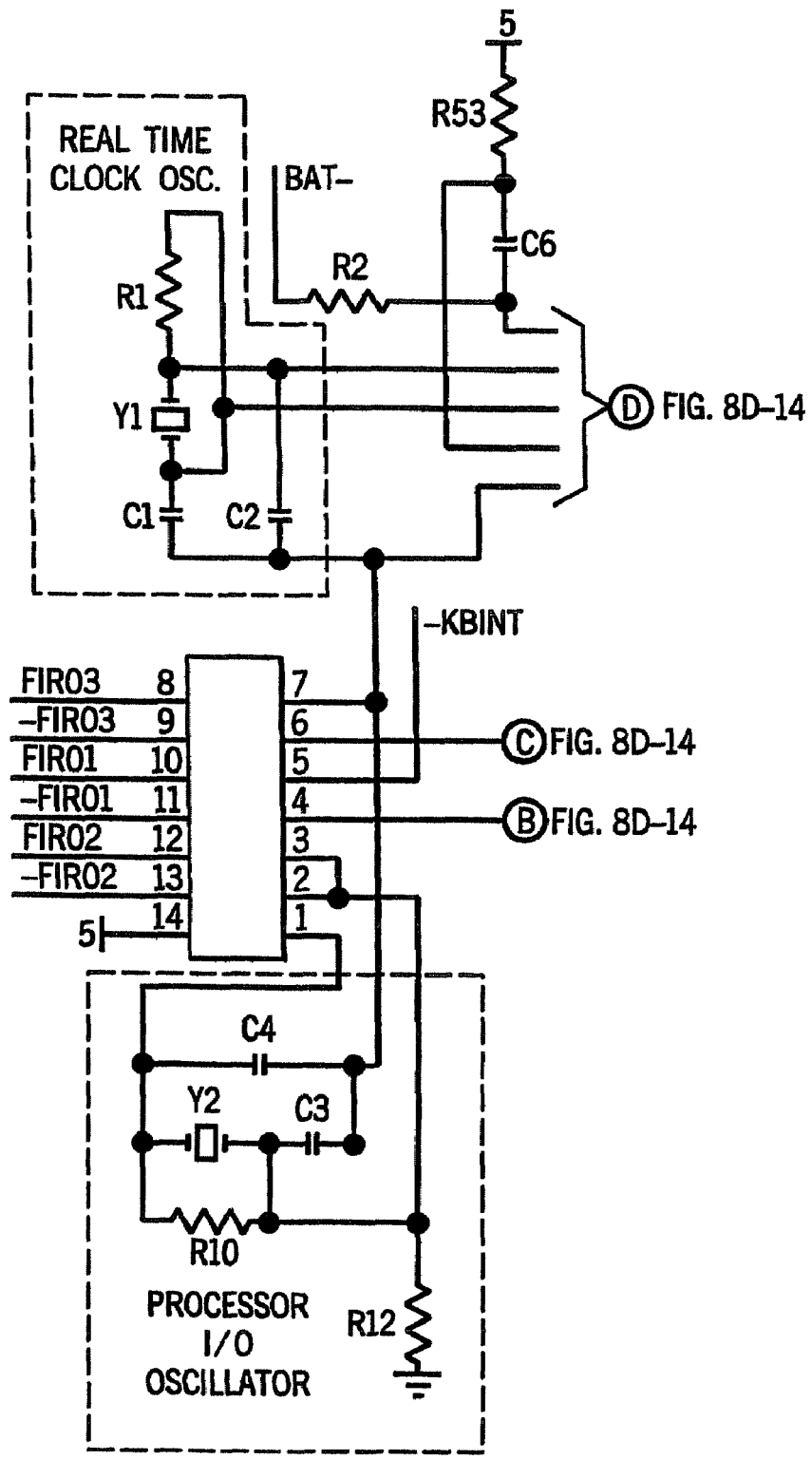
Figures 8, 8D, 9, 10, 11, 12, 13, 14:
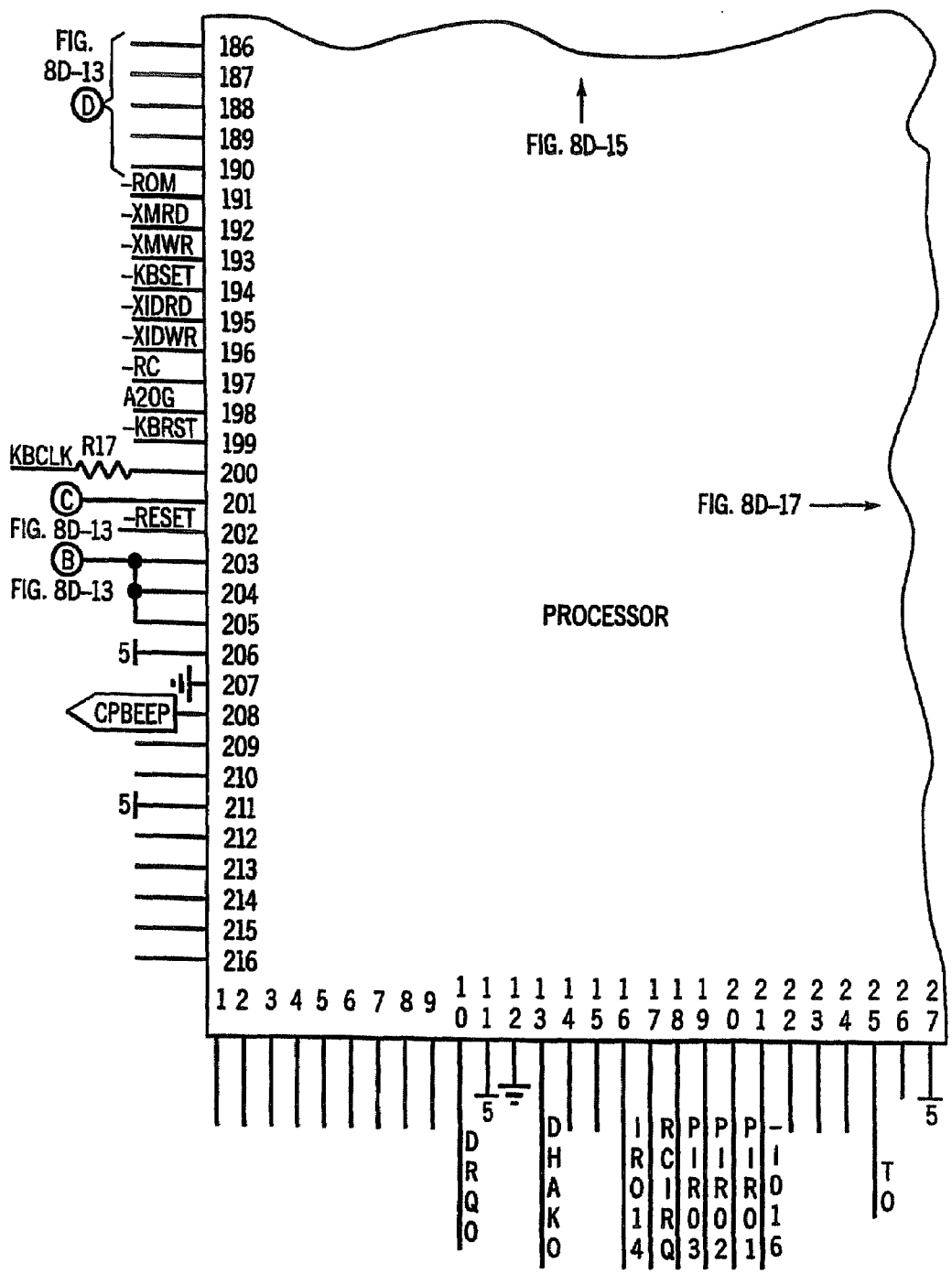
Figures 8, 8D, 9, 10, 11, 12, 13, 14, 15:
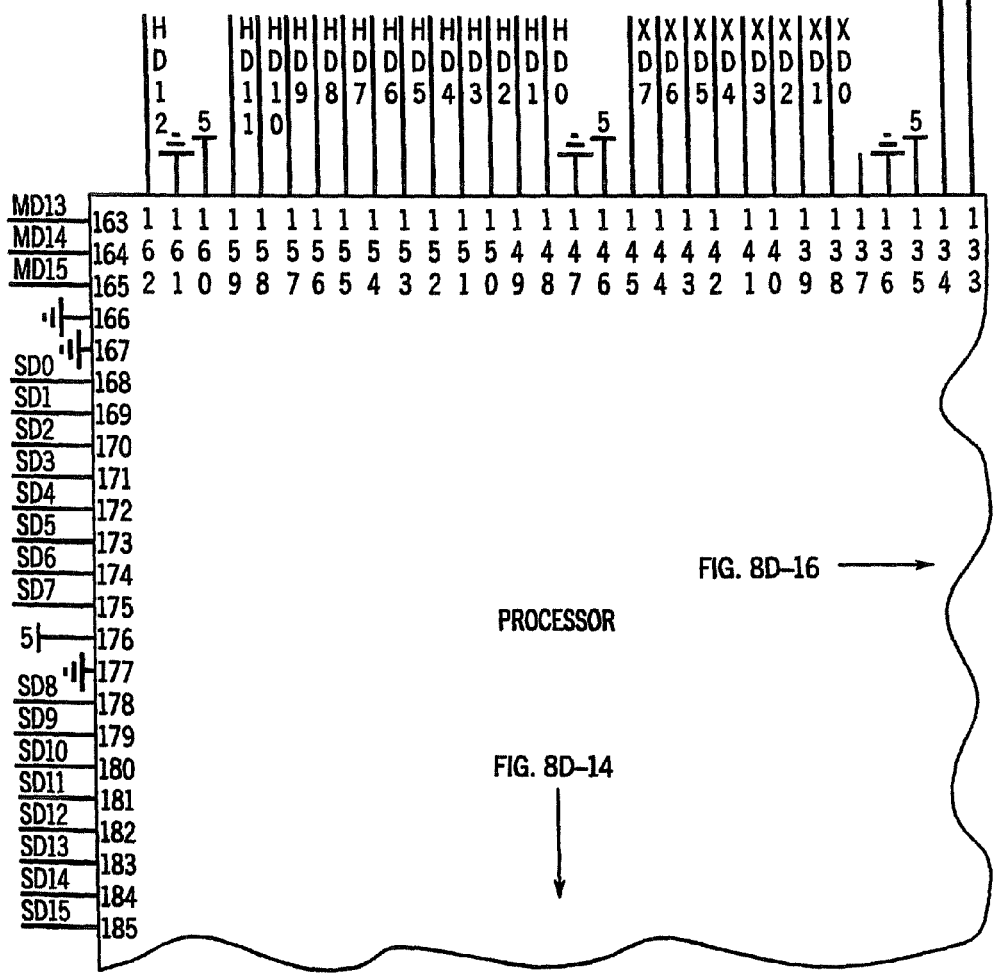
Figures 8, 8D, 9, 10, 11, 12, 13, 14, 15, 16:
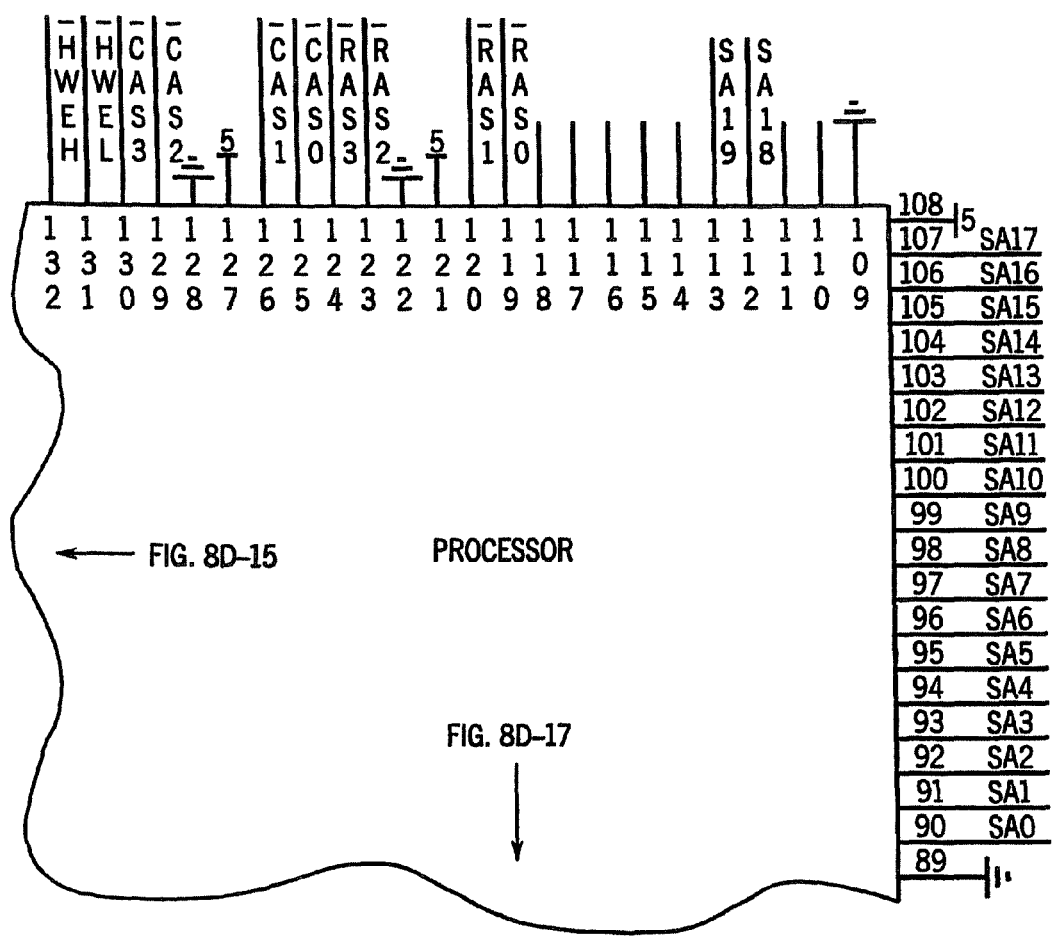
Figures 8, 8D, 9, 10, 11, 12, 13, 14, 15, 16, 17:
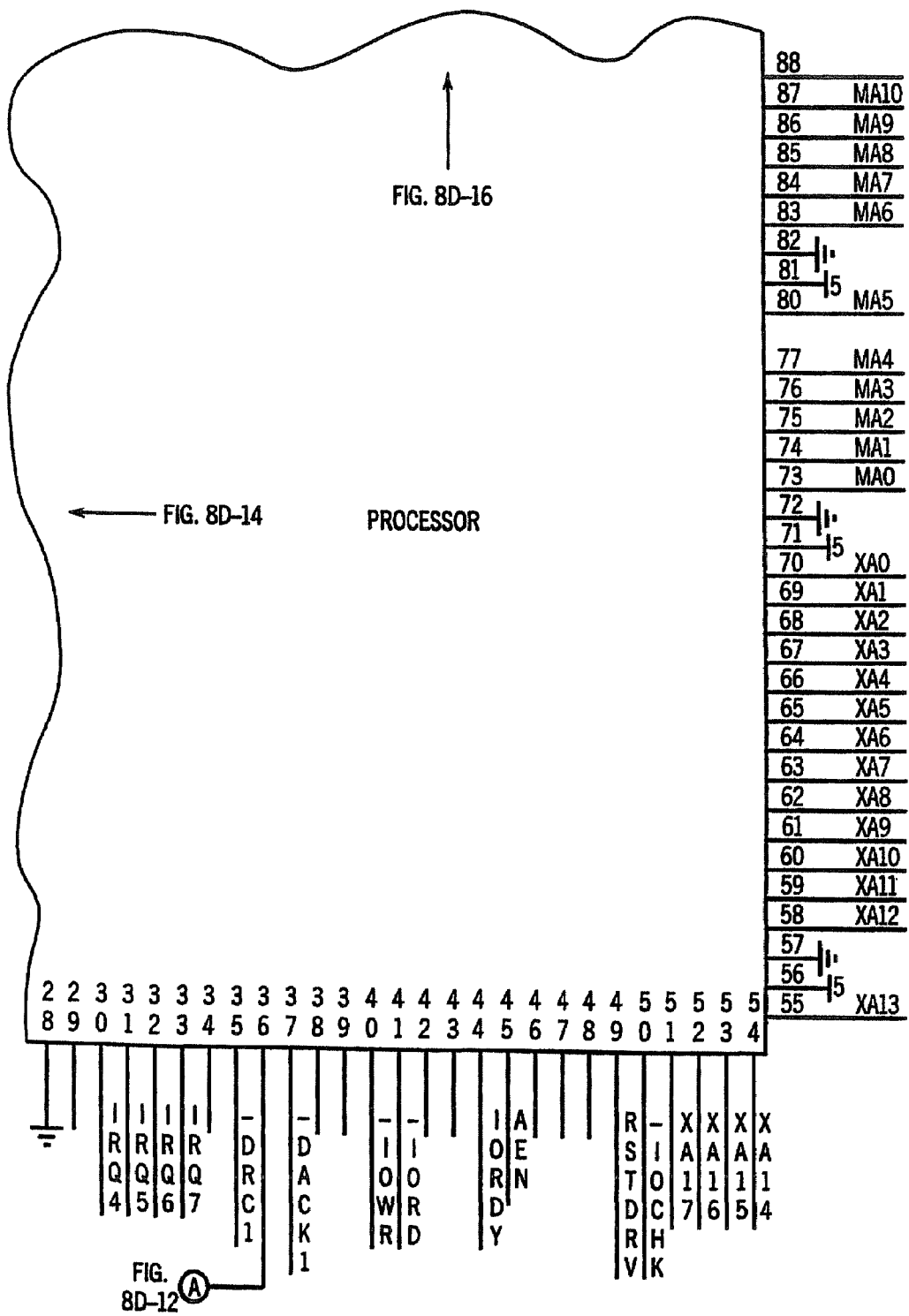
Figures 8, 8D, 9, 10, 11, 12, 13, 14, 15, 16, 17, 18:
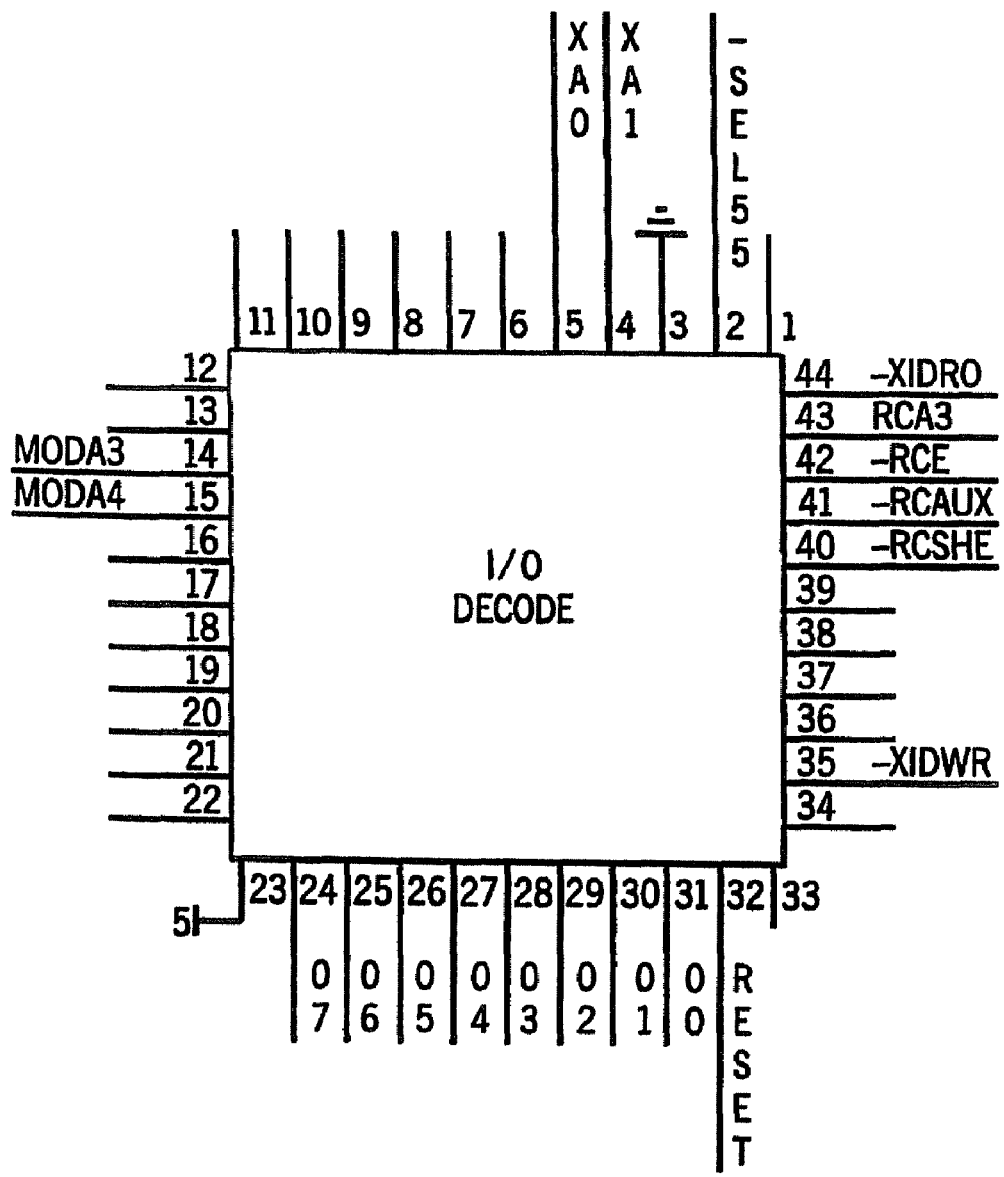
Figures 8, 8D, 9, 10, 11, 12, 13, 14, 15, 16, 17, 18, 19:
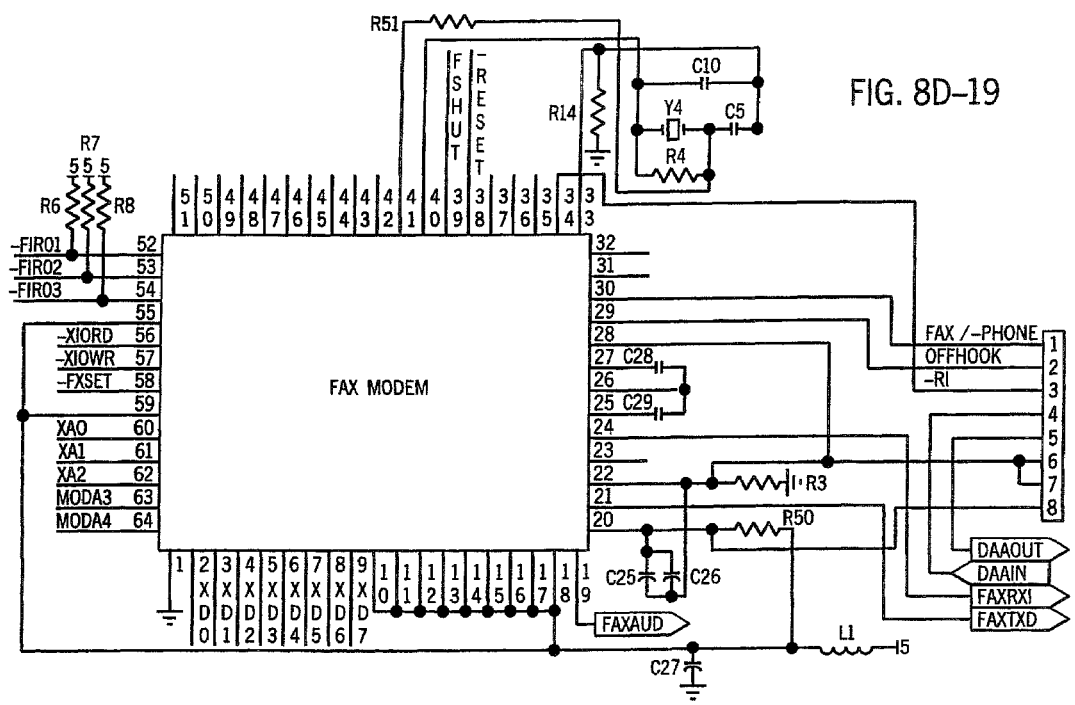
Figures 8, 8D, 9, 10, 11, 12, 13, 14, 15, 16, 17, 18, 19, 20:
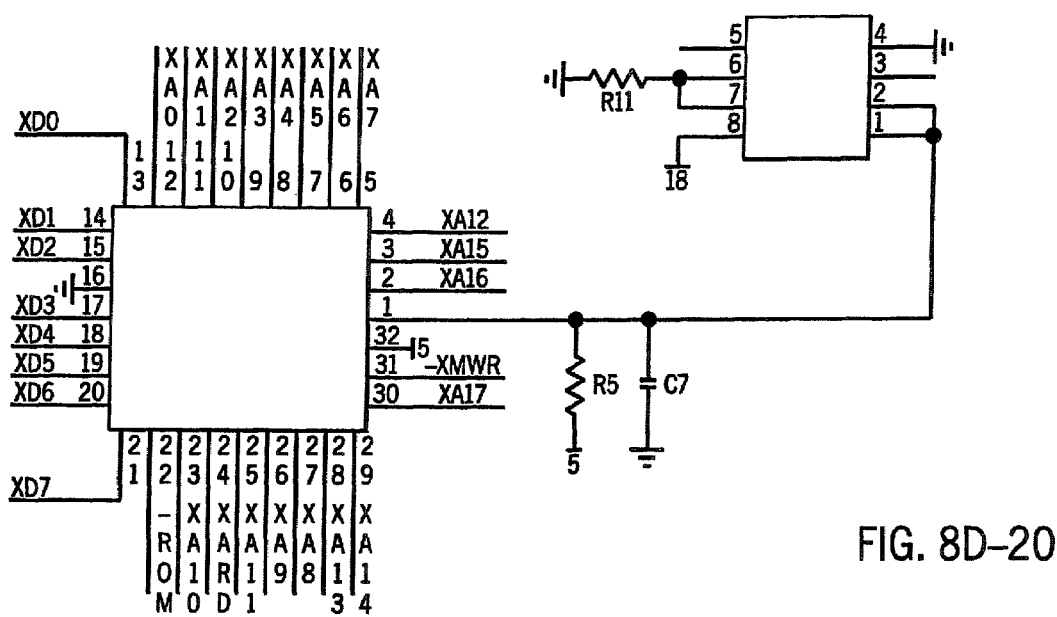
Figures 8, 8D, 9, 10, 11, 12, 13, 14, 15, 16, 17, 18, 19, 20, 21:
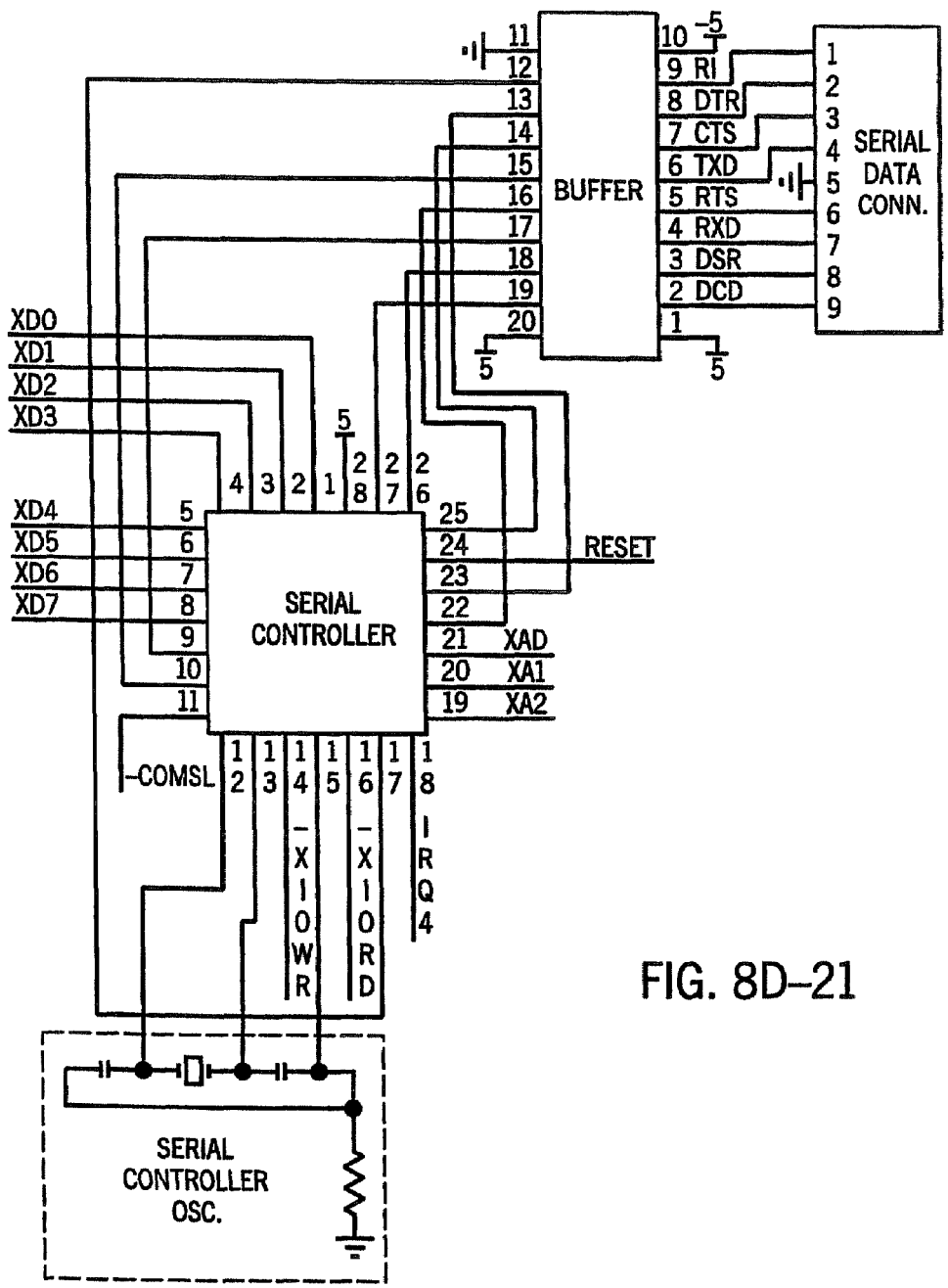
Figures 8, 8D, 9, 10, 11, 12, 13, 14, 15, 16, 17, 18, 19, 20, 21, 22:
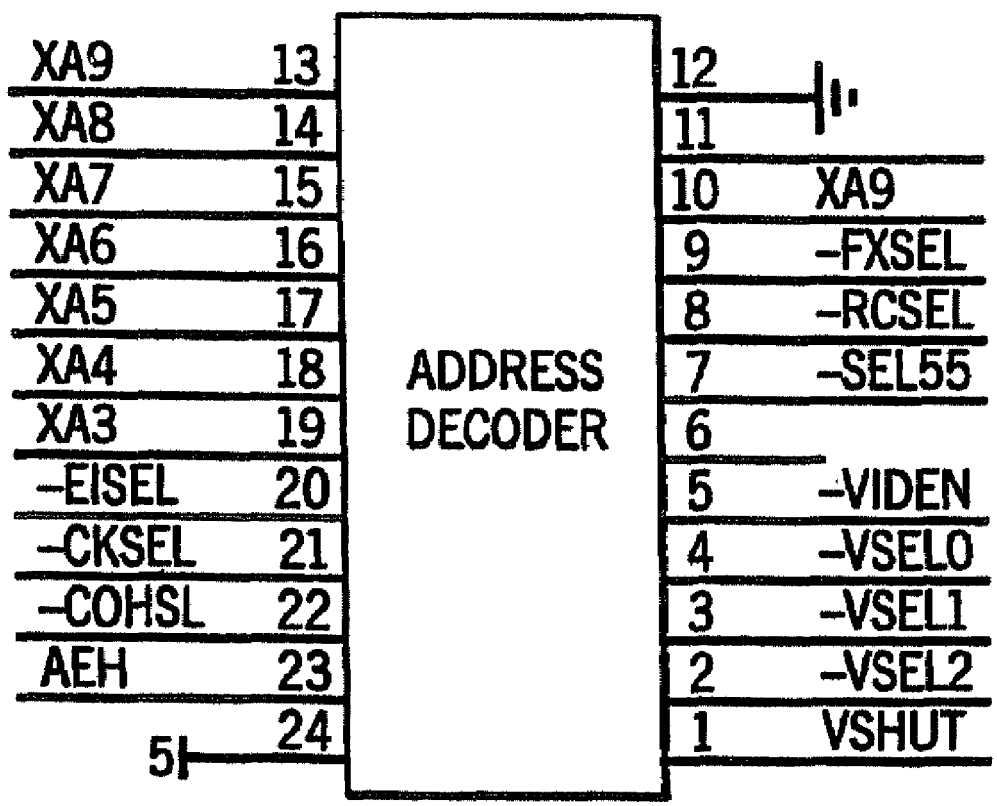
Figures 8, 8D, 9, 10, 11, 12, 13, 14, 15, 16, 17, 18, 19, 20, 21, 22, 23:
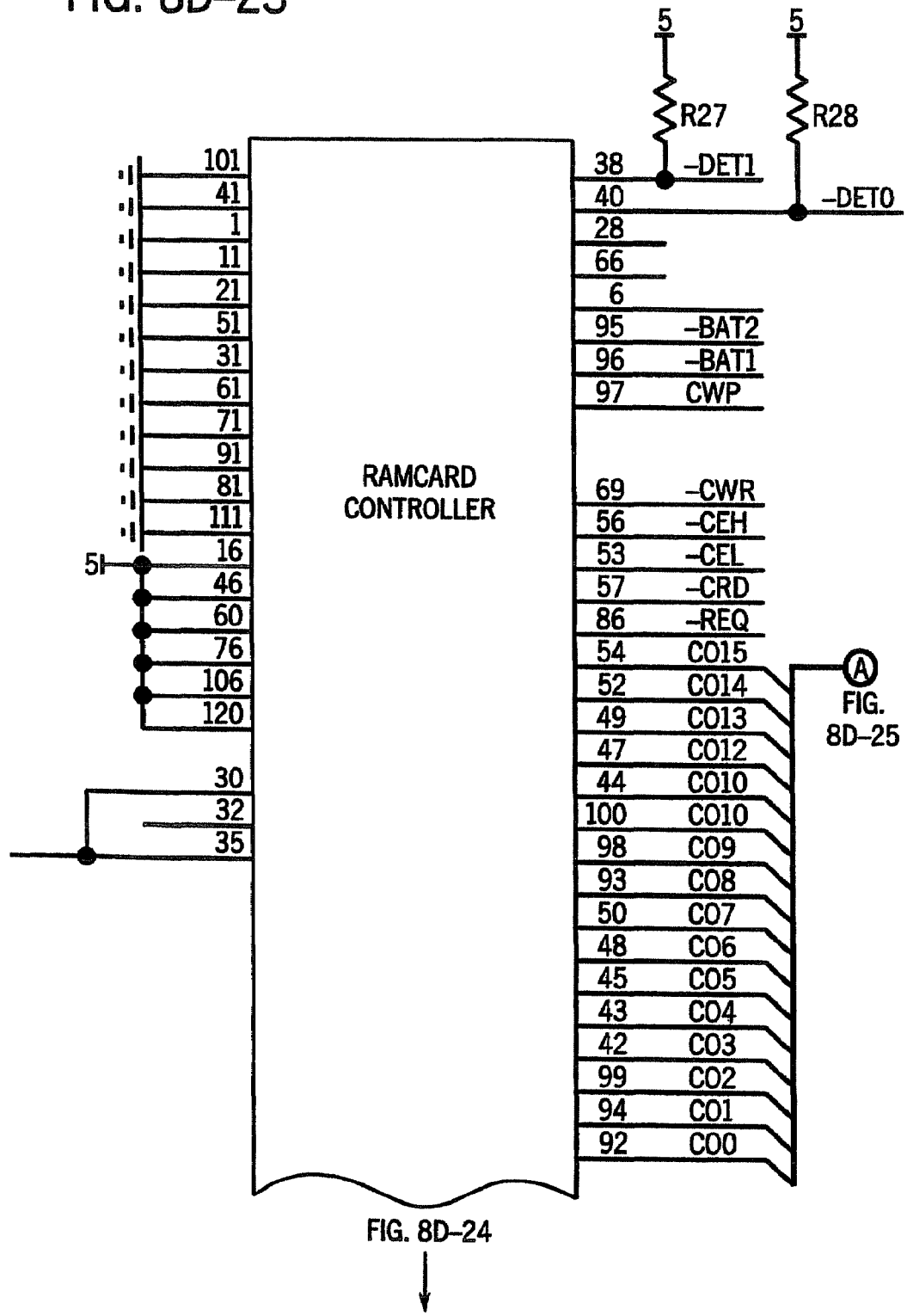
Figures 8, 8D, 9, 10, 11, 12, 13, 14, 15, 16, 17, 18, 19, 20, 21, 22, 23, 24, 25:
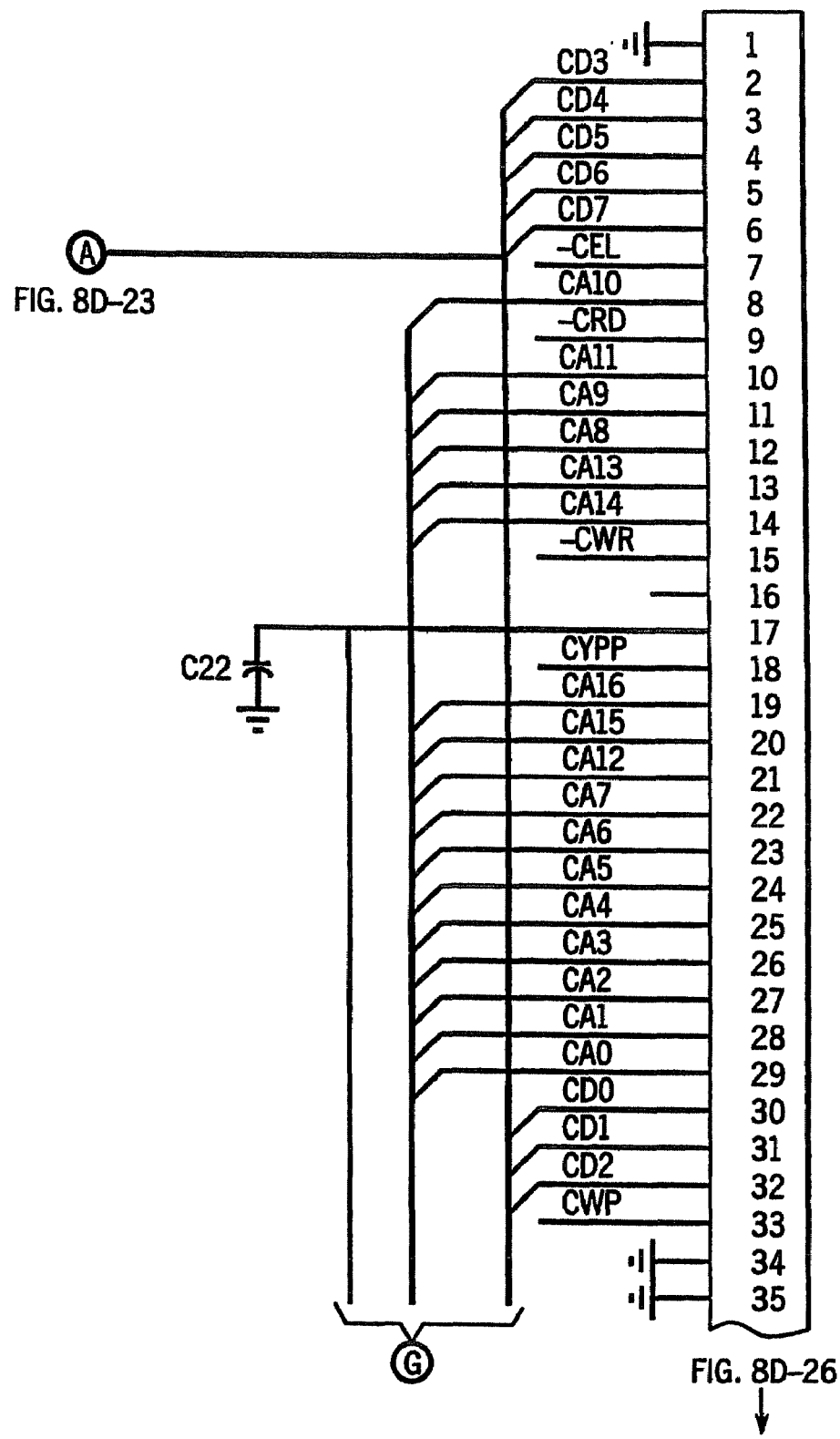
Figures 8, 8D, 9, 10, 11, 12, 13, 14, 15, 16, 17, 18, 19, 20, 21, 22, 23, 24, 25, 26, 27:
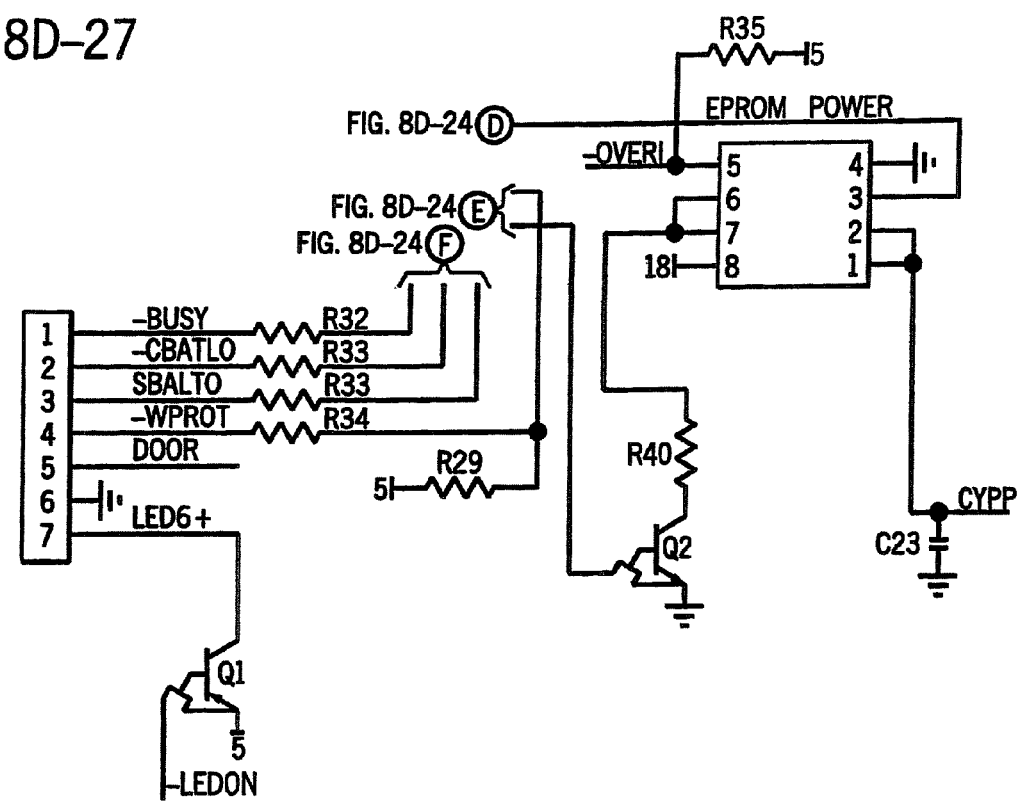
Figures 8, 8D, 9, 10, 11, 12, 13, 14, 15, 16, 17, 18, 19, 20, 21, 22, 23, 24, 25, 26, 27, 28:
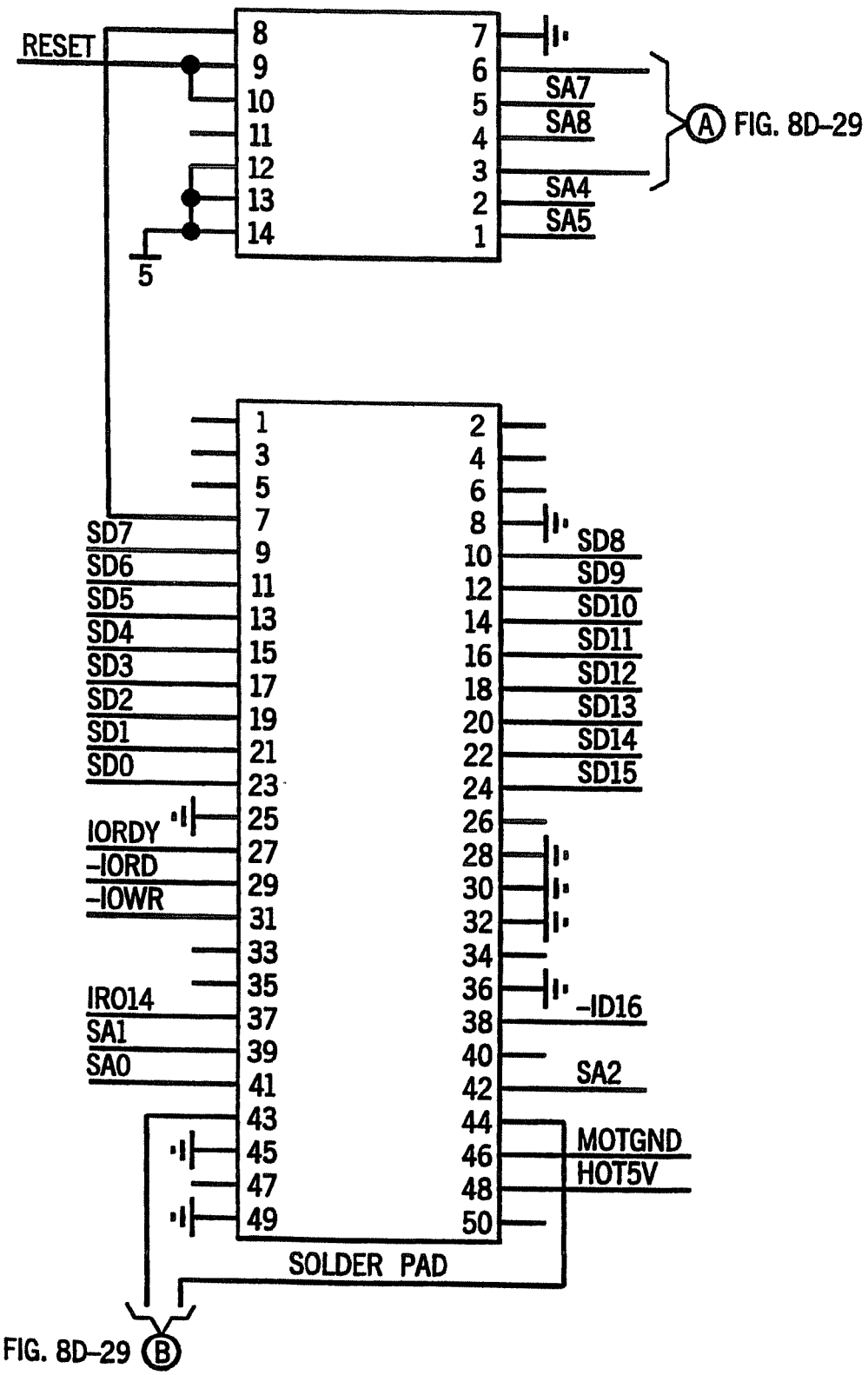
Figures 8, 8D, 9, 10, 11, 12, 13, 14, 15, 16, 17, 18, 19, 20, 21, 22, 23, 24, 25, 26, 27, 28, 29:
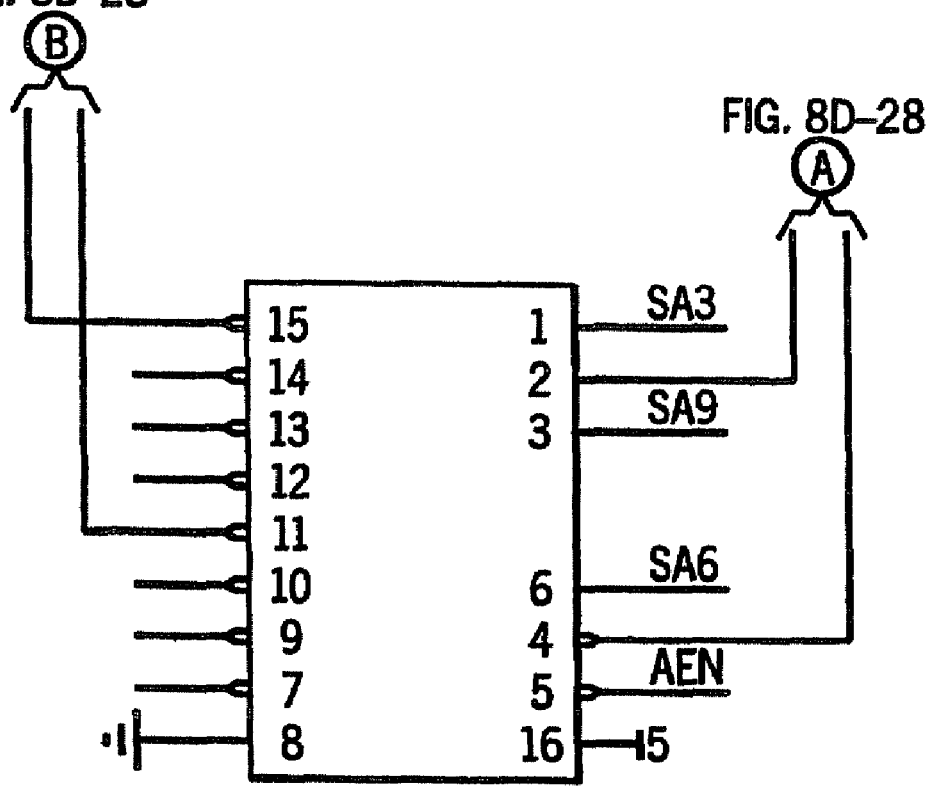
Figures 8, 8D, 9, 10, 11, 12, 13, 14, 15, 16, 17, 18, 19, 20, 21, 22, 23, 24, 25, 26, 27, 28, 29, 30:
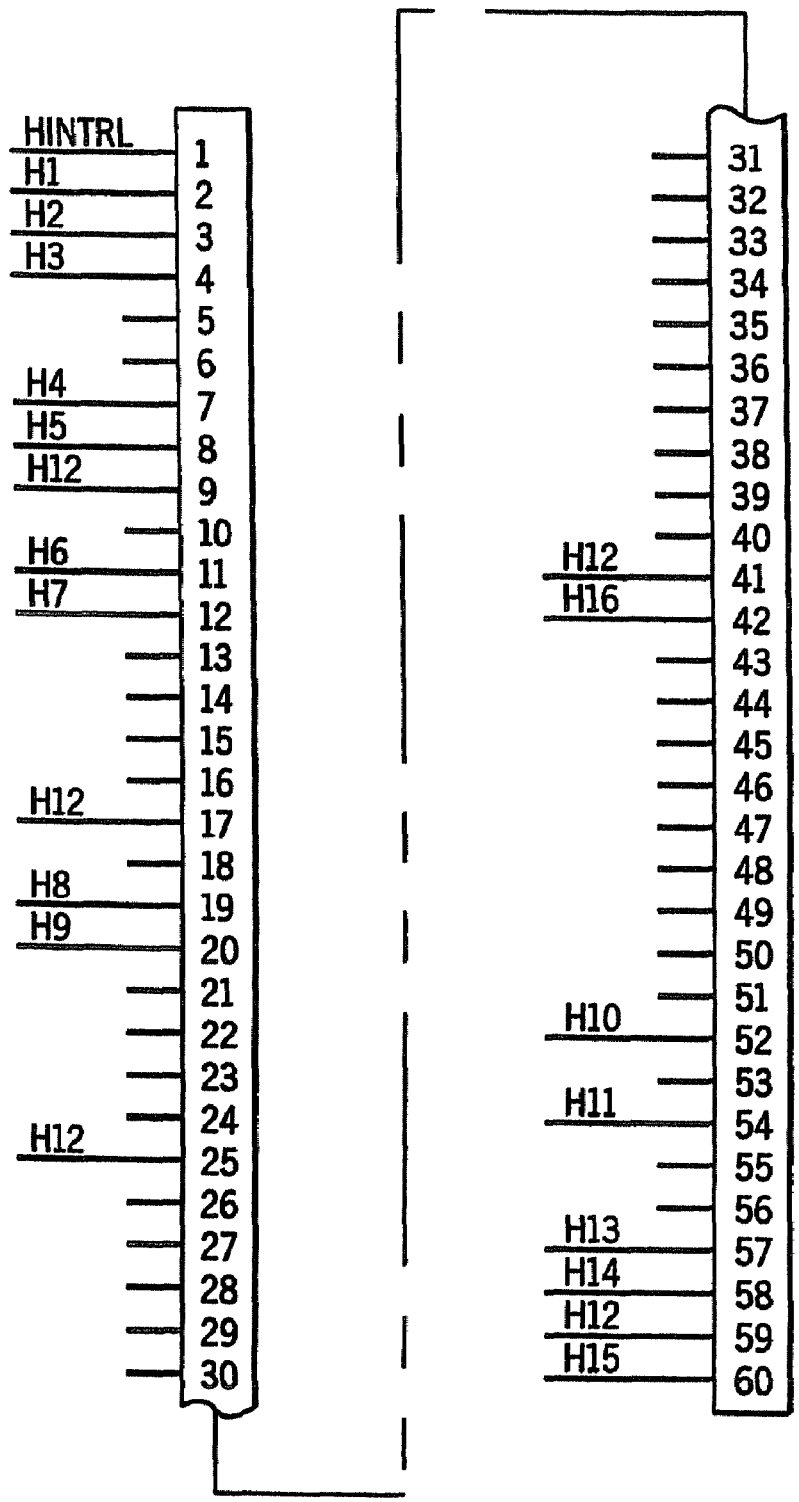
Figures 1, 8E:
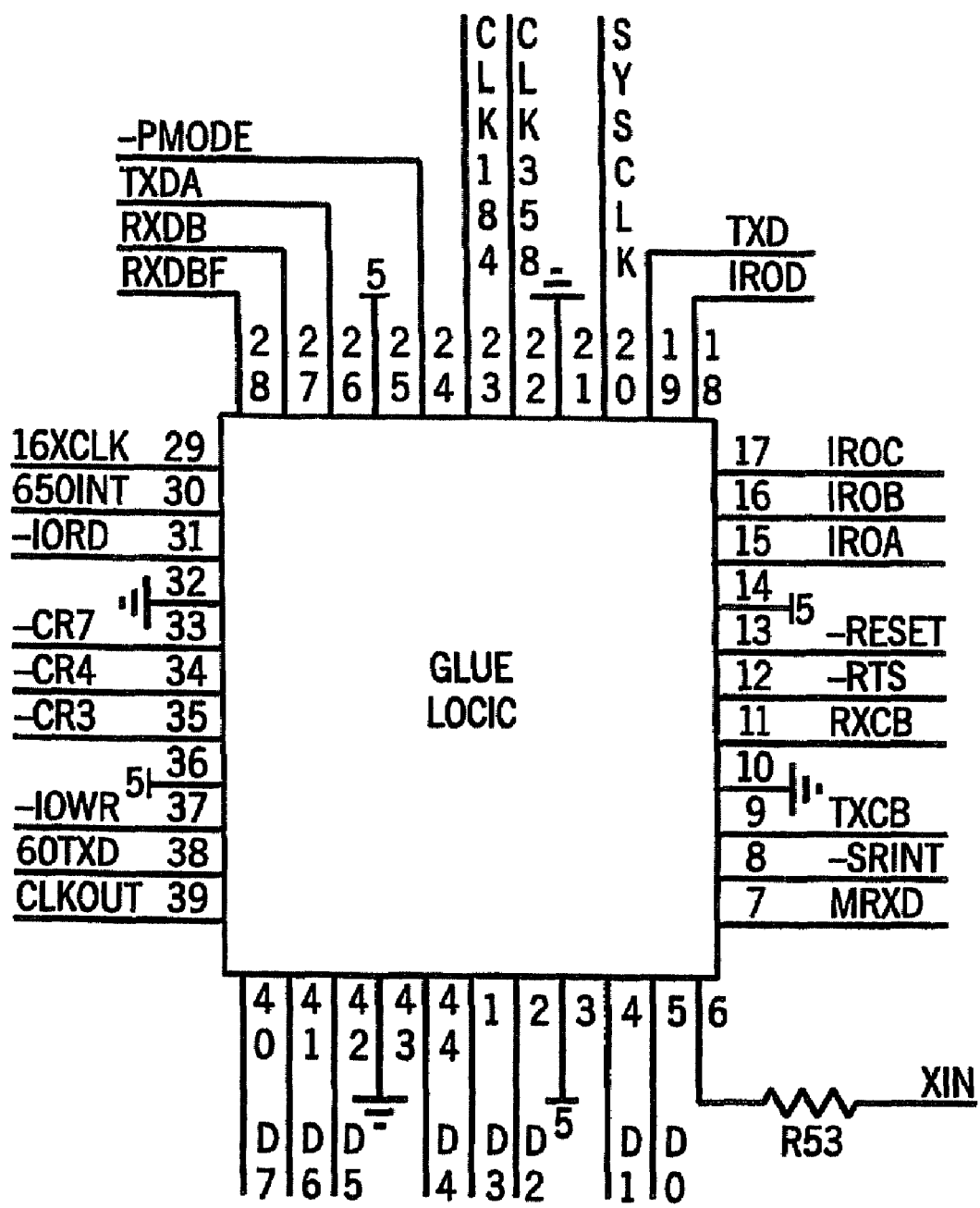
Figures 2, 8E:
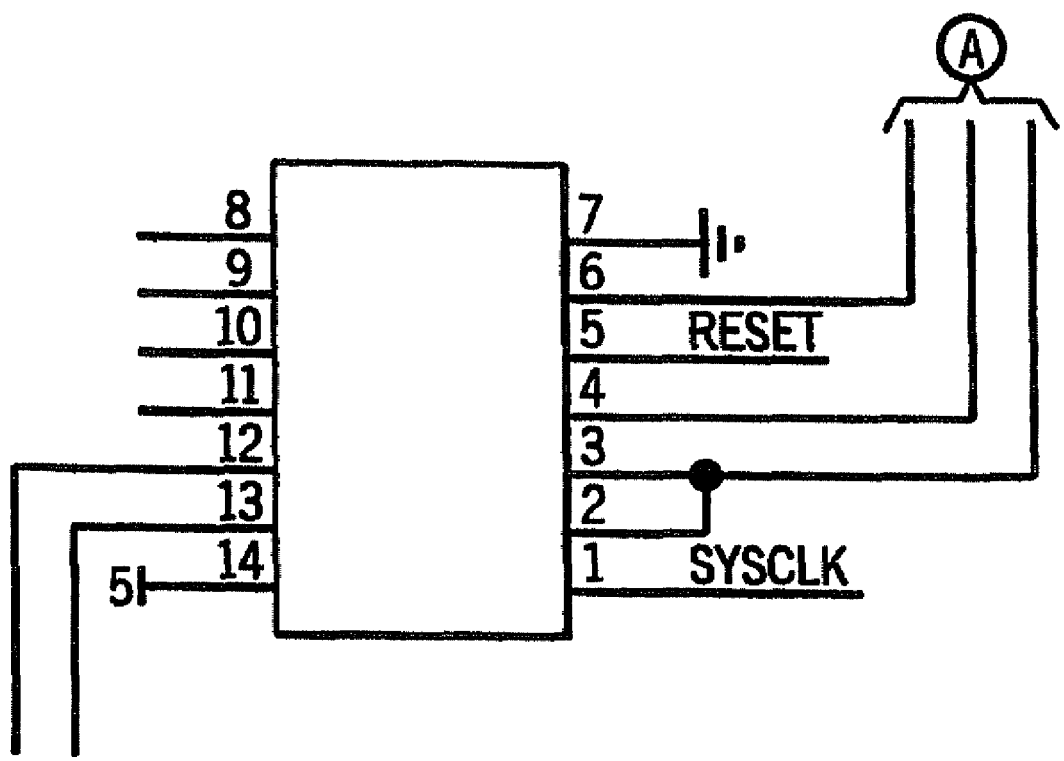
Figures 3, 8E:
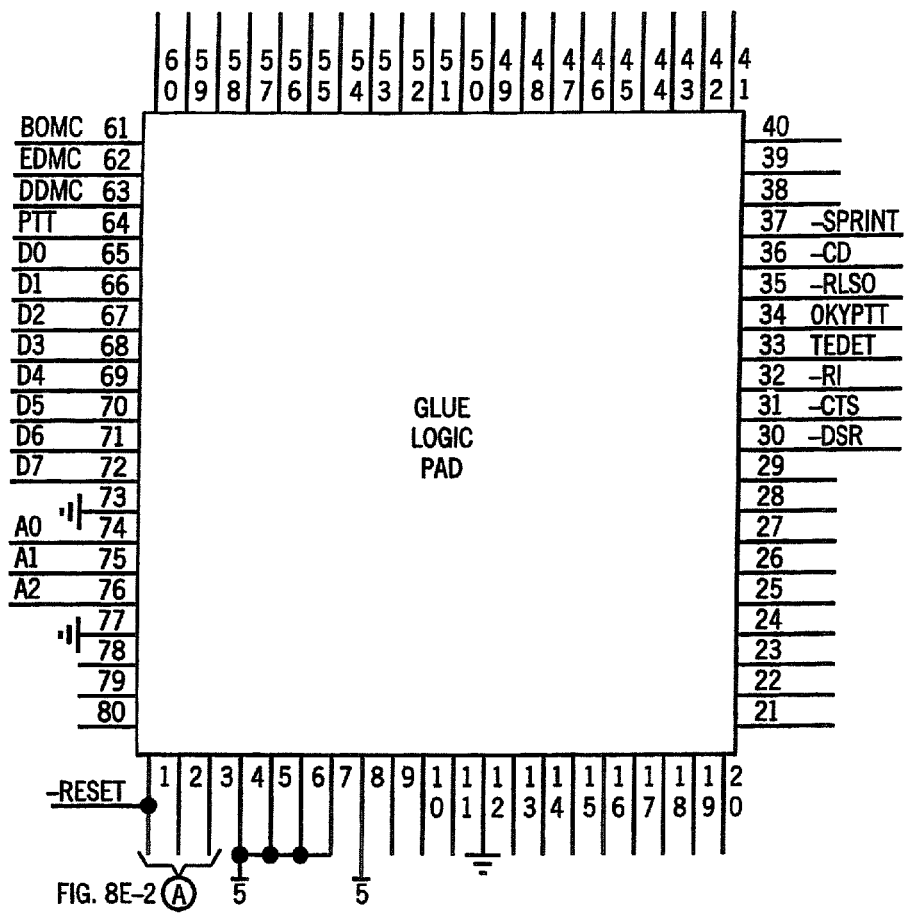
Figures 4, 8E:
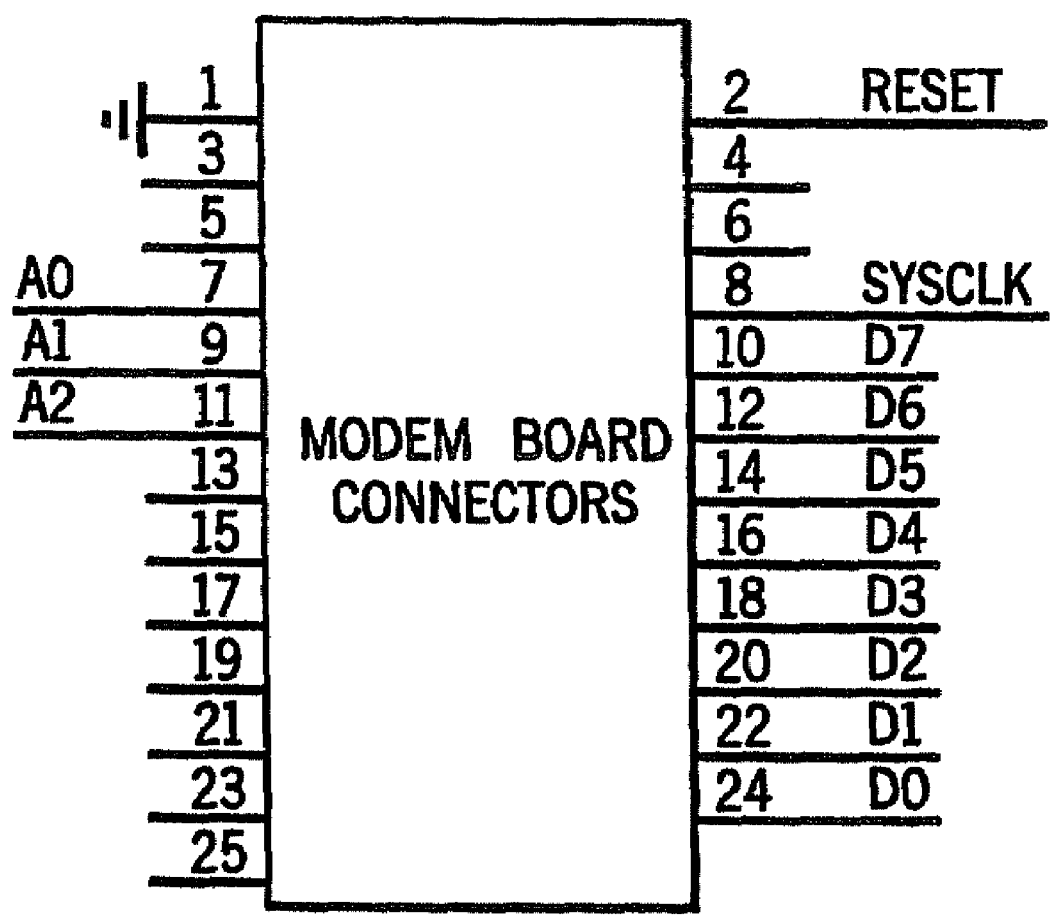
Figures 5, 8E:
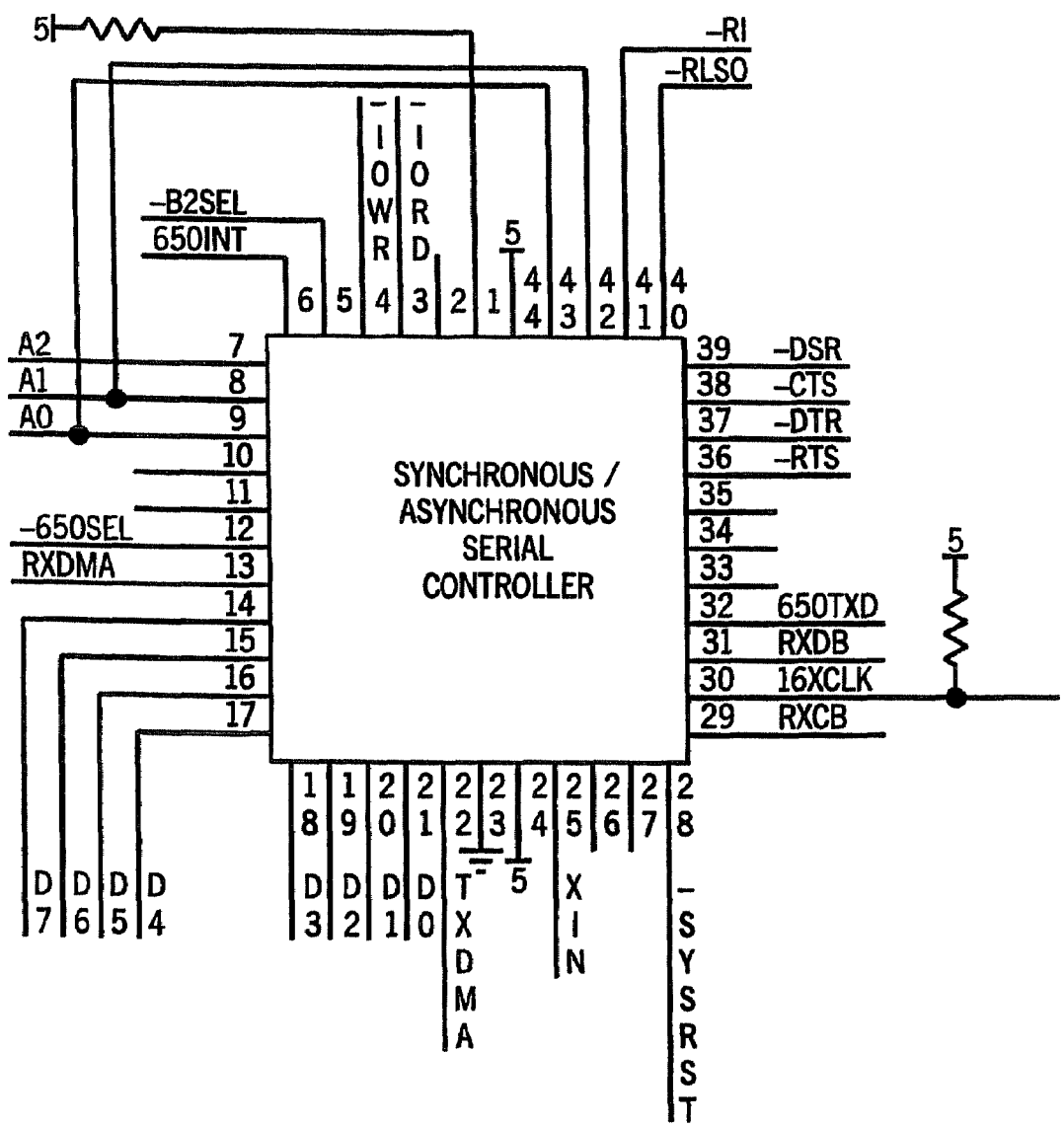
Figures 6, 8E:
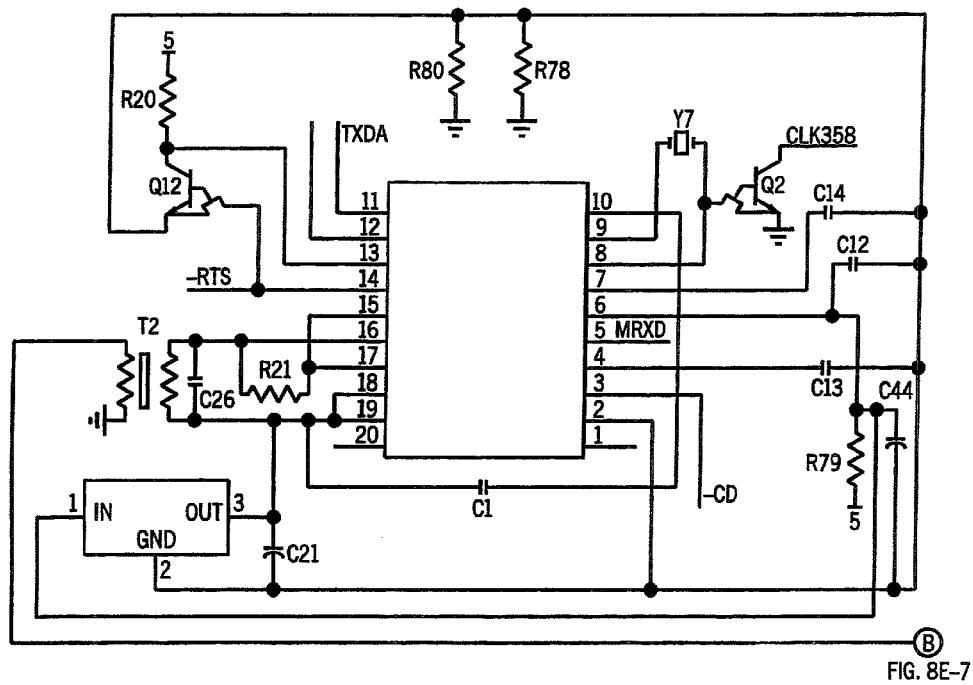
Figures 7, 8E:
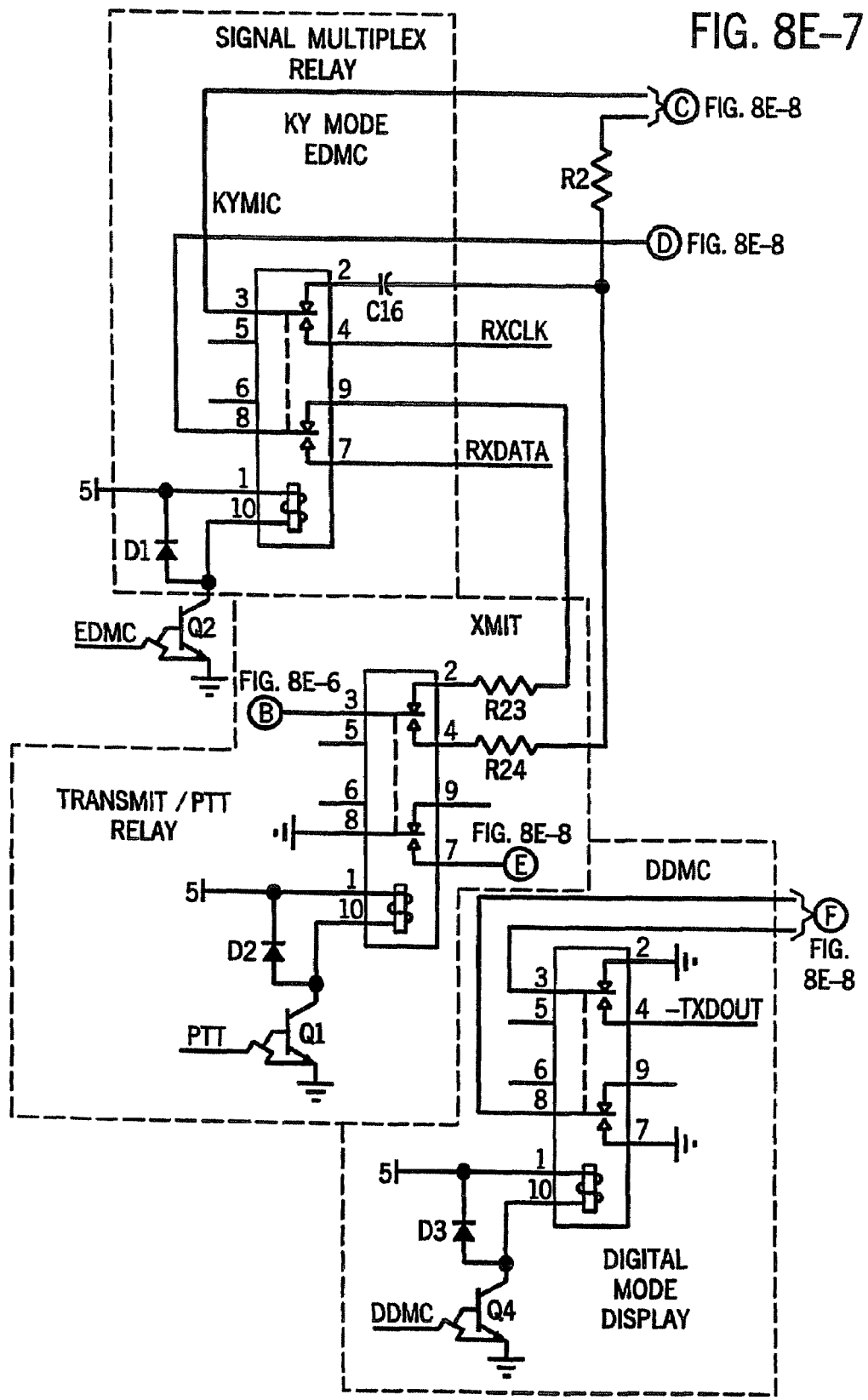
Figures 8, 8E:
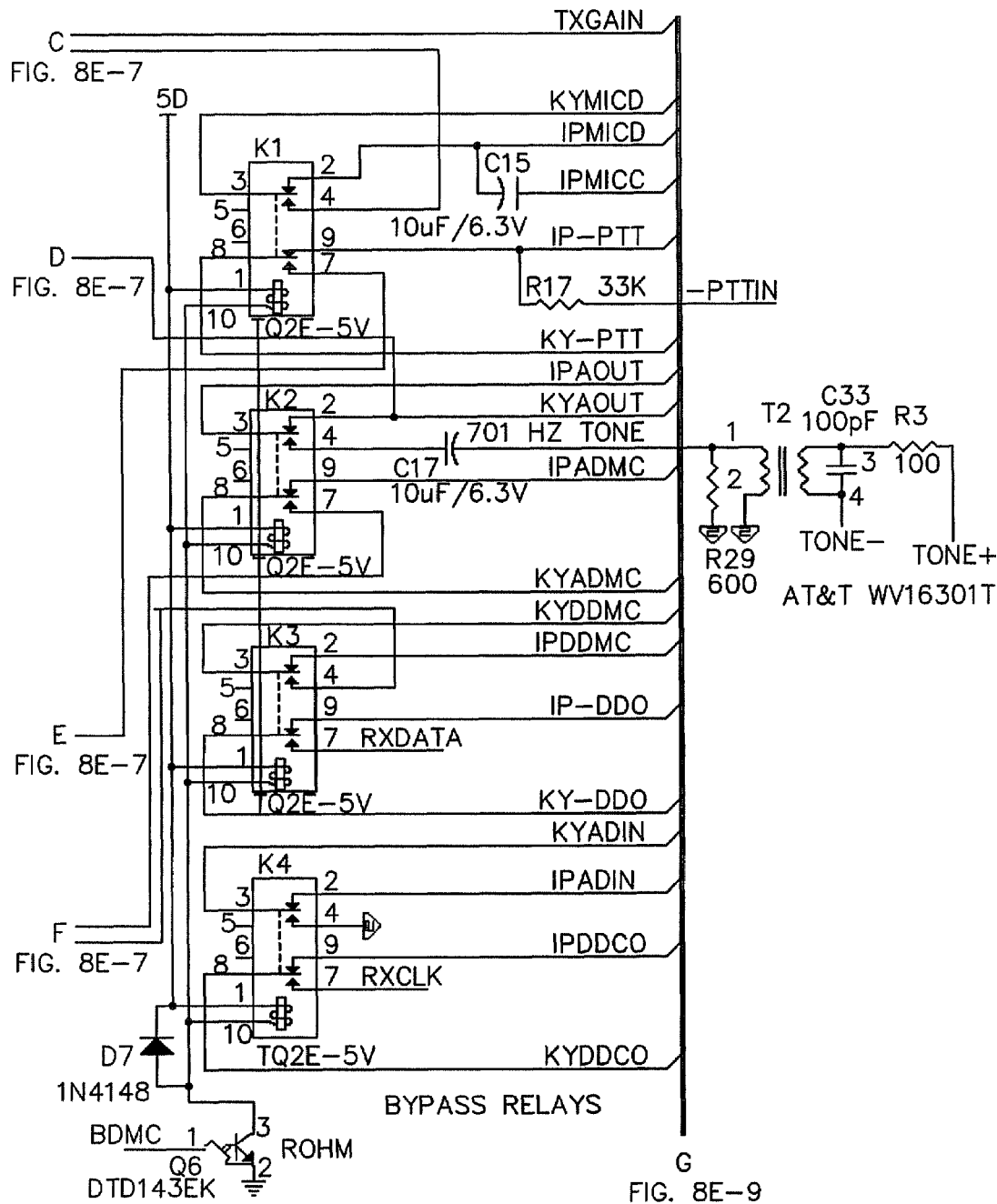
Figures 8, 8E, 9, 10:
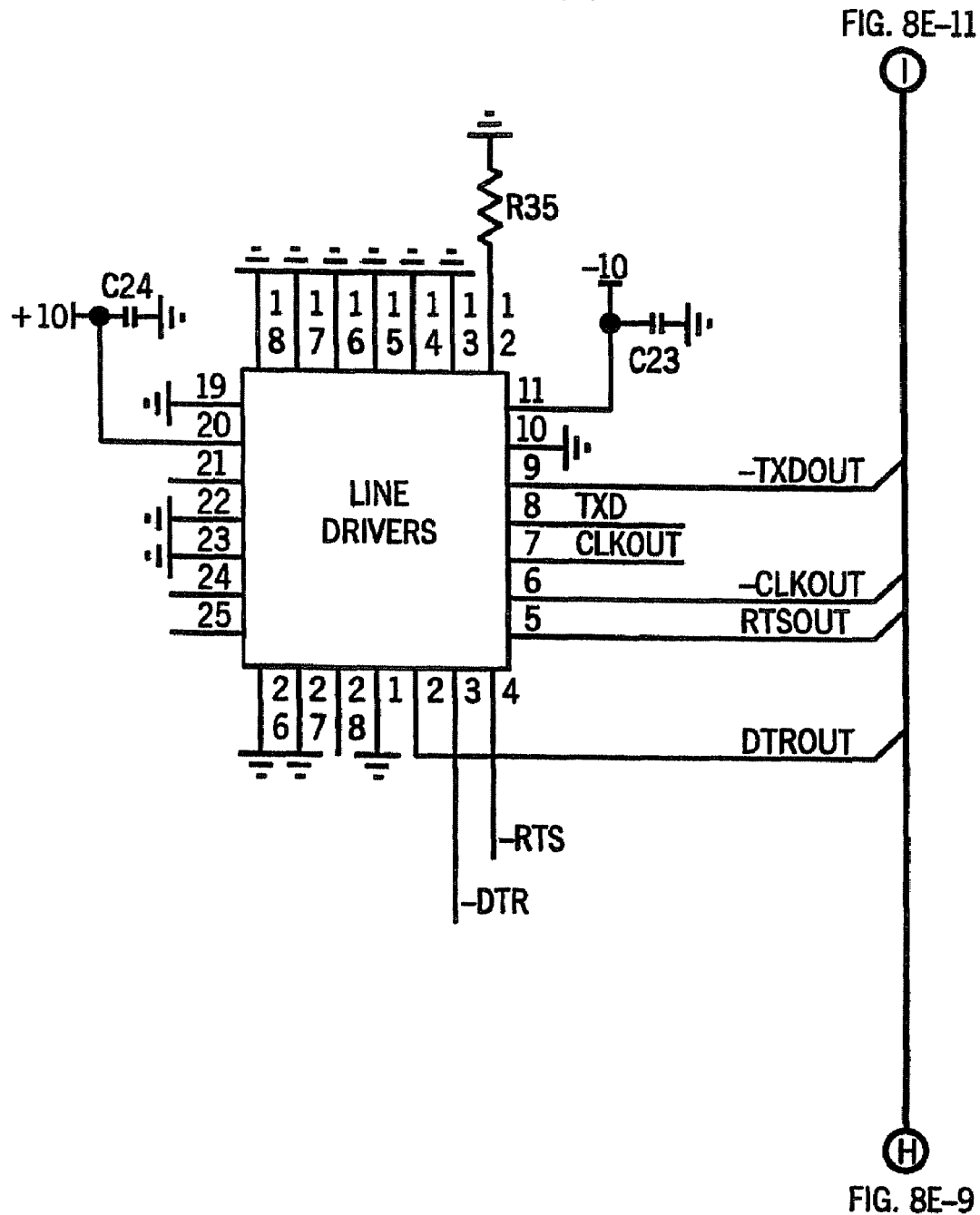
Figures 8, 8E, 9, 10, 11:
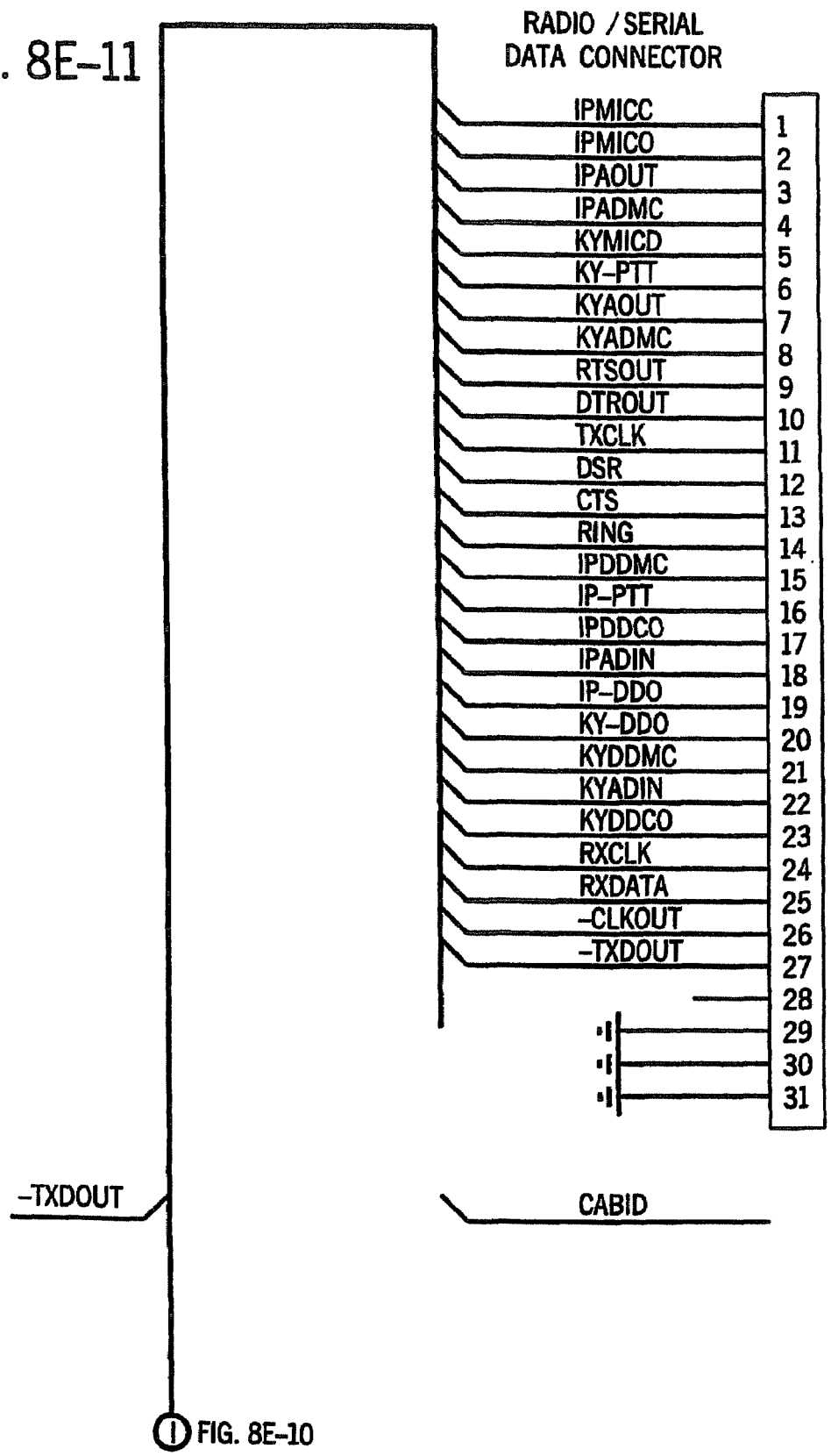
Figures 8, 8E, 9, 10, 11, 12:
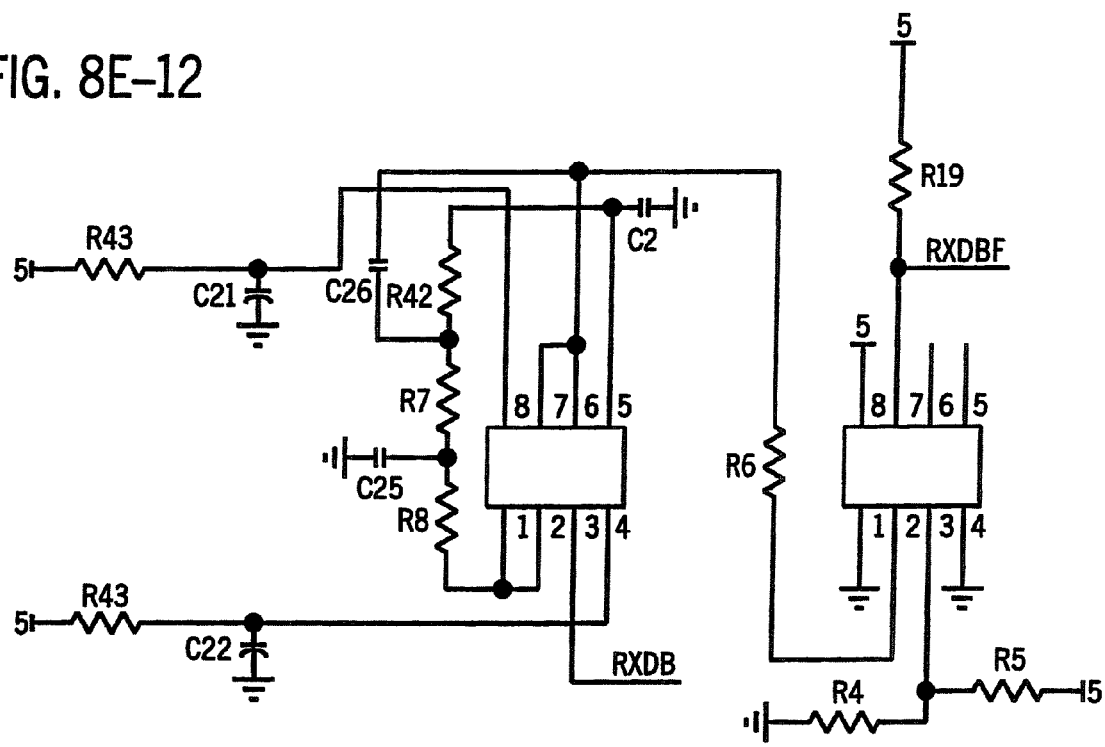
Figure 8F:
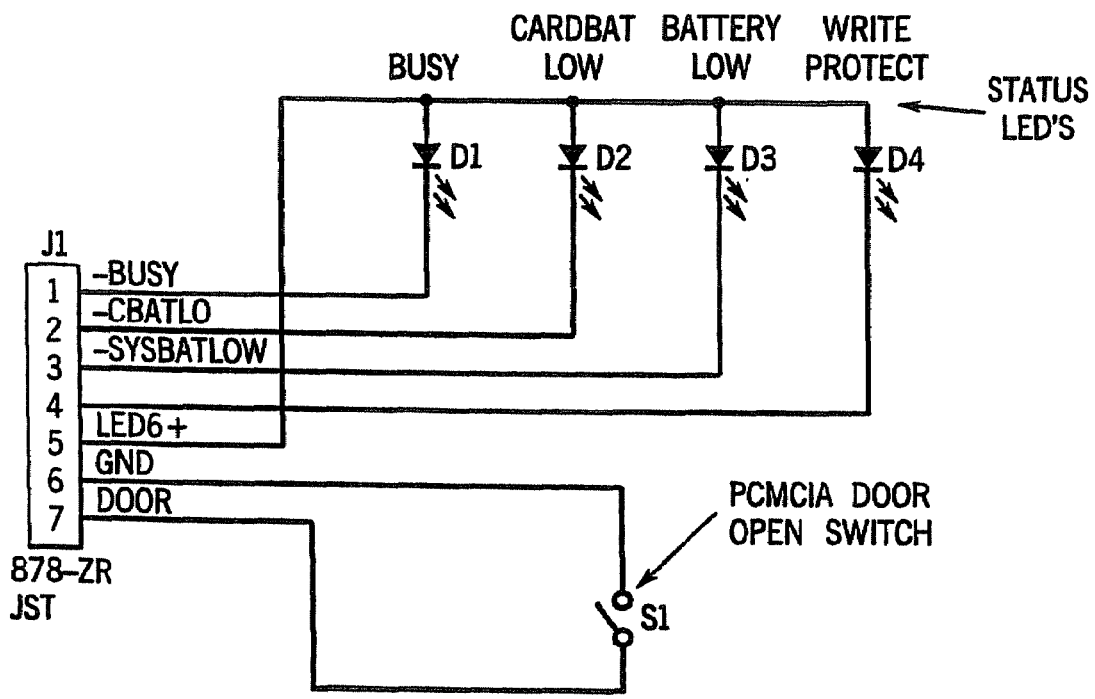
Figure 8G:
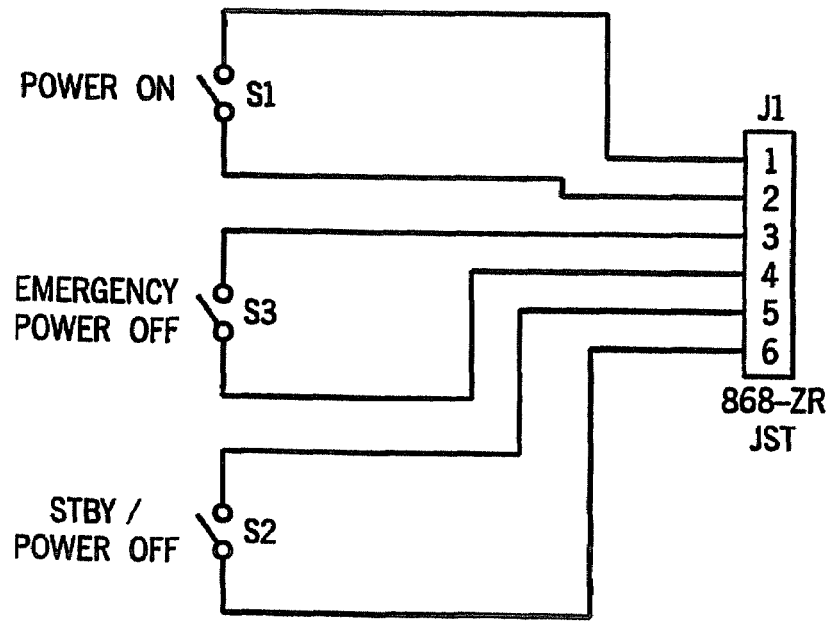
Figure 8L:
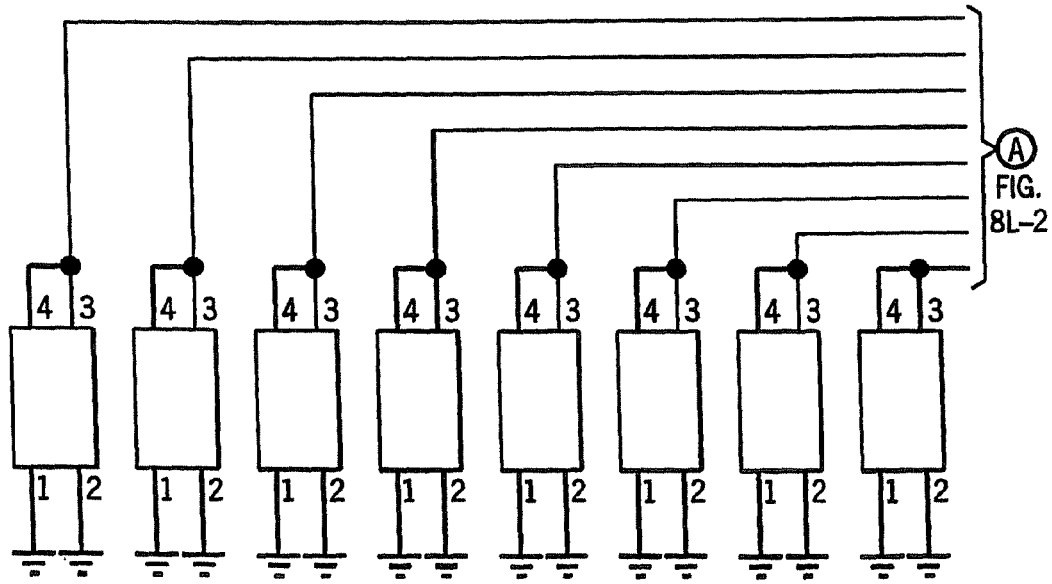
Figure 1:
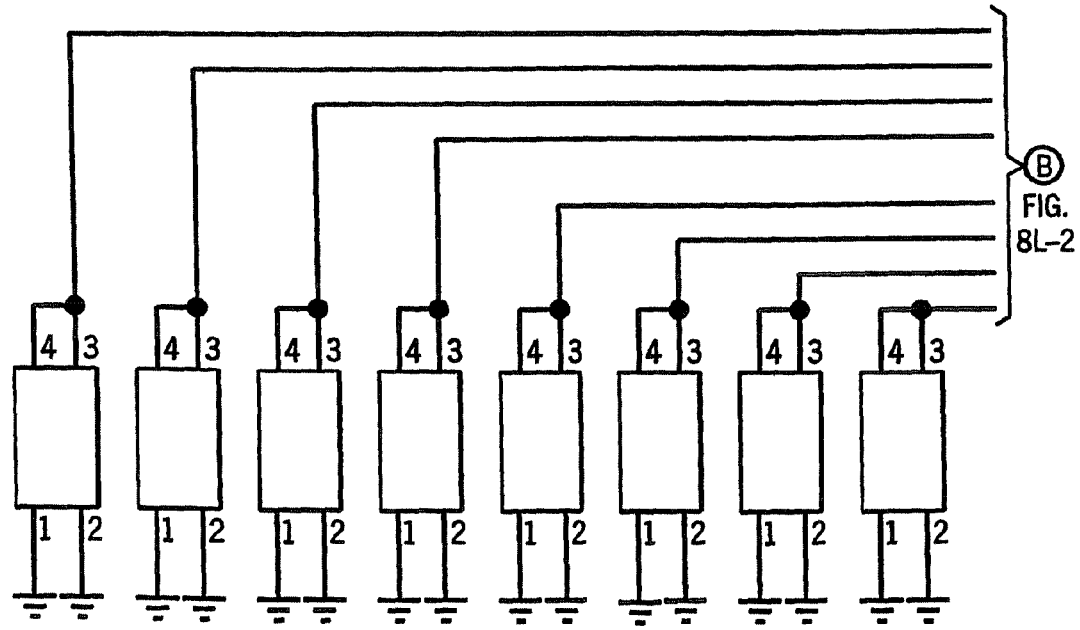
FIG. 1. is a block diagram of a basic facsimile camera configuration for capturing an image via a camera and transmitting it via Group III facsimile transmission to a standard hard copy medium.
Figures 3, 8L:
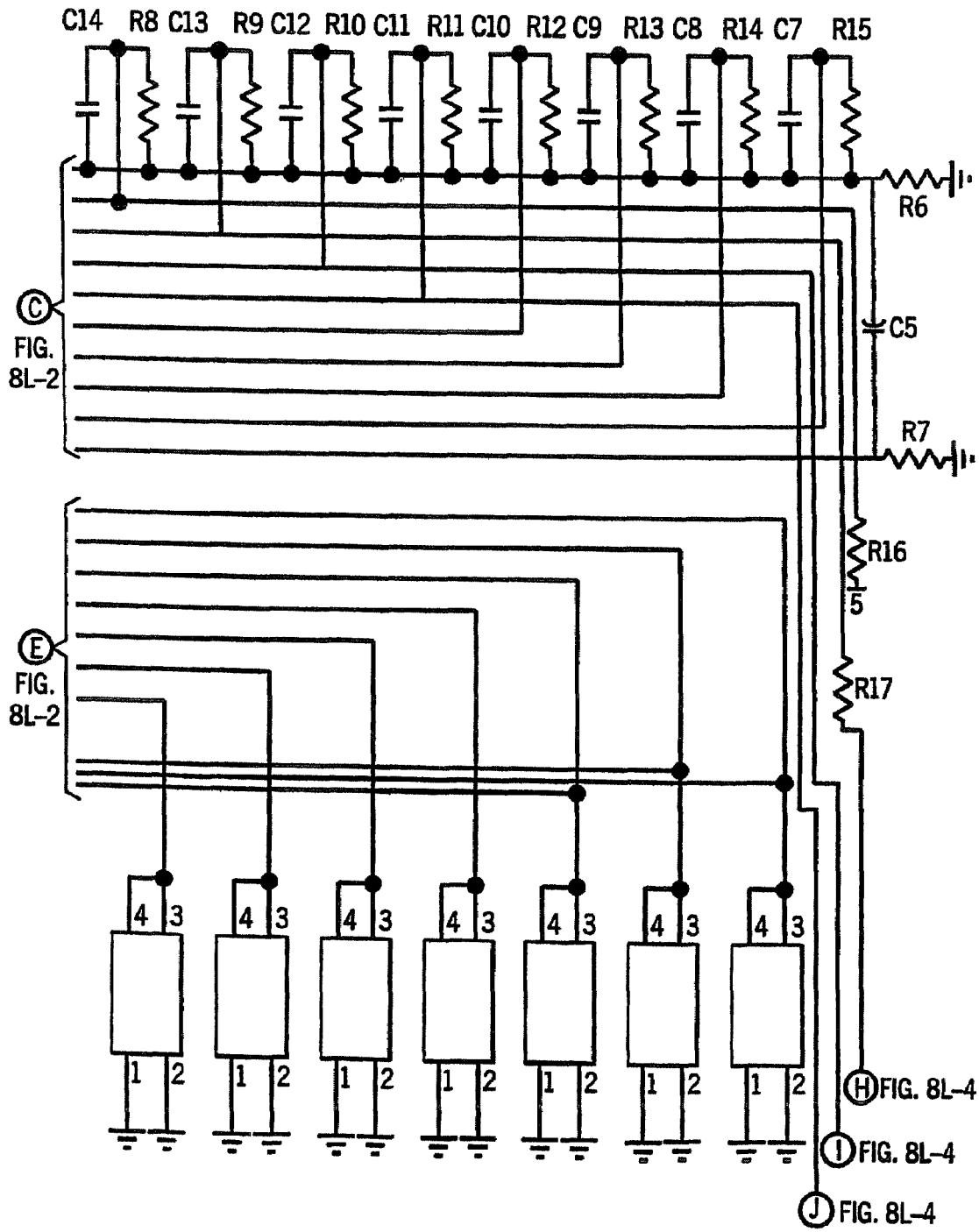
Figures 5, 8L:
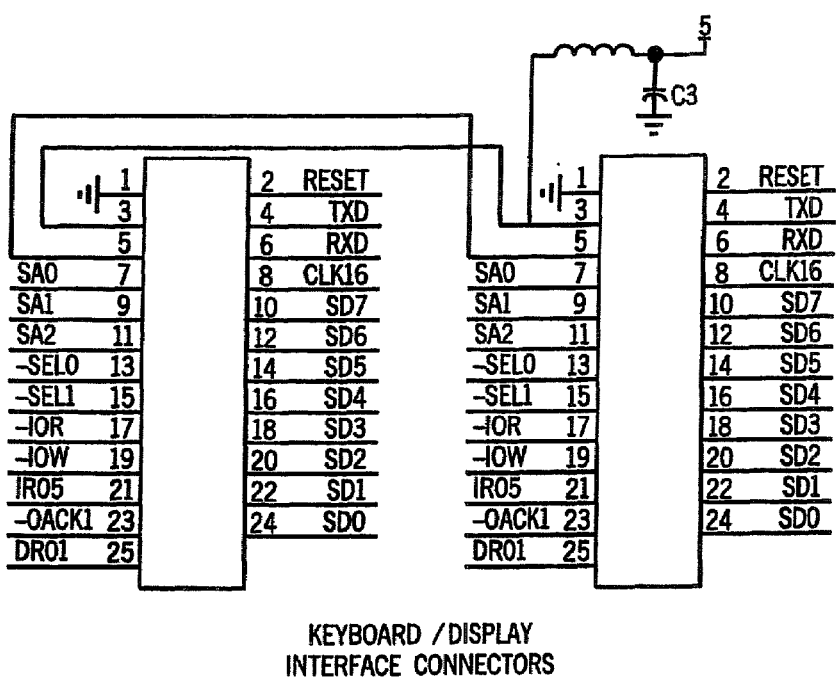
Figure 9:
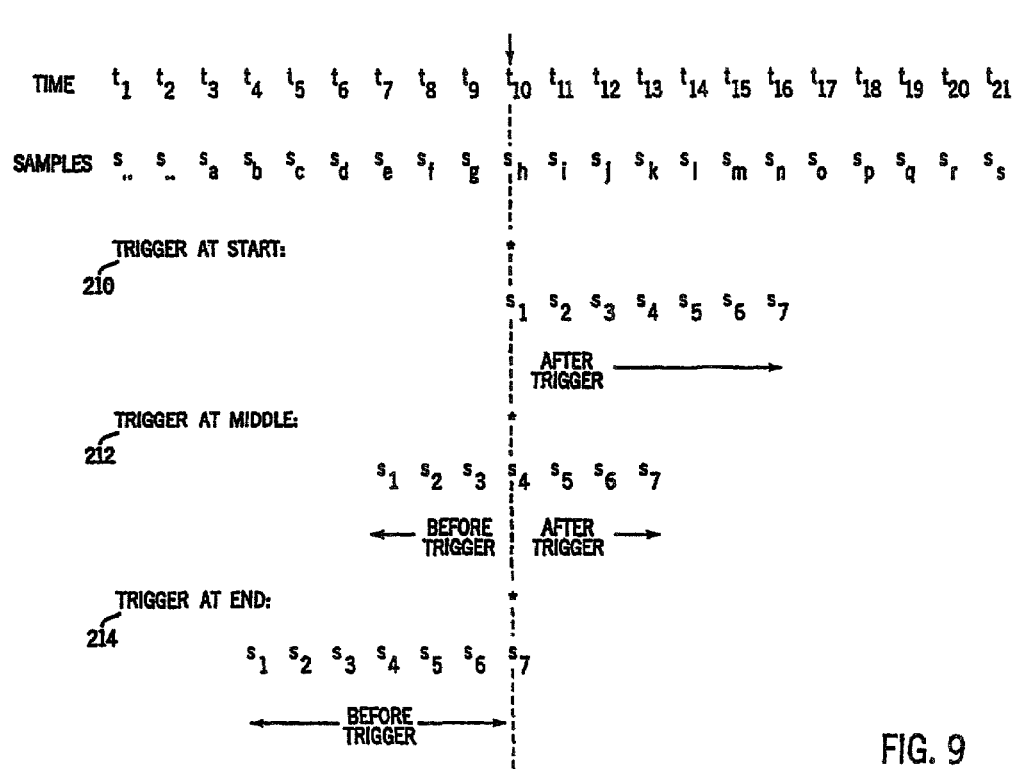
FIG. 9 is a diagram of the various triggering sequence options.

Circular sampling techniques are supported by the data capture system of the present invention. FIG. 9 is a diagram illustrating exemplary sampling techniques in accordance with the teachings of the invention. As shown in FIG. 9, the time sequence is indicated by the Time Line: t1, t2 . . . tn, with a sample at each time interval, as indicated by S1 . . . Sn. For purposes of illustration, the triggering event occurs at time interval t10. Based on the predetermined programming of the system, images will start to be collected upon triggering event, as shown at 210, for a predetermined period prior to and after trigger, as shown at 212, or immediately preceding the trigger, as shown at 214. This permits "circular image storage" without requiring that all images be collected and stored in order to look at events surrounding a triggering event. The technique is also very useful when multiple overlapping zones are monitored by multiple devices and it is desirable to sequence from device to device without losing any critical images.

This is particularly useful when triggering events are used to initiate transmission of collected image data over the communications system. For example, if a triggering event is motion detected at a motion sensor, it may be useful to look at the images captured for a period of time both prior to and after the actual event. The circuitry of the subject invention permits any circular sampling technique to be utilized depending upon application, such as prior to an after trigger, only after trigger or only before trigger. Again, as an example, it may desirable to look primarily at images captured before a triggering event if the event is a catastrophic event such as an explosion or the like. Other circular sampling techniques may be employed, as well, incorporating multiple cameras, for example, wherein different fields are sampled depending upon the time frame in a sequence of events.

Other configurations are contemplated and are within the teachings of the invention. While specific embodiments have been shown and described herein, it will be understood that the invention includes all modifications and enhancements within the scope and spirit of the claims.

What is claimed is:

1. Apparatus comprising:
   a portable housing, the portable housing being wireless;
   an image collection device supported by the portable housing, the image collection device being operable to provide visual image data of a field of view;
   a display supported by the portable housing, the display being operable to display for viewing by a user a perceptible visual image, the perceptible visual image being generated from the visual image data;
   memory supported by the portable housing, the memory being suitable to receive visual image data in digital format, the memory being suitable to retain the visual image data in digital format,
   an input device supported by the portable housing, the input device being operable by the user;
   operation of the input device by the user enabling the memory to retain the visual image data in digital format, the memory being suitable to provide retained visual image data in digital format;
   media supported by the portable housing, the media being suitable to embody at least one compression algorithm;
   at least one processing platform supported by the portable housing, the at least one processing platform being operable to execute the at least one compression algorithm, the at least one processing platform being provided the retained visual image data in digital format, execution of the at least one compression algorithm providing compressed visual image data; and
   a mobile phone supported by the portable housing, the mobile phone being operable to send to a remote recipient a wireless transmission, the wireless transmission conveying the compressed digital image data; and
   movement by the user of the portable housing commonly moving the image collection device,
   movement by the user of the portable housing commonly moving the display.

2. The apparatus according to claim 1 and further comprising:
   the processing platform including at least one processor.

3. The apparatus according to claim 1 and further comprising:
   the portable housing including a handset.

4. The apparatus according to claim 1 and further comprising:
   a microphone supported by the portable housing, the microphone being associated with the mobile phone;
   a speaker supported by the portable housing, the speaker being associated with the mobile phone.

5. The apparatus according to claim 1 and further comprising:
   the mobile phone being selectively operable to send to a remote recipient a wireless transmission, the wireless transmission conveying a voice transmission.

6. The apparatus according to claim 1 and further comprising:
   the mobile phone being selectively operable to receive from a remote sender an incoming wireless transmission the incoming wireless transmission conveying at least one of:
   incoming compressed digital image data,
   an incoming voice transmission, and
   both incoming compressed digital image data and an incoming voice transmission.

7. The apparatus according to claim 1 and further comprising:
   camera supported by the portable housing, the camera including the image collection device.

8. The apparatus according to claim 1 and further comprising:
   the image collection device being suitable to provide the visual image data in digital format.

9. The apparatus according to claim 1 and further comprising:
   the image collection device being suitable to provide the visual image data in analog format:
   an analog to digital converter supported by the portable housing, the analog to digital converter being suitable to receive the visual image data in analog format, the being suitable to provide the visual image data in digital format;
   the display including an LCD, the LCD being operable to display for viewing by a user a perceptible visual image, the perceptible visual image being generated from the visual image data.

10. The apparatus according to claim 1 and further comprising:
    the display including a viewfinder, the viewfinder being suitable to receive the visual image data, the viewfinder being operable to display for viewing by a user a perceptible visual image, the perceptible visual image being generated from the visual image data.

11. The apparatus according to claim 10 and further comprising:
    the viewfinder being suitable to receive the visual image data in digital formal.

12. The apparatus according to claim 10 and further comprising:
    the viewfinder being suitable to receive the visual image data in analog format.

13. The apparatus according to claim 1 and further comprising:
    the display including a display screen, the display screen being defined apart from a viewfinder, the display screen being operable to display for viewing by a user a perceptible visual image, the perceptible visual image being generated from the visual image data.

14. The apparatus according to claim 13 and further comprising:
    the display including an LCD, the LCD being operable to display for viewing by a user a perceptible visual image, the perceptible visual image being generated from the visual image data.

15. The apparatus according to claim 14 and further comprising:
    the LCD being suitable to receive the visual image data in digital format.

16. The apparatus according to claim 1 and further comprising;
    at least one transmission protocol algorithm embodied in suitable media;

a processing platform associated with the at least one transmission protocol algorithm, the associated processing platform being operable to execute the at least one transmission protocol algorithm, the associated processing platform being provided the compressed visual image data, execution of the at least one transmission protocol algorithm providing the compressed visual image data in a transmission format, the visual image data in a transmission format being compatible with the mobile phone for wireless transmission by the mobile phone.

17. The apparatus according to claim 16 and further comprising:

the mobile phone being operable according to a specified wireless transmission protocol, the at least one transmission protocol algorithm providing the visual image data in a compatible data transmission format, the compatible data transmission format being compatible with the specified wireless transmission protocol.

18. The apparatus according to claim 17 and further comprising:

at least one transmission protocol algorithm embodied in suitable media;

a processing platform associated with the at least one transmission protocol algorithm, the associated processing platform being operable to execute the at least one transmission protocol algorithm, execution of the at least one transmission protocol algorithm providing compressed visual image data in a compatible format, the compatible format being compatible with at least one transmission protocol, the compressed visual image data in a compatible format being suitable for transmission by the mobile phone according to at least one wireless transmission protocol.

19. The apparatus according to claim 1 and further comprising:

the portable housing including a first housing section, the image collection device being supported by the rust housing section, the portable housing including a second housing section, the display being supported by the second housing section, the first housing section being adjoined to the second housing section, the second housing section being movable in common with the first housing section when the first housing section is moved by the user, the first housing section being movable in common with the second housing section when the second housing section is moved by the user, the first housing section being supported for movement relative to the second housing section, the image collection device being movable in common with the first housing section relative to the display when the first housing section is moved relative to the second housing section.

20. The apparatus according to claim 19 and further comprising:

the first housing section being supported for pivotal movement relative to the second housing section about a pivot axis.

21. The apparatus according to claim 1 and further comprising:

the image collection device being supported by the portable housing in fixed relation to the display.

22. Apparatus comprising:

a portable housing, the portable housing being wireless:

an image collection device supported by the portable housing, the image collection device being operable to provide visual image data of a field of view;

memory supported by the portable housing, the memory being suitable to receive visual image data in digital format, the memory being suitable to retain the visual image data in digital format, an input device supported by the portable housing, the input device being operable by the user;

operation of the input device by the user enabling the memory to retain the visual image data in digital format, the memory being suitable to provide retained visual image data in digital format;

media supported by the portable housing, the media being suitable to embody at least one compression algorithm;

at least one processing platform supported by the portable housing, the at least one processing platform being operable to execute the at least one compression algorithm, the at least one processing platform being provided the retained visual image data in digital format, execution of the at least one compression algorithm providing compressed visual image data;

a display supported by tile portable housing, the display being operable to display for viewing by a user a perceptible visual image of the field of view, the perceptible visual image being generated from the visual image data in digital format;

a mobile phone supported by the portable housing, the mobile phone being operable to send to a remote recipient a wireless transmission, the wireless transmission conveying the compressed digital image data; and movement by the user of the portable housing commonly moving the image collection device, movement by the user of the portable housing commonly moving the display.

23. The apparatus according to claim 22 and further comprising:

the display including at least one of:
a viewfinder, and
a display screen apart from the viewfinder.

24. Apparatus comprising:

a portable housing, the portable housing being wireless:

an image collection device supported by the portable housing, the image collection device being operable to provide visual image data of a field of view;

memory supported by the portable housing, the memory being suitable to receive visual image data in digital format, the memory being suitable to retain the visual image data in digital format, an input device supported by the portable housing, the input device being operable by the user;

operation of the input device by the user enabling the memory to retain the visual image data in digital format, the memory being suitable to provide retained visual image data in digital format;

media supported by/the portable housing, the media being suitable to embody at least one compression algorithm;

at least one processing platform supported by the portable housing, the at least one processing platform being operable to execute the at least one compression algorithm, the at least one processing platform being provided the retained visual image data in digital format, execution of the at least one compression algorithm providing compressed visual image data;

a display supported by the portable housing, the display being operable to display the viewing by a user a perceptible visual image of the field of view, the perceptible visual image being generated from the retained visual image data in digital format;

a mobile phone supported by the portable housing, the mobile phone being operable to send to a remote recipient a wireless transmission, the wireless transmission conveying the compressed digital image data; and movement by the user of the portable housing commonly moving the image collection device, movement by the user of the portable housing commonly moving the display.

25. The apparatus according to claim 24 and further comprising:

the display including at least one of:
a viewfinder, and
a display screen apart from the viewfinder.

26. A mobile handset comprising:
a portable housing, the portable housing being wireless;
an image collection device supported by the portable housing, the image collection device being operable to provide visual image data of a field of view;
a display supported by the portable housing, the display being operable to
display for viewing by a user a perceptible visual image, the perceptible visual
image being generated from the visual image data;
memory supported by the portable housing, the memory being suitable to receive visual image data in digital format, the memory being suitable to retain the visual image data in digital format,
an input device supported by the portable housing, the input device being operable by the user;
operation of the input device by the user enabling the memory to retain the visual image data in digital format, the memory being suitable to provide retained visual image data in digital format;
media supported by the portable housing, the media being suitable to embody at least one compression algorithm;
at least one processing platform supported by the portable housing, the at least one processing platform being operable to execute the at least one compression algorithm, the at least one processing platform being provided the retained visual image data in digital format, execution of the at least one compression algorithm providing compressed visual image data; and
a mobile phone supported by the portable housing, the mobile phone being operable to send to a remote recipient a wireless transmission, the wireless transmission conveying the compressed digital image data.

27. Apparatus comprising:
a portable housing, the portable housing being wireless;
an image collection device supported by the portable housing, the image collection device being operable to provide visual image data of a field of view;
memory supported by the portable housing, the memory being suitable to receive visual image data in digital format, the memory being suitable to retain the visual image data in digital format,
an input device supported by the portable housing, the input device being operable by the user;
operation of the input device by the user enabling the memory to retain the visual image data in digital format, the memory being suitable to provide retained visual image data in digital format;
media supported by the portable housing, the media being suitable to embody at least one compression algorithm;
at least one processing platform supported by the portable housing, the at least one processing platform being operable to execute the at least one compression algorithm, the at least one processing platform being provided the retained visual image data in digital format, execution of the at least one compression algorithm providing compressed visual image data;
a display supported by the portable housing, the display being operable to display for viewing by a user a perceptible visual image of the field of view, the perceptible visual image being generated from the retained visual image data in digital format;
a mobile phone supported by the portable housing, the mobile phone being selectively operable to send to a remote recipient a wireless image transmission, the wireless transmission conveying the compressed digital image data, the mobile phone being selectively operable to send to a remote recipient a wireless voice transmission, the mobile phone being selectively operable to receive from a remote sender an incoming wireless image transmission; and
the display being operable to display for viewing by a user a perceptible visual image of the incoming wireless image transmission.

28. The apparatus according to claim 27 and further comprising:
the display including at least one of:
a viewfinder, and
a display screen apart from the viewfinder.

29. Apparatus comprising:
a portable housing, the portable housing being wireless;
an image collection device supported by the portable housing, the image collection device being operable to provide in digital format visual image data of a field of view;
memory supported by the portable housing, the memory being suitable to receive the visual image data in digital format, the memory being suitable to retain the visual image data in digital format,
an input device supported by the portable housing, the input device being operable by the user;
operation of the input device by the user enabling the memory to retain the visual image data in digital format, the memory being suitable to provide retained visual image data in digital format;
at least one compression algorithm embodied at least in part in suitable programmed media, the media being supported by the portable housing;
at least one processor supported by the portable housing, the at least one processor being operable to execute the at least one compression algorithm, the at least one processor being provided the retained visual image data in digital format, execution of the at least one compression algorithm providing compressed visual image data;
at least one display supported by the portable housing, the at least one display being operable to display for viewing by a user a perceptible visual image of the field of view, the perceptible visual image being generated from at least one of:
the visual image data in digital format, and
the retained visual image data in digital format;
a mobile phone supported by the portable housing, the mobile phone being operable to send to a remote recipient a wireless transmission, the wireless transmission conveying the compressed digital image data.

30. Apparatus according to claim 29 and further comprising:

the image collection device including an analog to digital converter, the analog to digital converter being operable to provide the visual image data in digital formal.

31. The apparatus according to claim 29 and further comprising:

the at least one display including at least one of:
   a viewfinder; and
   a display screen apart from the viewfinder.

* * * * *